(12) United States Patent
Zhu et al.

(10) Patent No.: US 11,337,226 B2
(45) Date of Patent: May 17, 2022

(54) METHOD AND APPARATUS OF RECEIVE BEAM MANAGEMENT AT TERMINAL

(71) Applicant: Samsung Electronics Co., Ltd., Suwon-si (KR)

(72) Inventors: Dalin Zhu, Richardson, TX (US); Boon Loong Ng, Plano, TX (US); Jianhua Mo, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/000,233

(22) Filed: Aug. 21, 2020

(65) Prior Publication Data

US 2021/0068123 A1 Mar. 4, 2021

Related U.S. Application Data

(60) Provisional application No. 62/902,011, filed on Sep. 18, 2019, provisional application No. 62/892,817, (Continued)

(51) Int. Cl.
*H04W 24/08* (2009.01)
*H04W 72/08* (2009.01)
(Continued)

(52) U.S. Cl.
CPC ........ *H04W 72/085* (2013.01); *H04B 7/0808* (2013.01); *H04B 7/088* (2013.01);
(Continued)

(58) Field of Classification Search
CPC .. H04B 7/0608; H04B 7/0617; H04B 7/0632; H04B 7/0808; H04B 7/088; H04W 24/08; H04W 72/046; H04W 72/085
(Continued)

(56) References Cited

U.S. PATENT DOCUMENTS 10,367,262 B2 7/2019 Chang et al.
2017/0163317 A1 6/2017 Kim
(Continued)

OTHER PUBLICATIONS

International Search Report dated Nov. 25, 2020 in connection with International Patent Application No. PCT/KR2020/011521, 4 pages.

*Primary Examiner* — Harun Chowdhury

(57) ABSTRACT

A user equipment, a method, and computer-readable media. The UE, which includes a transceiver with a plurality of antenna panels, is configured to determine a link quality of a serving antenna panel. If the link quality of the serving panel is below a quality threshold, resources are allocated from the serving antenna panel to another antenna panel during a sweeping period to identify one or more beams of a target antenna panel for resuming communications. Measurements for a set of beams of the other antenna panel are obtained, during the sweeping period, with the allocated resources. The other antenna panel can be determined to be the target antenna panel based on the obtained measurements. The UE can switch from the serving antenna panel to the target antenna panel, select the one or more beams based on the obtained measurements, and resume the communications on the selected one or more beams.

20 Claims, 46 Drawing Sheets

Related U.S. Application Data filed on Aug. 28, 2019, provisional application No. 62/892,662, filed on Aug. 28, 2019.

(51) Int. Cl.
  *H04B 7/08* (2006.01)
  *H04W 72/04* (2009.01)
  *H04L 43/16* (2022.01)
  *H04B 17/318* (2015.01)

(52) U.S. Cl.
  CPC ............ *H04B 17/318* (2015.01); *H04L 43/16* (2013.01); *H04W 24/08* (2013.01); *H04W 72/046* (2013.01)

(58) Field of Classification Search
  USPC .................................. 370/252, 328, 329, 332
  See application file for complete search history.

(56) References Cited

U.S. PATENT DOCUMENTS

| | | |
|---|---|---|
| 2018/0097552 A1 | 4/2018 | Kakishima et al. |
| 2018/0212668 A1* | 7/2018 | Athley .................. H04B 7/088 |
| 2018/0219664 A1 | 8/2018 | Guo et al. |
| 2019/0052344 A1 | 2/2019 | Kundargi et al. |
| 2019/0181942 A1* | 6/2019 | Tang .................... H04B 7/0608 |
| 2019/0268061 A1 | 8/2019 | Li et al. |
| 2020/0275523 A1* | 8/2020 | Zhang .................... H04B 7/088 |
| 2021/0175953 A1* | 6/2021 | Nilsson .................. H04B 7/088 |

\* cited by examiner

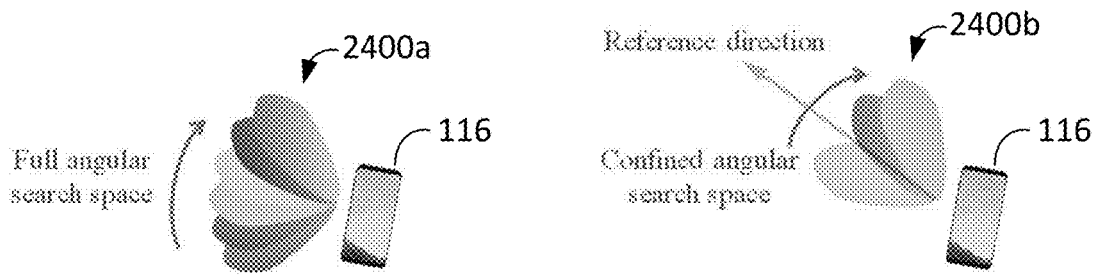
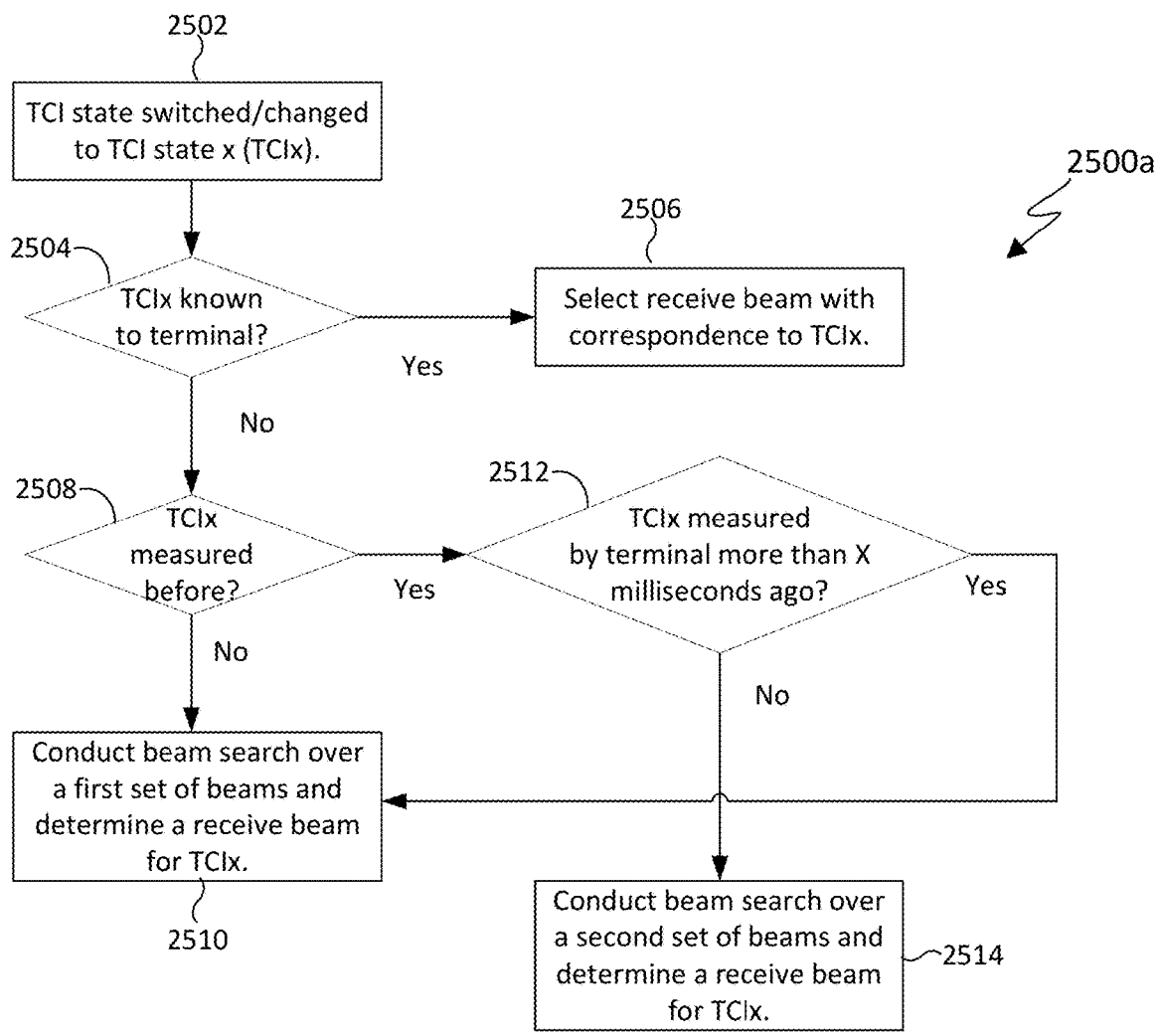
FIG. 24
FIG. 25A

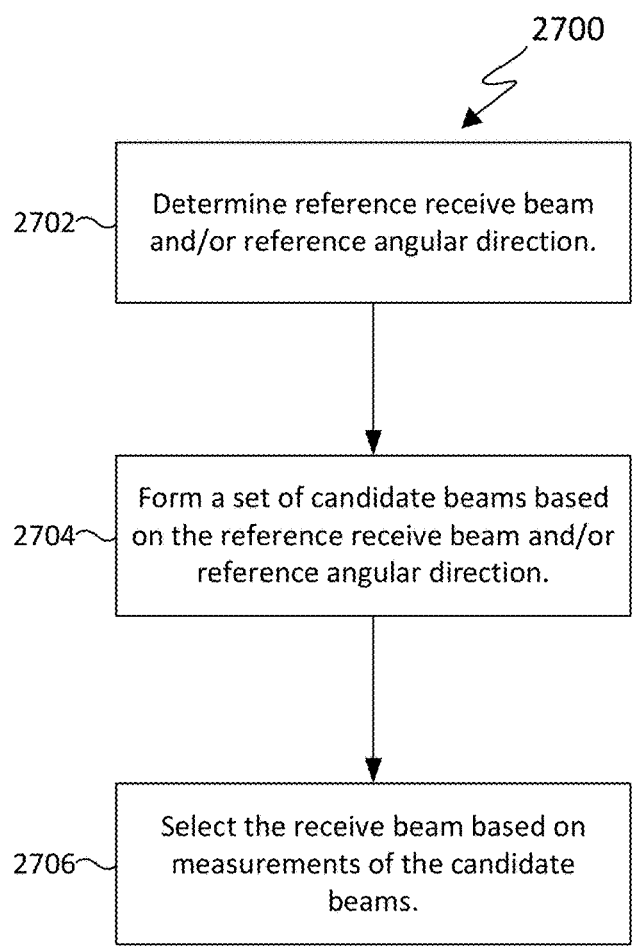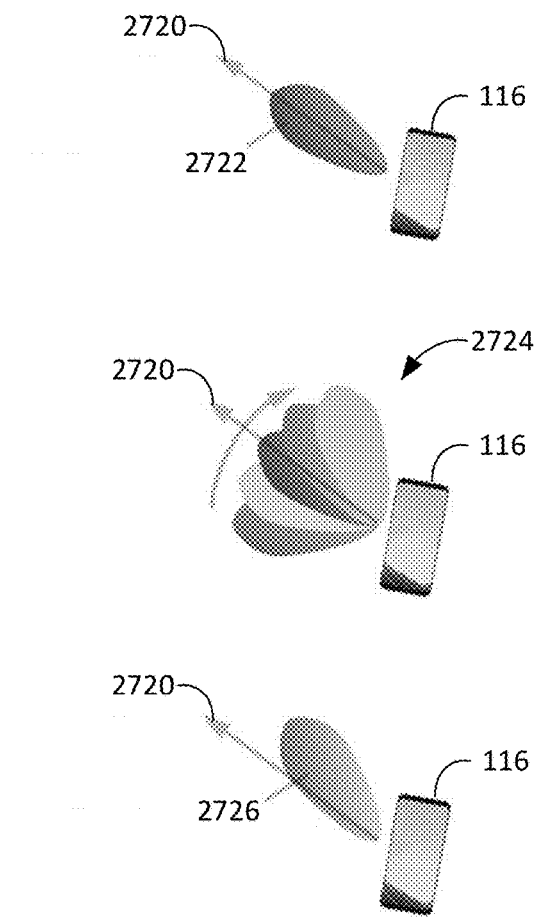
FIG. 27A
FIG. 27B

METHOD AND APPARATUS OF RECEIVE BEAM MANAGEMENT AT TERMINAL

CROSS-REFERENCE TO RELATED APPLICATION AND CLAIM OF PRIORITY

This application claims priority under 35 U.S.C. § 119(e) to U.S. Provisional Patent Application No. 62/892,817 filed on Aug. 28, 2019, and to to U.S. Provisional Patent Application No. 62/902,011 filed on Sep. 18, 2019. The above-identified provisional patent applications are hereby incorporated by reference in its entirety.

TECHNICAL FIELD

The present disclosure relates to a pre-$5^{th}$-Generation (5G) or 5G communication system to be provided for supporting higher data rates Beyond $4^{th}$-Generation (4G) communication system such as Long-Term Evolution (LTE). More particularly, the present disclosure is directed to beam management in mobile terminals having multiple antenna panels.

BACKGROUND

A communication system includes a downlink (DL) that conveys signals from transmission points such as Base Stations (BSs) or eNodeBs to User Equipments (UEs) and an uplink (UL) that conveys signals from UEs to reception points such as eNodeBs. The communication system can be a millimeter wave (mmWave) wireless communication system. A UE, also commonly referred to as a terminal or a mobile station, may be fixed or mobile and may be a cellular phone, a personal computer device, etc. In addition, the UE may be configured with a multi-panel antenna for communication. An eNodeB, which is generally a fixed station, may also be referred to as an access point or other equivalent terminology.

BS transmit power can be significantly larger than UE transmit power, resulting in a receive signal strength at the BS that is significantly lower than the received signal strength at the UE. The asymmetry in the UL and DL link budget can limit UE radio coverage.

Due to link blockage, link failure, change of channel condition and other design limitations, the BS or the network may have to switch or change the transmission configuration indicator (TCI) state to maintain a good link quality. In some cases, the switch or change of the TCI state may result in a switch or change of the transmit beam at the BS. Upon receiving the TCI state switch command from the network via higher-layer signaling, the UE may also need to change the employed receive beam.

SUMMARY

Embodiments of the present disclosure include a user equipment (UE), a method, and a non-transitory, computer-readable media for beam management for a plurality of antenna panels. One embodiment is directed to a UE that includes a transceiver including a plurality of antenna panels, and a processor operably connected to the transceiver. The processor configured to determine a link quality of a serving antenna panel; responsive to determining that the link quality of the serving panel is below a quality threshold, allocate resources from the serving antenna panel to another antenna panel in the plurality of antenna panels during a sweeping period to identify one or more beams of a target antenna panel for resuming communications; obtain, with the allocated resources, measurements for a set of beams of the other antenna panel during the sweeping period; determine that the other antenna panel is the target antenna panel based on the obtained measurements; switch from the serving antenna panel to the target antenna panel; select the one or more beams from the set of beams based on the obtained measurements; and resume the communications on the selected one or more beams via the target antenna panel.

Another embodiment is directed to a method that includes the steps of determining a link quality of a serving antenna panel; responsive to determining that the link quality of the serving panel is below a quality threshold, allocating resources from the serving antenna panel to another antenna panel in the plurality of antenna panels during a sweeping period to identify one or more beams of a target antenna panel for resuming communications; obtaining, with the allocated resources, measurements for a set of beams of the other antenna panel during the sweeping period; determining that the other antenna panel is the target antenna panel based on the obtained measurements; switching from the serving antenna panel to the target antenna panel; selecting the one or more beams from the set of beams based on the obtained measurements; and resuming the communications on the selected one or more beams via the target antenna panel.

Yet another embodiment is directed to a non-transitory, computer-readable medium comprising instructions that, when executed by a processor of an electronic device, are configured to cause the electronic device to: determine a link quality of a serving antenna panel; responsive to determining that the link quality of the serving panel is below a quality threshold, allocate resources from the serving antenna panel to another antenna panel in the plurality of antenna panels during a sweeping period to identify one or more beams of a target antenna panel for resuming communications; obtain, with the allocated resources, measurements for a set of beams of the other antenna panel during the sweeping period; determine that the other antenna panel is the target antenna panel based on the obtained measurements; switch from the serving antenna panel to the target antenna panel; select the one or more beams from the set of beams based on the obtained measurements; and resume the communications on the selected one or more beams via the target antenna panel.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. Likewise, the term "set" means one or more. Accordingly, a set of items can be a single item or a collection of two or more items.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 24 illustrates a comparison of a receive beam search over an entire angular space with a receive beam search over a confined area in accordance with various embodiments of this disclosure;

FIG. 25A illustrates a flowchart for a receive beam search for a TCI state switch in accordance with various embodiments of this disclosure;

FIGS. 27A and 27B illustrate a flowchart for beam selection along with corresponding receive beams in accordance with various embodiments of this disclosure;

DETAILED DESCRIPTION

Figure 1:
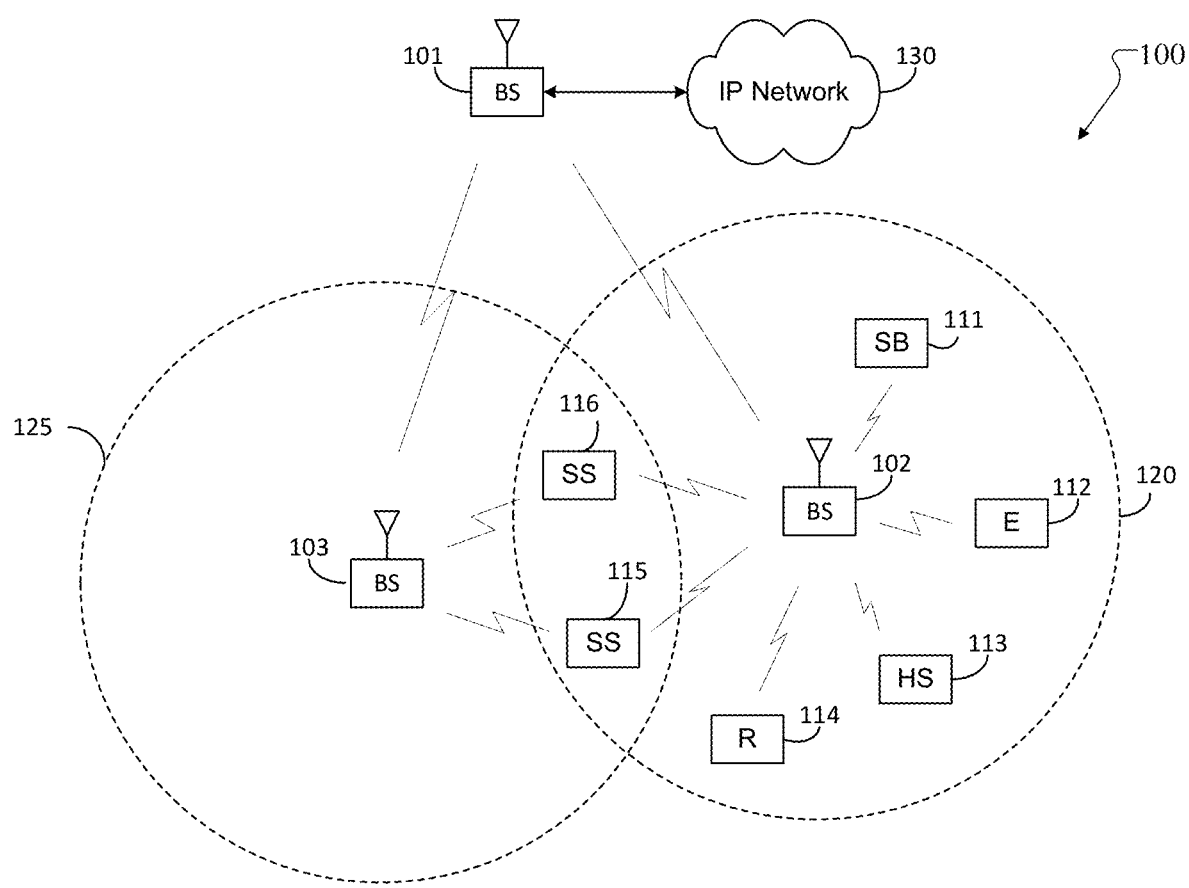
FIG. 1 illustrates an exemplary networked computing system according to various embodiments of this disclosure.

The figures included herein, and the various embodiments used to describe the principles of the present disclosure are by way of illustration only and should not be construed in any way to limit the scope of the disclosure. Further, those skilled in the art will understand that the principles of the present disclosure may be implemented in any suitably arranged wireless communication system.

A UE can be configured with a communications module having a plurality of antenna panels covering different angular spaces using sets of directional beams. Each antenna panel is associated with its own L1-RSRP measurement table that is maintained and updated at the UE. Before communicating with any beams on any of the antenna panels, the UE reports L1-RSRP values to a BS for beam selection. However, the measurement values in the L1-RSRP measurement table may be outdated, resulting in undesirable beam selection. Performing beam measurement at the antenna panel switching boundary results in a measurement delay that can also result in link outages. Thus, some novel aspects of this disclosure are directed to beam management for a multi-panel antenna that ameliorates the severity of link outages at antenna switching boundaries.

In directional beamforming based mmWave systems, to optimize a certain performance metric (e.g., the received signal power), the UE usually conducts an exhaustive search over all candidate beam codewords in the beam codebook and selects the one that results in the best performance metric (e.g., the highest received signal power) to receive the data packets. If the number of candidate beam codewords in the beam codebook is large, the exhaustive search may take a very long time to converge, resulting in extensive delay for the UE to connect to the network. The exhaustive search may be necessary during an unknown TCI state switch. According to the definition in the 3GPP TS 38.133, a TCI state is considered to be known to the UE if: (i) the UE has reported the measurement of the target TCI state to the network at least once before, (ii) the last measurement of the target TCI state was reported by the UE no more than a predetermined amount of time, e.g., X ms ago, and (iii) the SNR for the target TCI state is above a predefined threshold Th_0, e.g., Th_0=−3 dB, during the TCI state switching period. If any of the above conditions does hold, the target TCI state is considered to be unknown to the UE. If the switched TCI state is unknown to the UE, the UE may have to perform a brute-force search over all candidate beam codewords in the beam codebook to find a receive beam, and therefore to re-establish the communication link. If the beam codebook size is large, the UE of interest may experience significant outage during the unknown TCI state switch. Thus, at least some novel aspects of this disclosure recognize the need to implement new effective and efficient receive beam selection/operation strategies at the mobile terminal to facilitate the overall receive beam selection process under unknown TCI state switch.

To communicate with a BS, a UE can conduct a search over all candidate beam codewords in a beam codebook and select one or more that results in the best performance metric (e.g., the highest received signal power). The beam codebook can comprise beams of differing beamwidths. For ease of description, the disclosure contemplates only two types of beams in a codebook, namely wide beams (type 1) and narrow beams (type 2). However, novel aspects of this disclosure can also be applied to beam codebooks with more than two types. In general, wider beams have lower beam gain but can require less frequent beam update when the channel condition changes; whereas narrower beams have higher beam gain but can require more frequent beam update when the channel condition changes.

The base station transmit power can be significantly larger (e.g. 20 dB) than the terminal transmit power. As a result, the received signal strength at the base station can be significantly lower than the received signal at the terminal. In certain conditions, e.g. when the UE is at or near the cell edge, although the downlink signal strength is sufficient to support the minimum downlink data rate, the uplink signal strength may not be sufficient to support the minimum uplink data rate. This asymmetry in downlink and uplink link budget limits the radio coverage for the UE. Novel aspects of this disclosure recognize that the asymmetry in the downlink and uplink link budget limits radio coverage for UEs and that the asymmetry in downlink and uplink link budget can be mitigated by having the UE employ wide Rx beam to receive downlink signals and narrow Tx beam to transmit uplink signals because narrow Tx beam has higher beam gain than the wide Rx beam.

FIG. 1 illustrates an exemplary networked computing system according to various embodiments of this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an gNodeB (gNB) 101, an gNB 102, and an gNB 103. The gNB 101 communicates with the gNB 102 and the gNB 103. The gNB 101 also communicates with at least one Internet Protocol (IP) network 130, such as the Internet, a proprietary IP network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB or gNB), a macrocell, a femtocell, a WiFi access point (AP), or other wirelessly enabled devices. Base stations may provide wireless access in accordance with one or more wireless communication protocols, e.g., 5G 3GPP New Radio Interface/Access (NR), long term evolution (LTE), LTE advanced (LTE-A), High Speed Packet Access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, wireless network 100 can be a 5G communication system in which a UE, such as UE 116, can manage a multi-panel antenna and/or select beams for UL/DL transmission.

Although FIG. 1 illustrates one example of a wireless network 100, various changes may be made to FIG. 1. For example, the wireless network 100 could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNB 101, 102, and/or 103 could provide access to other or additional external networks, such as external telephone networks or other types of data networks.

Figure 2:
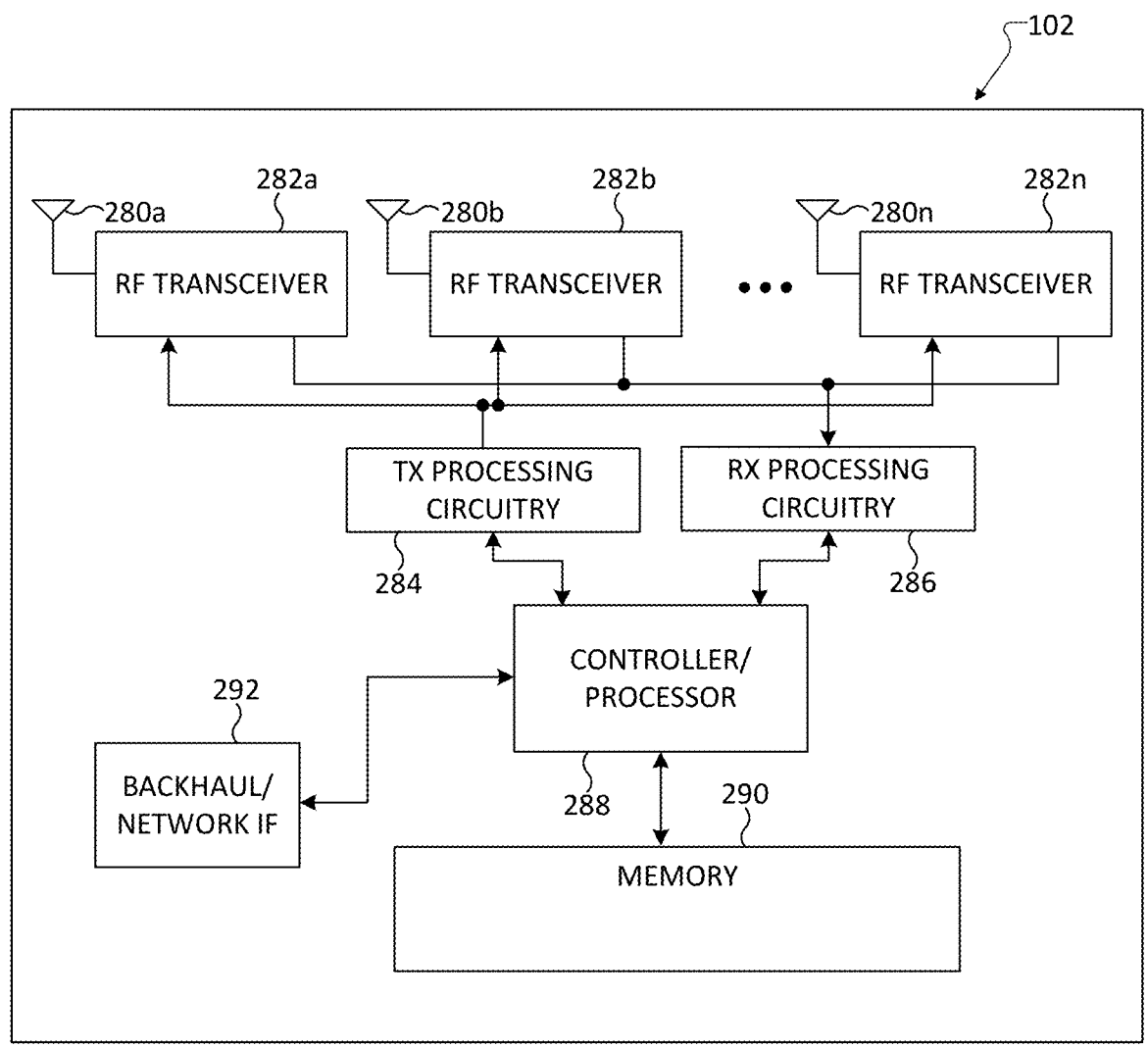
FIG. 2 illustrates an exemplary base station (BS) in the networked computing system according to various embodiments of this disclosure.

FIG. 2 illustrates an exemplary base station (BS) according to various embodiments of this disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of an gNB.

As shown in FIG. 2, the gNB 102 includes multiple antennas 280a-280n, multiple RF transceivers 282a-282n, transmit (TX) processing circuitry 284, and receive (RX)

processing circuitry 286. The gNB 102 also includes a controller/processor 288, a memory 290, and a backhaul or network interface 292.

The RF transceivers 282a-282n receive, from the antennas 280a-280n, incoming RF signals, such as signals transmitted by UEs in the network 100. The RF transceivers 282a-282n down-convert the incoming RF signals to generate IF or baseband signals. The IF or baseband signals are sent to the RX processing circuitry 286, which generates processed baseband signals by filtering, decoding, and/or digitizing the baseband or IF signals. The RX processing circuitry 286 transmits the processed baseband signals to the controller/processor 288 for further processing.

The TX processing circuitry 284 receives analog or digital data (such as voice data, web data, e-mail, or interactive video game data) from the controller/processor 288. The TX processing circuitry 284 encodes, multiplexes, and/or digitizes the outgoing baseband data to generate processed baseband or IF signals. The RF transceivers 282a-282n receive the outgoing processed baseband or IF signals from the TX processing circuitry 284 and up-converts the baseband or IF signals to RF signals that are transmitted via the antennas 280a-280n.

The controller/processor 288 can include one or more processors or other processing devices that control the overall operation of the gNB 102. For example, the controller/processor 288 could control the reception of forward channel signals and the transmission of reverse channel signals by the RF transceivers 282a-282n, the RX processing circuitry 286, and the TX processing circuitry 284 in accordance with well-known principles. The controller/processor 288 could support additional functions as well, such as more advanced wireless communication functions. For instance, the controller/processor 288 could support beam forming or directional routing operations in which outgoing signals from multiple antennas 280a-280n are weighted differently to effectively steer the outgoing signals in a desired direction. Any of a wide variety of other functions could be supported in the gNB 102 by the controller/processor 288. In some embodiments, the controller/processor 288 includes at least one microprocessor or microcontroller.

The controller/processor 288 is also capable of executing programs and other processes resident in the memory 290, such as a basic OS. The controller/processor 288 can move data into or out of the memory 290 as required by an executing process.

The controller/processor 288 is also coupled to the backhaul or network interface 292. The backhaul or network interface 292 allows the gNB 102 to communicate with other devices or systems over a backhaul connection or over a network. The interface 292 could support communications over any suitable wired or wireless connection(s). For example, when the gNB 102 is implemented as part of a cellular communication system (such as one supporting 5G, LTE, or LTE-A), the interface 292 could allow the gNB 102 to communicate with other gNBs over a wired or wireless backhaul connection. When the gNB 102 is implemented as an access point, the interface 292 could allow the gNB 102 to communicate over a wired or wireless local area network or over a wired or wireless connection to a larger network (such as the Internet). The interface 292 includes any suitable structure supporting communications over a wired or wireless connection, such as an Ethernet or RF transceiver.

The memory 290 is coupled to the controller/processor 288. Part of the memory 290 could include a RAM, and another part of the memory 290 could include a Flash memory or other ROM.

As described in more detail below, in some embodiments, UE management of a multi-panel antenna and/or selection of beams for UL/DL transmission can be based on signals sent and received from a gNB, such as gNB 102 and a UE.

Although FIG. 2 illustrates one example of gNB 102, various changes may be made to FIG. 2. For example, the gNB 102 could include any number of each component shown in FIG. 2. As a particular example, an access point could include a number of interfaces 292, and the controller/processor 288 could support routing functions to route data between different network addresses. As another particular example, while shown as including a single instance of TX processing circuitry 284 and a single instance of RX processing circuitry 286, the gNB 102 could include multiple instances of each (such as one per RF transceiver). Also, various components in FIG. 2 could be combined, further subdivided, or omitted and additional components could be added according to particular needs.

Figure 3:
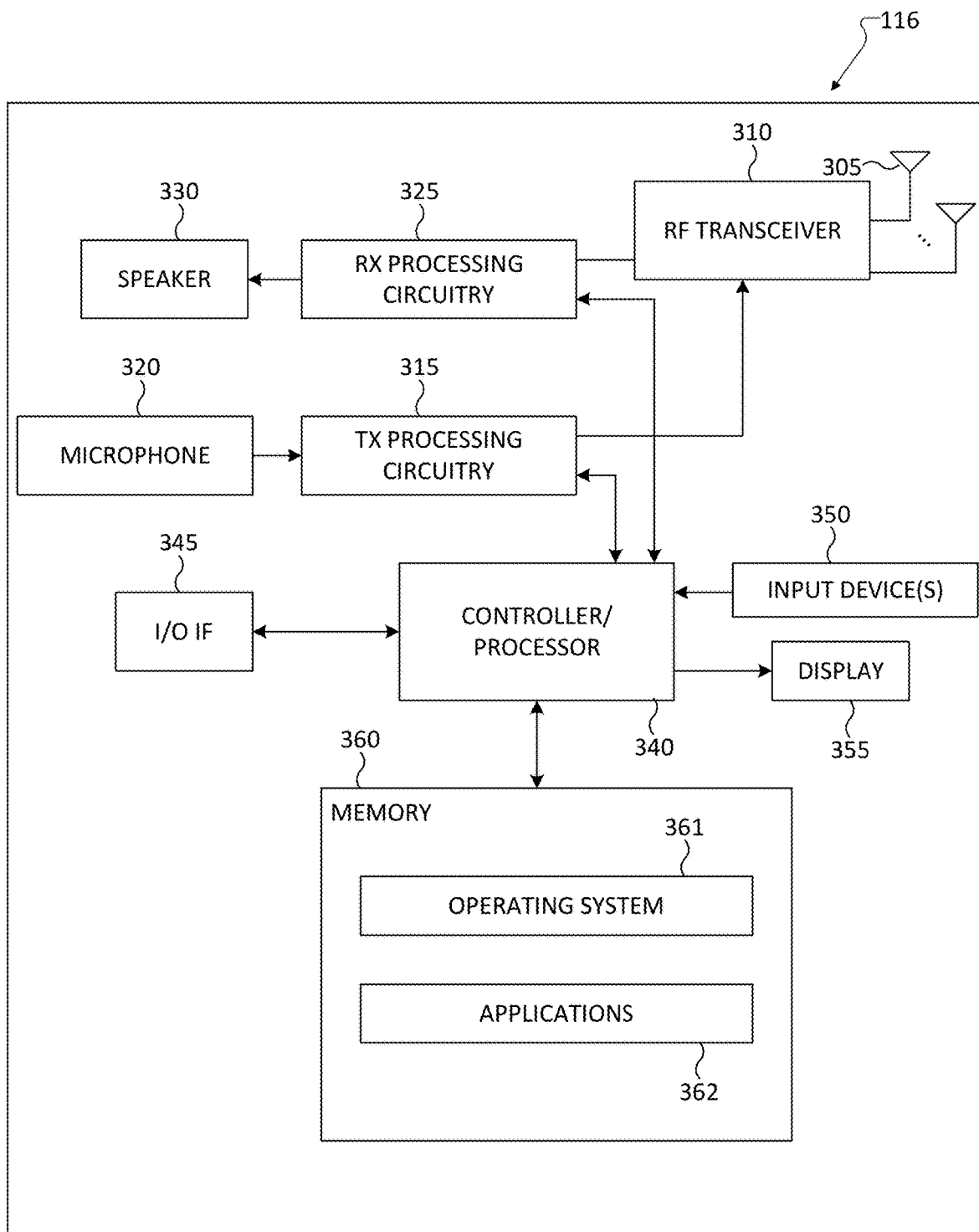
FIG. 3 illustrates an exemplary user equipment (UE) in the networked computing system according to various embodiments of this disclosure.

FIG. 3 illustrates an exemplary user equipment (UE) according to various embodiments of this disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360. The main processor 340 can move data into or out of the memory 360 as required by an executing process. In some embodiments, the main processor 340 is configured to execute the applications 362 based on the OS program 361 or in response to signals received from gNBs or an operator. The main processor 340 is also coupled to the I/O interface 345, which provides the UE 116 with the ability to connect to other devices such as laptop computers and handheld computers. The I/O interface 345 is the communication path between these accessories and the main processor 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random-access memory (RAM), and another part of the memory 360 could include a Flash memory or other read-only memory (ROM).

As described in more detail below, a UE, such as UE 116, can manage a multi-panel antenna and/or select beams for UL/DL transmission.

Although FIG. 3 illustrates one example of UE 116, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
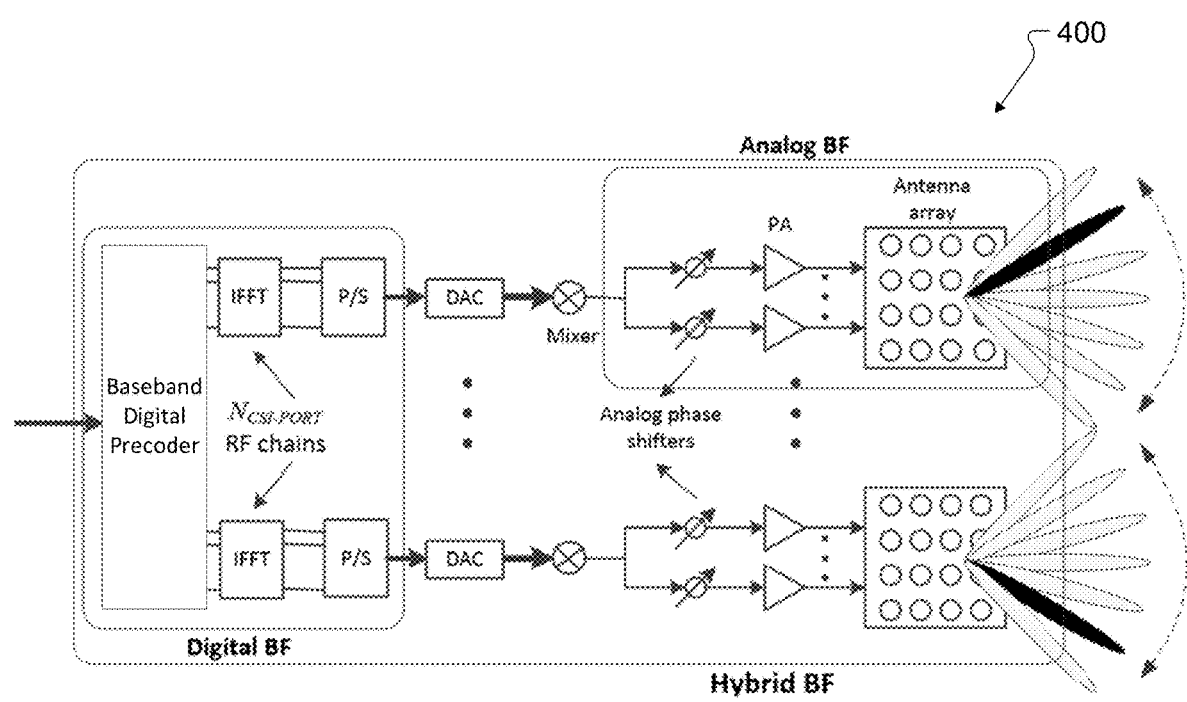
FIG. 4 illustrates an exemplary mm-wave communication system according to various embodiments of this disclosure.

FIG. 4 illustrates an exemplary mm-wave communication system according to various embodiments of this disclosure. Communication system 400 can be implemented in a BS, such as BS 102 in FIG. 2 and/or in a UE, such as UE 116 in FIG. 3.

For mmWave bands, the number of antenna elements can be large for a given form factor. However, the number of digitally chain to be limited due to hardware constraints (such as the feasibility to install a large number of ADCs/DACs at mmWave frequencies) as illustrated in FIG. 4. In this case, one digital chain is mapped onto a large number of antenna elements which can be controlled by a bank of analog phase shifters. One digital chain can then correspond to one sub-array which produces a narrow analog beam through analog beamforming. This analog beam can be configured to sweep across a wider range of angles by varying the phase shifter bank across a transmission time interval.

A gNB could utilize one or multiple transmit beams to cover the whole area of one cell. The gNB may form a transmit beam by applying suitable gains and phase settings to an antenna array. The transmit gain, i.e., the amplification of the power of the transmitted signal provided by a transmit beam, is typically inversely proportional to the width or area covered by the beam. At lower carrier frequencies, the more benign propagation losses may make it feasible for gNB to provide coverage with a single transmit beam, i.e., ensure adequate received signal quality at all UE locations within the coverage area via the usage of a single transmit beam. In other words, at lower transmit signal carrier frequencies, the transmit power amplification provided by the transmit beam with a width large enough to cover the area may be sufficient to overcome the propagation losses to ensure adequate received signal quality at all UE locations within the coverage area. However, at higher signal carrier frequencies, the transmit beam power amplification corresponding to the same coverage area may not be sufficient to overcome the higher propagation losses, resulting in a degradation of received signal quality at UE locations within the coverage area. In order to overcome such a received signal quality degradation, the gNB may form a number of transmit beams, each providing coverage over a region narrower than the overall coverage region, but providing the transmit power amplification sufficient to overcome the higher signal propagation loss due to the usage of higher transmit signal carrier frequencies. The UE may also form receive beams to increase the signal-to-interference-and-noise ratio (SINR) at the receiver. Likewise, in the uplink, the UE may form transmit beams and the gNB may form receive beams.

To assist the UE in determining its RX and/or TX beam, a beam sweeping procedure is employed consisting of the gNB transmitting a set of transmit beams to sweep the cell area and the UE measuring the signal quality on different beams using its receive beams. To facilitate candidate beam identification, beam measurement and beam quality reporting, the gNB configures the UE with one or more RS resource (e.g. SS Block, Periodic/Aperiodic/Semi-Persistent CSI-RS resources or CRIs) corresponding to a set of TX beams. An RS resource refers to a reference signal transmission on a combination of one or more time (OFDM symbol)/frequency (resource element)/spatial (antenna port) domain locations. For each RX beam, the UE reports different TX beams received using that RX beam, ranked in order of signal strength (RSRP) and optionally CSI (CQI/PMI/RI)). Based on the UE's measurement report feedback, the gNB indicates the UE with one or more Transmission Configuration Indicator (TCI) states for reception of PDCCH and/or PDSCH.

Beam Management for Multi-Panel Antenna

Figure 5:
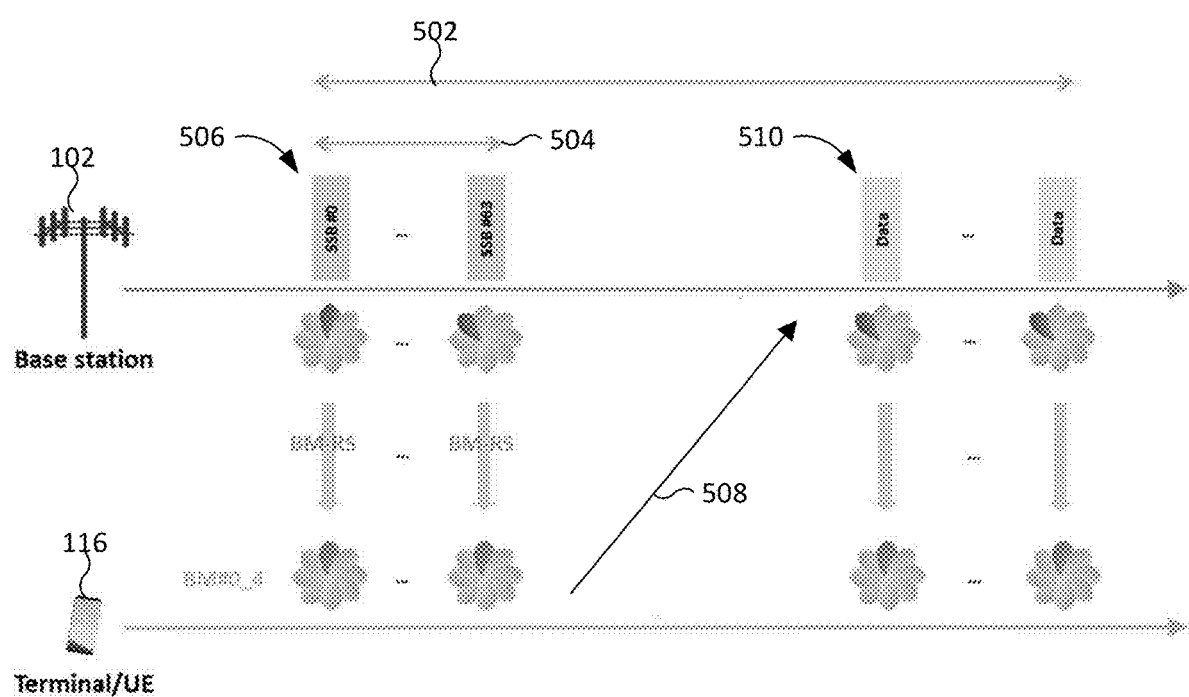
FIG. 5 illustrates a beam management procedure between a BS and UE in accordance with various embodiments of this disclosure.

FIG. 5 illustrates a beam management procedure between a BS and UE in accordance with various embodiments of this disclosure. Data is communicated between a BS 102 and a UE 116 in TX-RX cycles 502. Within the TX-RX cycle 502 is synchronization signal (SS) period 504 during which the UE 116 forms one RX beam, e.g., BM #0_4 representing module index 0 and beam index 4 in module 0, take measurement from all the SSB beams 506, e.g., all 64 SSB beams, and updates the corresponding entries of the L1-RSRP measurement table. At the end of each SS period 504, the UE 116 transmits a report 508 indicating the largest L1-RSRP(s) from the L1-RSRP measurement table to the base station 102.

Based upon the L1-RSRPs report 508 from the UE 116, the base station 102 determines the best transmit beam(s)/TCI state(s) 510 to perform data communications. The base station 102 uses the selected best transmit beam(s) 510 to transmit payload data, and finishes the TX-RX cycle 502. The whole process can include numerous TX-RX cycles.

As discussed above, the measurement delay, particularly at antenna module switching boundaries, can result in outdated/obsolete L1-RSRP information in the L1-RSRP measurement table, which could result in inaccurate beam selection and a severe link outage. Various embodiments disclosed herein reduce the RSRP loss at the module switching boundary.

Figure 6:
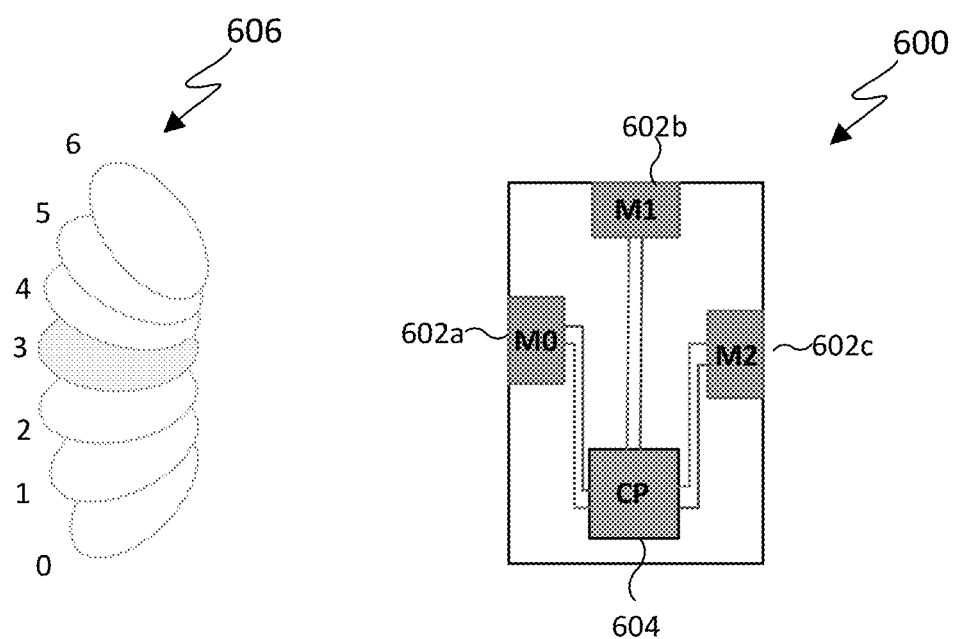
FIG. 6 illustrates a communication module with a plurality of antenna panels in accordance with various embodiments of this disclosure.

FIG. 6 illustrates a communication module with a plurality of antenna panels in accordance with various embodiments of this disclosure. The communications module 600a can be implemented in a UE, such as UE 116 in FIG. 3.

The communications module 600 includes a plurality of antenna panels 602, each of which covers a specific angular space using a set of directional beams 606. In this embodiment, the set of directional beams 606 includes seven beams with beam 3 serving as the boresight. Each of the antenna panels 602a, 602b, and 602c are connected to a communications processor 604. In one embodiment, the communications processor 604 is configured to control one of the antenna panels 602 at a time to take measurements and/or communicate data. As used herein, the term "antenna panel" may be used interchangeably with the term "antenna module".

Multiple L1-RSRP measurement tables could be maintained and updated at the terminal side, each corresponding to a given antenna panel 602. For a given time period, since only one antenna panel 602 can be enabled as the serving antenna panel, only one L1-RSRP measurement table can be updated at a time. If the link quality of the serving antenna panel drops below a given threshold, then the corresponding UE can sweep the other antenna panels during a sweeping period to take measurements and identify a different antenna panel with a better link quality. If a new antenna panel is identified as having a better link quality, e.g., higher than the threshold or better than the currently serving antenna panel, then the UE can use the new antenna panel for data communications or to take measurements. In this example in FIG. 6, if antenna panel 602c is the serving antenna panel, and the link quality of antenna panel 602c drops below a threshold, then the corresponding UE can sweep antenna modules 602a and 602b to determine if either antenna panel 602a or 602b can be used as the new serving antenna panel.

Significant data channel RSRP loss is observed at module switching boundaries. In some cases, the obsolete RSRP value is also very low, which may result in severe link outage. If the L1-RSRP measurement table is outdated for the newly selected serving module, it may take hundreds of milliseconds to completely update the L1-RSRP measurement table. Hence, during this period of time, the selected TX beam at the base station and the RX beam at the UE could be nonideal.

Figure 7:
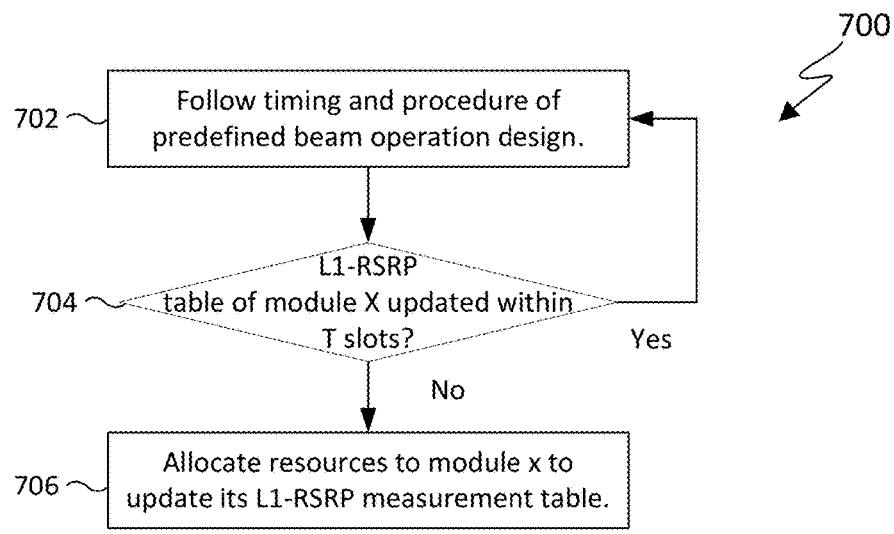
FIG. 7 illustrates a flowchart for allocating resources to another antenna panel during a sweeping period of a serving antenna panel in accordance with various embodiments of this disclosure.

FIG. 7 illustrates a flowchart for allocating resources to another antenna panel during a sweeping period of a serving antenna panel in accordance with various embodiments of this disclosure. Operations of flowchart 700 can be implemented in a UE, such as UE 116 in FIG. 3.

Flowchart 700 begins at operation 702 where the timing and procedure of the predefined beam operation design is followed. In operation 704 a determination is made as to whether the L1-RSRP measurement table of an antenna panel X has been updated within T slots. If the L1-RSRP measurement table of the antenna panel X has been updated within T slots, then flowchart 700 returns to operation 702. If the L1-RSRP measurement table of the antenna panel X has not been updated within T slots, then flowchart 700 proceeds from operation 704 to operation 706 where resources are allocated to antenna panel X to update its L1-RSRP measurement table.

To implement the operations of flowchart 700, a timer can be defined, e.g., T, to indicate when the L1-RSRP measurement table for a given module should be updated. Thus, if the L1-RSRP measurement table of a given antenna module X has not been updated in T slots since the last update, the UE can allocate necessary resources for the given antenna module X to update its L1-RSRP measurement table. As a result, at any module switching boundary, the L1-RSRP measurement table of the target module may not be very obsolete/outdated because the L1-RSRP measurement table was updated according to the predefined timer. Less resources, however, are allocated the current serving module, which may result in average data channel RSRP loss.

Figure 8A:
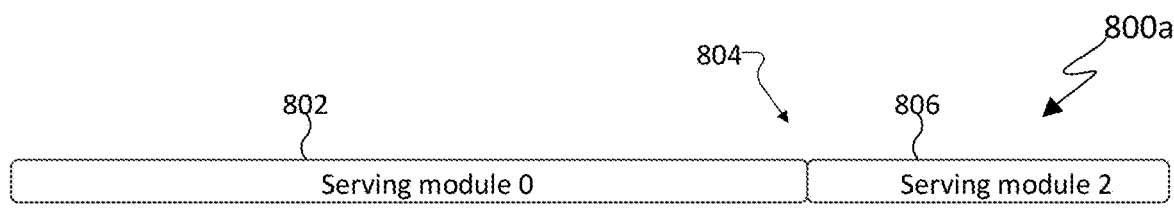
FIG. 8A illustrates a timeline for switching between a serving antenna panel and a target antenna panel.

FIG. 8A illustrates switching timeline between a serving antenna panel and a target antenna panel. Timeline 800a depicts a first time period 802 during which serving module 0 operates. At module switching boundary 804, serving module 2 begins operation and continues operating throughout time period 806. At the module switching boundary 804, the L1-RSRP measurement table of antenna module 2 can be outdated and the time needed to take measurements for updating the L1-RSRP table can result in a temporary link outage.

Figure 8B:
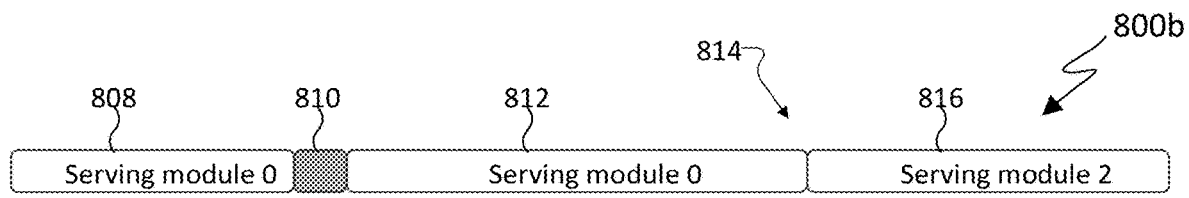
FIG. 8B illustrates a timeline for switching between a serving antenna panel and a target antenna panel in accordance with various embodiments of this disclosure.

FIG. 8B illustrates a timeline for switching between a serving antenna panel and a target antenna panel in accordance with various embodiments of this disclosure, and in particular, to the embodiment described in FIG. 7. Timeline 800b depicts a first time period 808 during which serving module 0 operates. At module switching boundary 814, serving module 2 begins operation and continues operating throughout time period 816. Time period 810 is a measurement period in which resources are allocated to antenna module 2 to allow antenna module 2 to take measurements and update its L1-RSRP measurement table. As indicated in flowchart 700, resources are allocated to antenna module 2 if its L1-RSRP measurement table has not been updated within T slots since the last update. At the module switching boundary 814, the L1-RSRP measurement table of antenna module 2 may not be outdated.

In some embodiments, the severity of the link outage can be reduced by switching, at the module switching boundary or shortly thereafter, to the first beam in the L1-RSRP measurement table of the target antenna module which can provide a satisfactory communications link.

Figure 9:
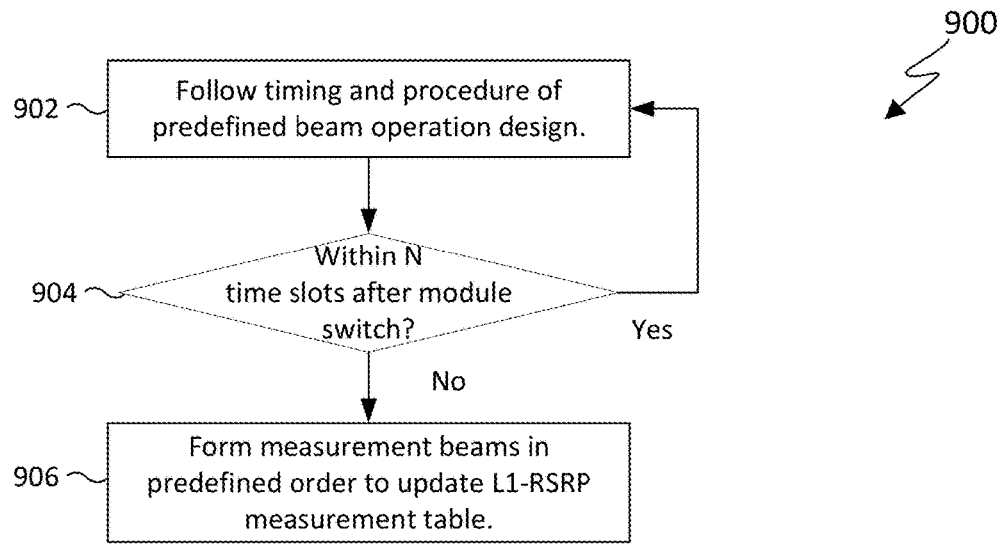
FIG. 9 illustrates a flowchart for updating a beam measurement table based on reordered beams in accordance with various embodiments of this disclosure.

FIG. 9 illustrates a flowchart for updating a beam measurement table based on reordered beams in accordance with various embodiments of this disclosure. Operations of flowchart 900 can be implemented in a UE, such as UE 116 in FIG. 3.

Flowchart 900 begins at operation 902 by following the timing and procedure of a predefined beam operation design. In operation 904 a determination is made as to whether a current time is within N time slots after the module switching boundary. If the current time is not within N time slots after the module switching boundary, then flowchart 900 returns to operation 902. However, if the current time is within N time slots after the module switching boundary, then flowchart 900 proceeds to operation 906 where measurement beams are formed in a predefined order to update the L1-RSRP measurement table.

At module switching boundaries, e.g., within N time slots after the module switch, the measurement beams formed to update the L1-RSRP measurement table are probed by the UE in a predefined and optimized order in time. The measurement beams that are "most likely" match with the current channel condition are first formed and measured. In some embodiments, the first measurement beam that can provide a satisfactory communications link is used for data communications to reduce delay. By doing so, both the BS and the UE may be able to quickly identify the correct TX and RX beams to use, which in turn, could avoid big data channel RSRP loss for a relatively long period of time, and therefore, severe link outage.

Figure 10A:
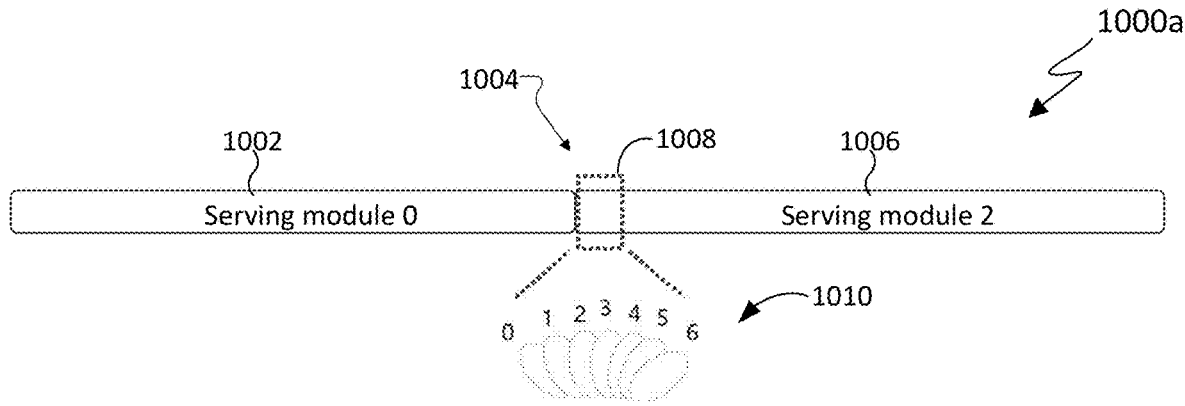
FIG. 10A illustrates a timeline for switching between a serving antenna panel and a target antenna panel.

FIG. 10A illustrates a timeline for switching between a serving antenna panel and a target antenna panel. Timeline 1000a depicts a first time period 1002 during which serving module 0 operates. At module switching boundary 1004, serving module 2 begins operation and continues operating throughout time period 1006. At the module switching boundary 1004, the L1-RSRP measurement table of antenna module 2 can be outdated and the time needed to take measurements for updating the L1-RSRP table can result in a temporary link outage. During time period 1008, which is within N time slots after the module switch, the beams 1010 in the L1-RSRP measurement table for serving module 2 are sequentially ordered.

Figure 10B:
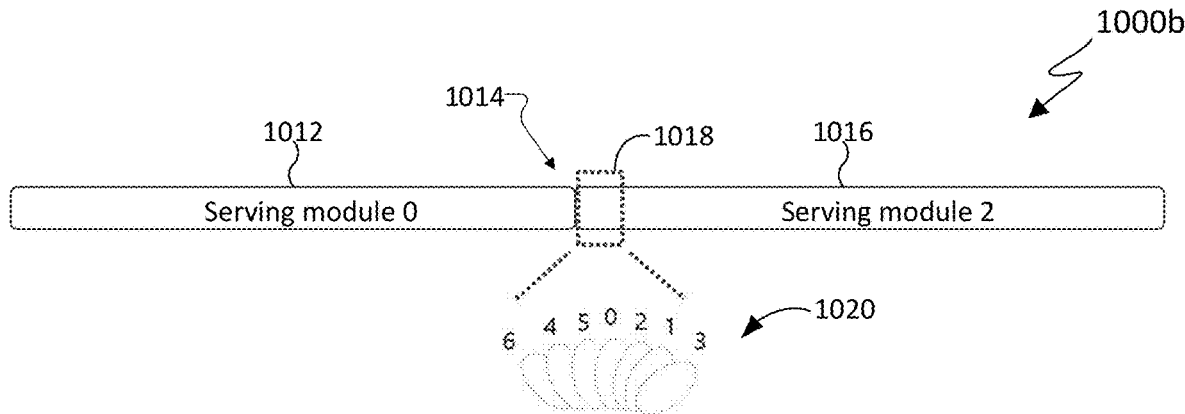
FIG. 10B illustrates a timeline for switching between a serving antenna panel and a target antenna panel in accordance with various embodiments of this disclosure.

FIG. 10B illustrates a timeline for switching between a serving antenna panel and a target antenna panel in accordance with various embodiments of this disclosure, and in particular, to the embodiment described in FIG. 9. Timeline 1000b depicts a first time period 1012 during which serving module 0 operates. At module switching boundary 1014, serving module 2 begins operation and continues operating throughout time period 1016. During time period 1018, which is within N time slots after the module switch, the beams 1020 in the L1-RSRP measurement table can be re-ordered to allow quicker identification of a preferred Tx and Tx beam, which can reduce the severity of a link outage. Examples for reordering the beams in the L1-RSRP table are discussed in FIGS. 11 and 12 that follow.

Figure 11:
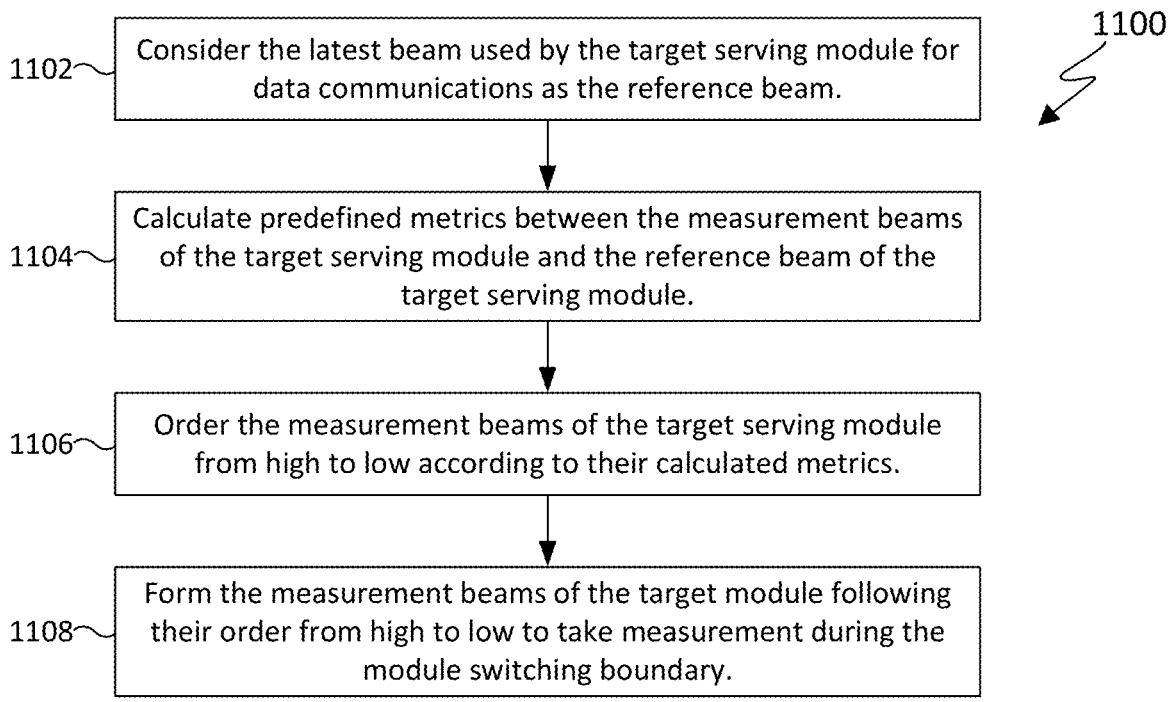
FIG. 11 illustrates a flowchart for determining an order of beams for updating a beam measurement table in accordance with various embodiments of this disclosure.

FIG. 11 illustrates a flowchart for determining an order of beams for updating a beam measurement table in accordance with various embodiments of this disclosure. Operations of flowchart 1100 can be implemented in a UE, such as UE 116 in FIG. 3.

Flowchart 1100 begins at operation 1102 by considering the latest beam used by the target serving module for data communications as a reference beam. In operation 1104, predefined metrics are calculated between the measurement beams of the target serving module and the reference beam of the target serving module. Non-limiting examples of predefined metrics can include correspondence to angular distance on the sphere, overlap in beam pattern, etc.

In operation 1106, the measurement beams of the target serving module are ordered based on their calculated metrics. For instance, if the metric is the angular distance on the sphere, the measurement beam that has the smallest metric would be ranked with the highest order, and similarly, the measurement beam that has the largest metric would be ranked with the lowest order.

In operation 1108, measurement beams of the target serving module are formed based on the order determined in operation 1106. At the module switching boundary, within time period 1018, the measurement beams are probed by the UE sequentially in time, from the highest order to the lowest. In one embodiment, the first measurement beam that provides the desired link quality can be used for communications by the target serving module.

Figure 12:
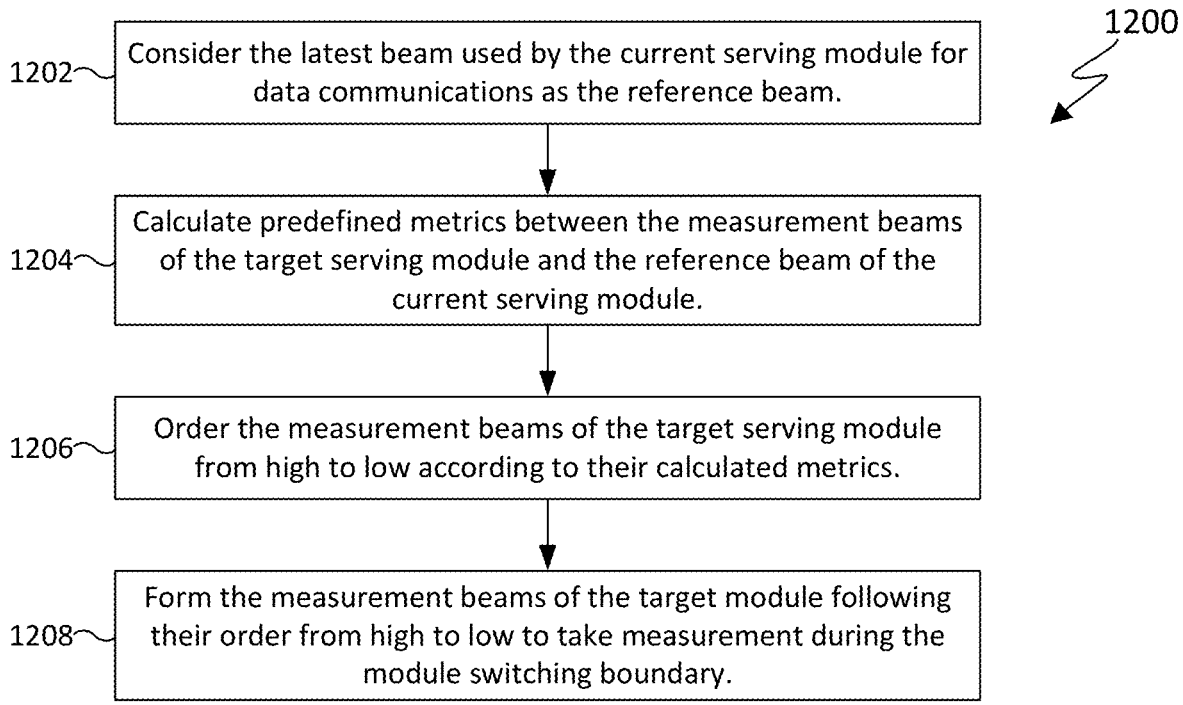
FIG. 12 illustrates yet another flowchart for determining an order of beams for updating a beam measurement table in accordance with various embodiments of this disclosure.

FIG. 12 illustrates yet another flowchart for determining an order of beams for updating a beam measurement table in accordance with various embodiments of this disclosure. Operations of flowchart 1200 can be implemented in a UE, such as UE 116 in FIG. 3.

Flowchart 1200 begins at operation 1202 by considering the latest beam used by the current serving module for data communications as a reference beam. In operation 1204, predefined metrics are calculated between the measurement beams of the target serving module and the reference beam of the current serving module. Non-limiting examples of predefined metrics can include correspondence to angular distance on the sphere, overlap in beam pattern, etc.

In operation 1206, the measurement beams of the target serving module are ordered based on their calculated metrics. For instance, if the metric is the angular distance on the sphere, the measurement beam that has the smallest metric would be ranked with the highest order, and similarly, the measurement beam that has the largest metric would be ranked with the lowest order.

In operation 1208, measurement beams of the target serving module are formed based on the order determined in operation 1206. At the module switching boundary, within time period 1018, the measurement beams are probed by the UE sequentially in time, from the highest order to the lowest. In one embodiment, the first measurement beam that provides the desired link quality can be used for communications by the target serving module. In one embodiment, the first measurement beam that provides the desired link quality can be used for communications by the target serving module.

Figure 13:
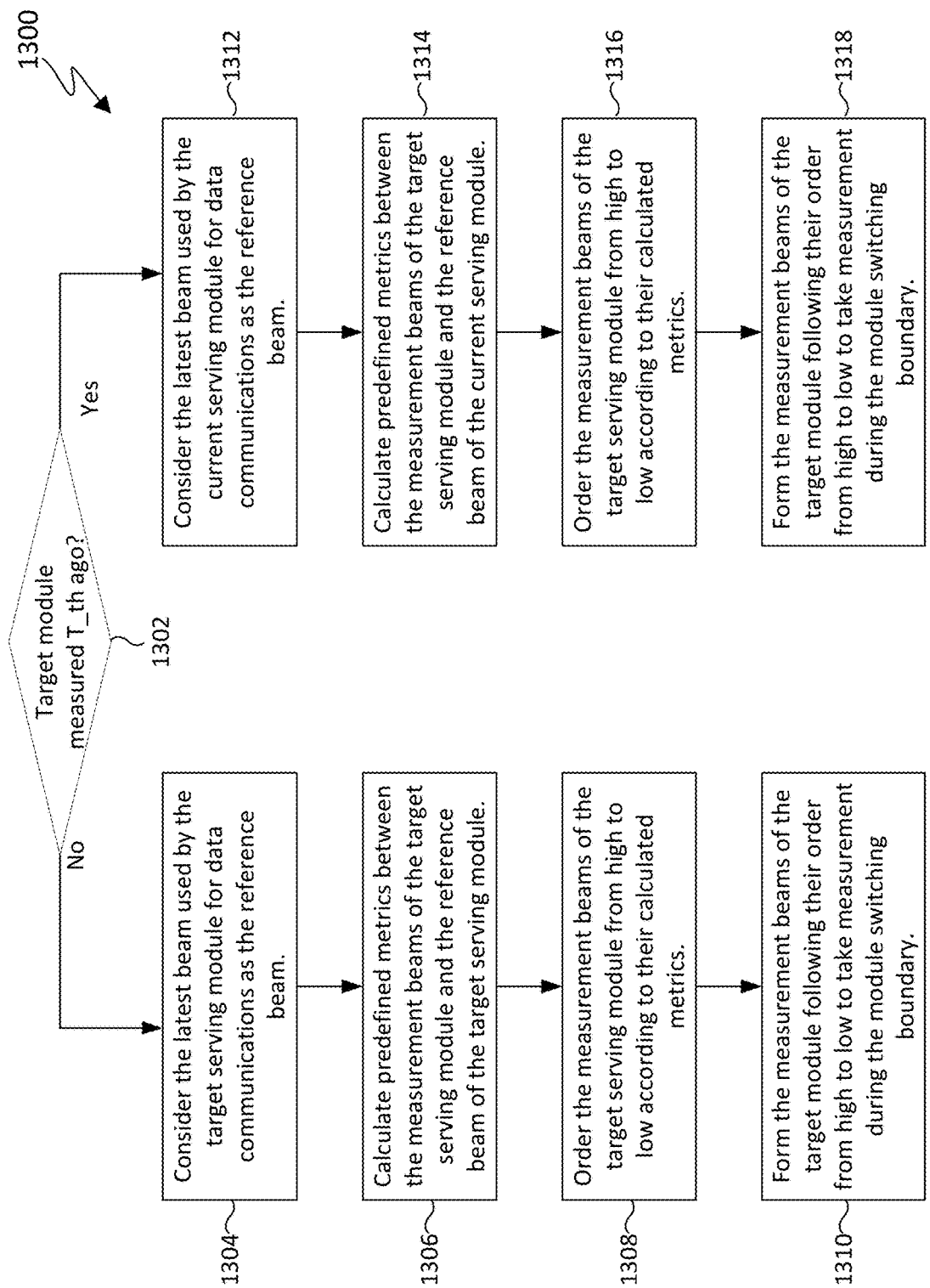
FIG. 13 illustrates yet another flowchart for determining an order of beams for updating a beam measurement table in accordance with various embodiments of this disclosure.

FIG. 13 illustrates yet another flowchart for determining an order of beams for updating a beam measurement table in accordance with various embodiments of this disclosure. Operations of flowchart 1300 can be implemented in a UE, such as UE 116 in FIG. 3.

Flowchart 1300 incorporates the operations in flowcharts 1100 and 1200 but includes a timing condition to differentiate which reference beam to select. Thus, flowchart 1300 begins at operation 1302 by determining whether the target serving module has been measured within a time T_th.

If the target serving module has not been measured within the time T_th, then flowchart 1300 proceeds to operation 1304 where the latest beam used by the target serving module for data communications is considered as a reference beam. In operation 1306, predefined metrics are calculated between the measurement beams of the target serving module and the reference beam of the target serving module. In operation 1308, the measurement beams of the target serving module are ordered based on their calculated metrics. In one embodiment, the measurement beams are ordered from high to low. In another embodiment, the order can be reversed.

In operation 1310, measurement beams of the target serving module are formed based on the order determined in operation 1308. After the module switching boundary, e.g., within N time slots after the module switching boundary, measurements can be taken on the reordered measurement beams. In one embodiment, the first measurement beam that provides the desired link quality can be used for communications by the target serving module.

Returning to operation 1302, if the target module has been measured within the time T_th, then flowchart 1300 proceeds to operation 1312 where the latest beam used by the current serving module for data communications is considered as a reference beam. In operation 1314, predefined metrics are calculated between the measurement beams of the target serving module and the reference beam of the current serving module. In operation 1316, the measurement beams of the target serving module are ordered based on their calculated metrics. In one embodiment, the measurement beams are ordered from high to low. In another embodiment, the order can be reversed. In operation 1318, measurement beams of the target serving module are formed based on the order determined in operation 1316. After the module switching boundary, e.g., within N time slots after the module switching boundary, measurements can be taken on the reordered measurement beams. In one embodiment, the first measurement beam that provides the desired link quality can be used for communications by the target serving module.

In flowchart 1300, if the target module's L1-RSRP measurement table was last updated less than T_th ago, the assumption is that some prior information/knowledge of the target serving module was not completely outdated and can be exploited.

Figure 14:
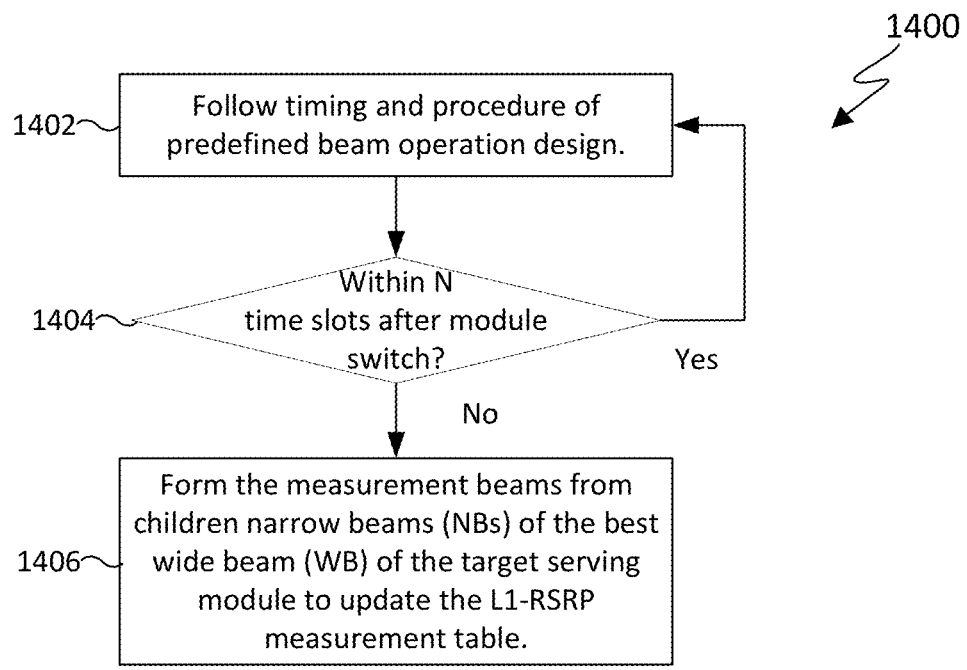
FIG. 14 illustrates a flowchart for updating a beam management table using narrow beams of the best wide beam in accordance with various embodiments of this disclosure.

FIG. 14 illustrates a flowchart for updating a beam management table using narrow beams of the best wide beam in accordance with various embodiments of this disclosure. Operations of flowchart 1400 can be implemented in a UE, such as UE 116 in FIG. 3.

Flowchart 1400 begins at operation 1402 by following the timing and procedure of a predefined beam operation design. In operation 1404 a determination is made as to whether a current time is within N time slots after the module switching boundary. If the current time is not within N time slots after the module switching boundary, then flowchart 1400 returns to operation 1402. However, if the current time is within N time slots after the module switching boundary, then flowchart 1400 proceeds to operation 1406 where children beams are formed from the narrow beams of the best wide beam of the target serving module to update the L1-RSRP measurement table. In one embodiment, at the module switching boundary, the UE forms narrow band children beams of the best wide beam of the target serving module as determined during the module sweeping period to update the L1-RSRP measurement table.

A high probability exists that the measurement beams formed during the module switching boundary match with the current channel condition. Hence, the corresponding selected TX beam at the base station and the RX beam at the UE for data communications would result in good link quality.

The embodiment described in FIG. 14 differs from the embodiment described in FIG. 9 in that no prior information of either the target serving module or the current serving module (e.g., the selection of the reference beam) is exploited. However, the sweeping order of the children beams of the selected WB can be further optimized following the strategies proposed in FIG. 9.

Figure 15A:
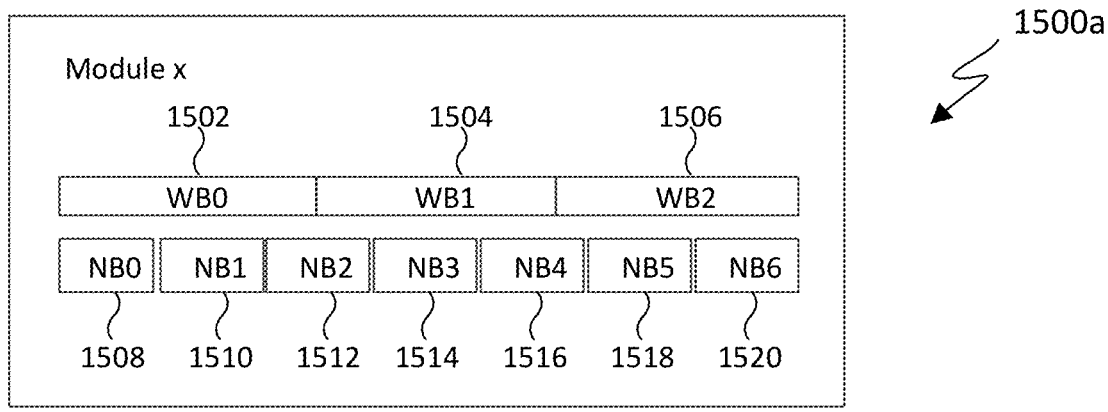
FIG. 15A illustrates a beam structure for an antenna module.

FIG. 15A illustrates a beam structure for an antenna module. The beam structure for antenna module X 1500*a* includes wide beams 1502, 1504, and 1506 that are operated independently from narrow beams 1508, 1510, 1512, 1514, 1516, 1518, and 1520.

Figure 15B:
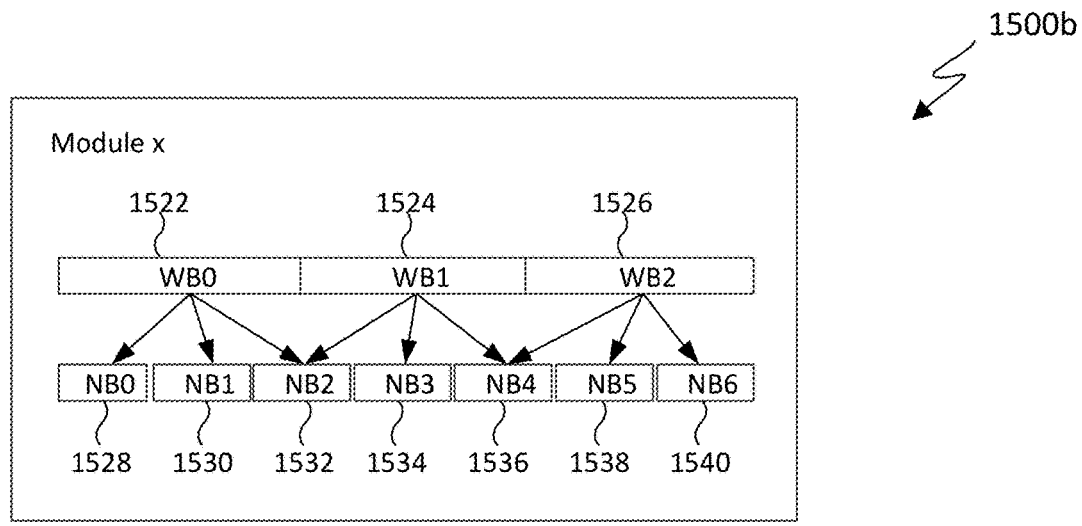
FIG. 15B illustrates a hierarchical structure for use in updating a beam measurement table in accordance with various embodiments of this disclosure.

FIG. 15B illustrates a hierarchical structure for use in updating a beam measurement table in accordance with various embodiments of this disclosure, and in particular to the embodiment described in FIG. 14. The hierarchical beam structure for module X 1500*b* includes wide beams 1522, 1524, and 1526 in a hierarchical relationship with one or more narrow beams. For example, wide beam 1522 is associated with narrow beams 1528, 1530, and 1532; wide beam 1524 is associated with narrow beams 1532, 1534, and 1536; and wide beam 1526 is associated with narrow beams 1536, 1538, and 1540. The hierarchal relationship can be used to select one or more narrow beams after a module switching boundary as previously discussed.

Figure 16:
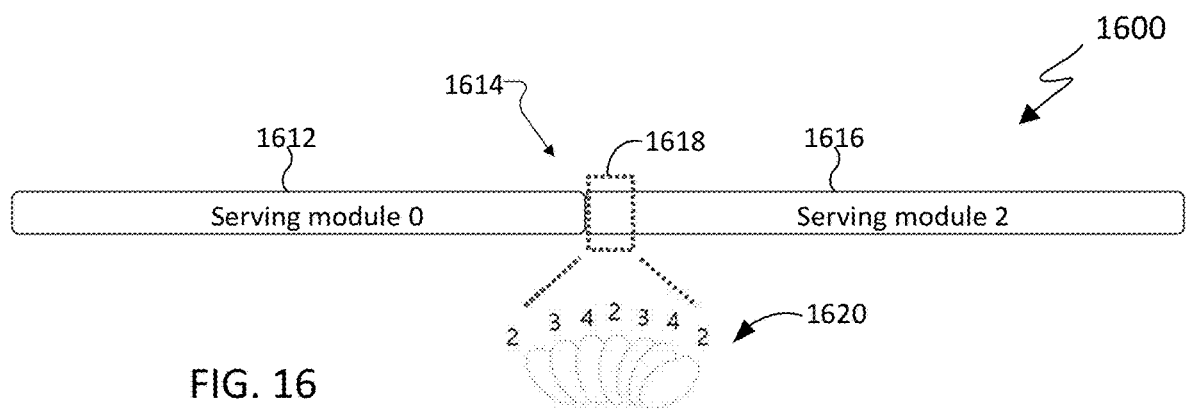
FIG. 16 illustrates a timeline for switching between a serving antenna panel and a target antenna panel in accordance with various embodiments of this disclosure.

FIG. 16 illustrates a timeline for switching between a serving antenna panel and a target antenna panel in accordance with various embodiments of this disclosure, and in particular, to the embodiment described in FIG. 14. The timeline for switching between a serving antenna panel and target antenna panel was depicted in FIG. 10A and, for the sake of brevity, will not be reproduced.

Timeline 1600 depicts a first time period 1612 during which serving module 0 operates. At module switching boundary 1614, serving module 2 begins operation and continues operating throughout time period 1616. During time period 1618, which is within N time slots after the module switch, the beams 1620 in the L1-RSRP measurement table that are measured and updated can be limited to the children beams of the best wide band module of antenna module 2 that were determined during an earlier sweeping period. In this example in FIG. 16, the children beams 1532, 1534, and 1536 of wide beam 1524 are identified for measurement.

Figure 17:
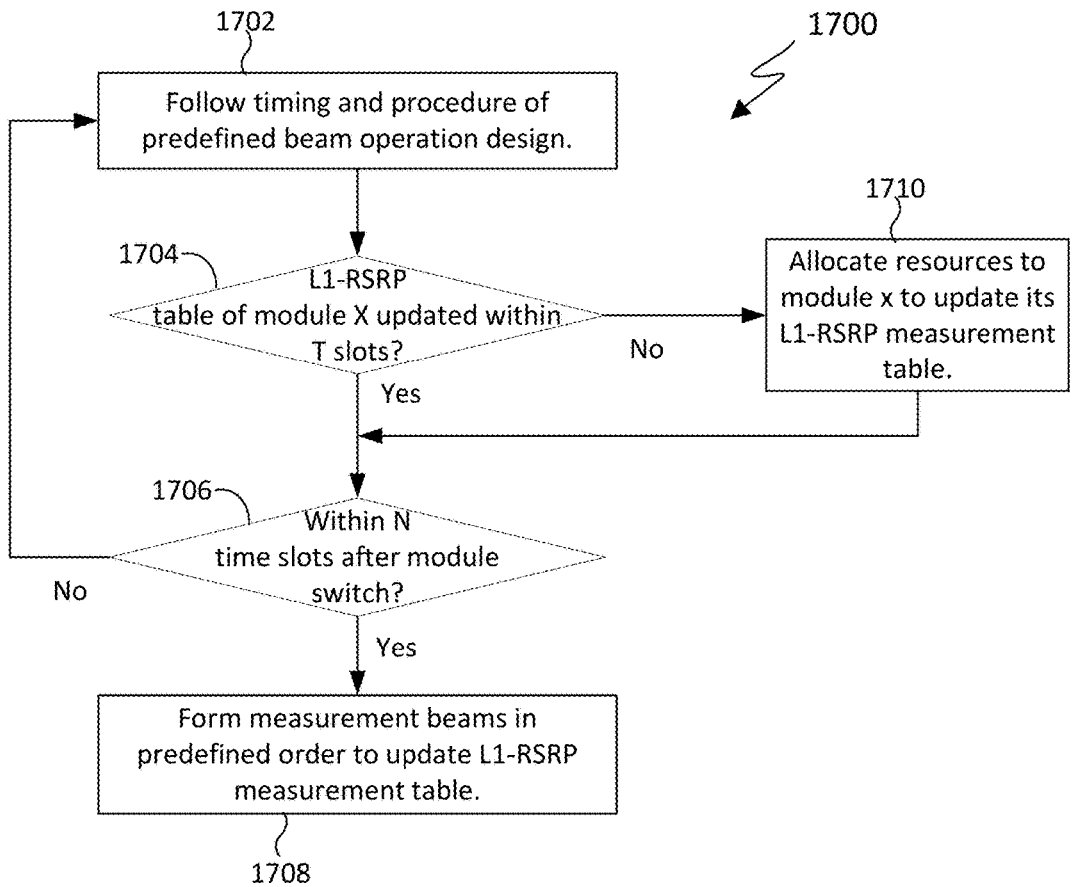
FIG. 17 illustrates a flowchart for updating a beam measurement table in accordance with various embodiments of this disclosure.

FIG. 17 illustrates a flowchart for updating a beam measurement table in accordance with various embodiments of this disclosure. Operations of flowchart 1700 can be implemented in a UE, such as UE 116 in FIG. 3.

Flowchart 1700 begins at operation 1702 by following the timing and procedure of a predefined beam operation design. In operation 1704 a determination is made as to whether the L1-RSRP measurement table of antenna module X has been updated within T slots. If the L1-RSRP measurement table of antenna module X has been updated within T slots, then flowchart 1700 proceeds to operation 1706 where another determination is made as to whether a current time is within N time slots after an antenna module switch. If the current time is within N time slots after an antenna module switch, then flowchart 1700 proceeds to operation 1708 to form measurement beams in a predefined order to update the L1-RSRP measurement table. However, if the current time is not within N time slots after an antenna module switch, then flowchart 1700 returns to operation 1702.

Returning to operation 1704, if the determination is made that the L1-RSRP measurement table of antenna module X has not been updated within T slots, then flowchart 1700 proceeds to operation 1710 where resources are allocated to module X to update its L1-RSRP measurement table before returning to operation 1706.

Figure 18:
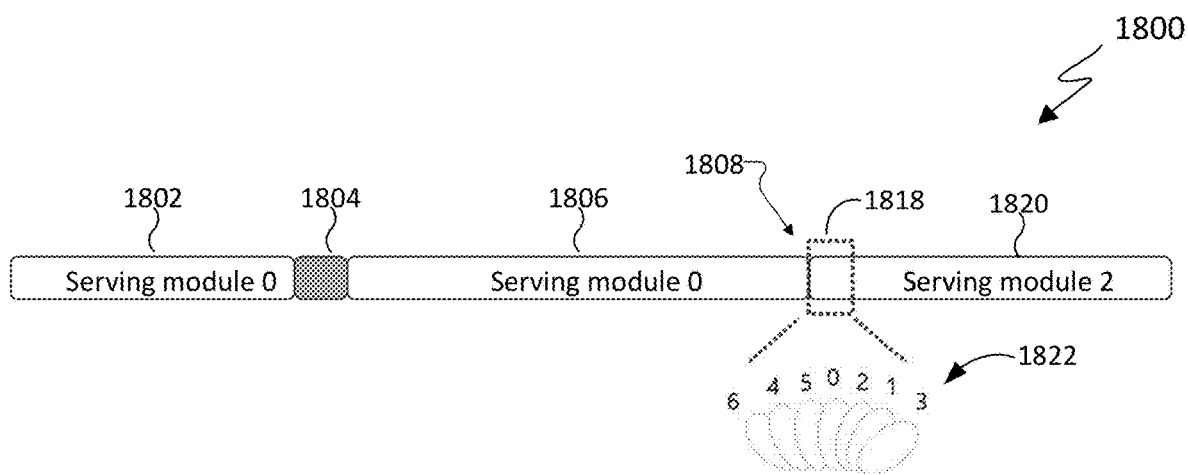
FIG. 18 illustrates a timeline for switching between a serving antenna panel and a target antenna panel in accordance with various embodiments of this disclosure.

FIG. 18 illustrates a timeline for switching between a serving antenna panel and a target antenna panel in accordance with various embodiments of this disclosure, and in particular, to the embodiment described in FIG. 17. The timeline for switching between a serving antenna panel and target antenna panel was depicted in FIG. 10A and, for the sake of brevity, will not be reproduced.

Timeline 1800 depicts a first time period 1802 during which serving module 0 operates. At module switching boundary 1808, serving module 2 begins operation and continues operating throughout time period 1820. Time period 1804 is a measurement period in which resources are allocated to antenna module 2 to allow antenna module 2 to take measurements and update its L1-RSRP measurement table. As indicated in flowchart 1700, resources are allocated to antenna module 2 if its L1-RSRP measurement table has not been updated within T slots since the last update. During time period 1818, which is within N time slots after the module switch, the beams 1822 in the L1-RSRP measurement table can be reordered based on measurements taken during the measurement period 1804. In some embodiments, the severity of the link outage can be reduced by switching, at the module switching boundary or shortly thereafter, to the first beam in the L1-RSRP measurement table of the target antenna module which can provide a satisfactory communications link.

Figure 19:
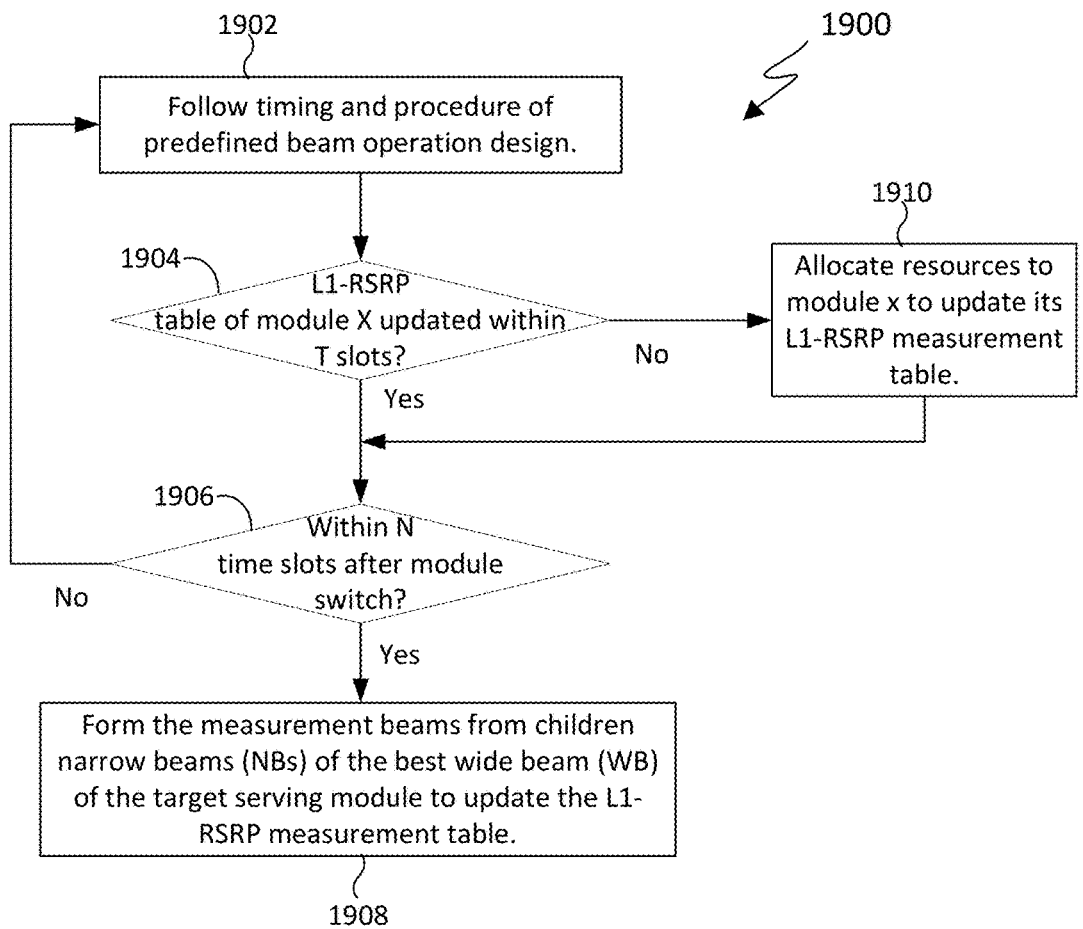
FIG. 19 illustrates another flowchart for updating a beam measurement table in accordance with various embodiments of this disclosure.

FIG. 19 illustrates a flowchart for updating a beam measurement table in accordance with various embodiments of this disclosure. Operations of flowchart 1900 can be implemented in a UE, such as UE 116 in FIG. 3.

Flowchart 1900 begins at operation 1902 by following the timing and procedure of a predefined beam operation design. In operation 1904 a determination is made as to whether the L1-RSRP measurement table of antenna module X has been updated within T slots. If the L1-RSRP measurement table of antenna module X has been updated within T slots, then flowchart 1900 proceeds to operation 1906 where another determination is made as to whether a current time is within N time slots after an antenna module switch. If the current time is within N time slots after an antenna module switch, then flowchart 1900 proceeds to operation 1908 to form measurement beams from children narrow beams of the best wide beam of the target serving module to update the L1-RSRP measurement table. However, if the current time is not within N time slots after an antenna module switch, then flowchart 1900 returns to operation 1902.

Returning to operation 1904, if the determination is made that the L1-RSRP measurement table of antenna module X has not been updated within T slots, then flowchart 1900 proceeds to operation 1910 where resources are allocated to module X to update its L1-RSRP measurement table before returning to operation 1906.

Figure 20:
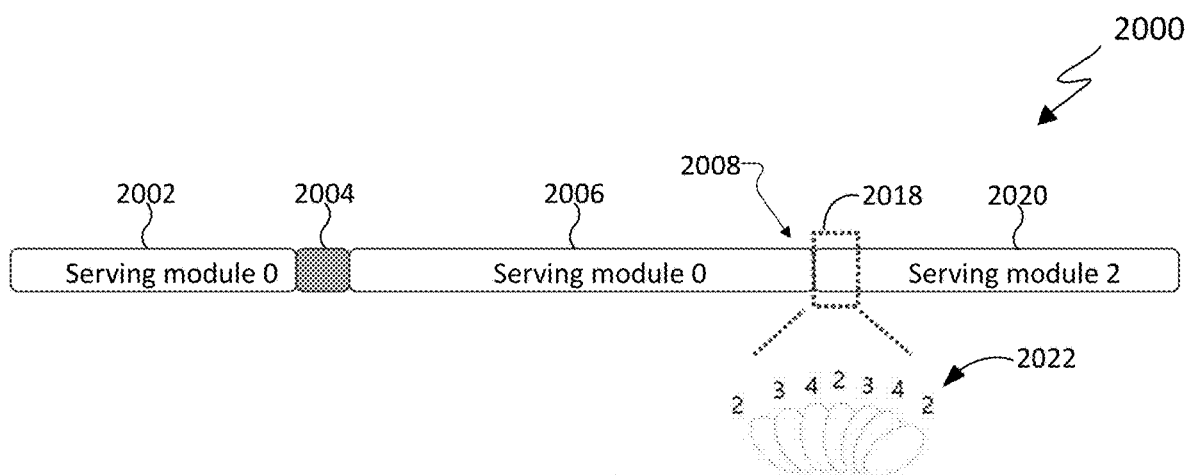
FIG. 20 illustrates a timeline for switching between a serving antenna panel and a target antenna panel in accordance with various embodiments of this disclosure.

FIG. 20 illustrates a timeline for switching between a serving antenna panel and a target antenna panel in accordance with various embodiments of this disclosure, and in particular, to the embodiment described in FIG. 19.

The timeline for switching between a serving antenna panel and target antenna panel was depicted in FIG. 10A and, for the sake of brevity, will not be reproduced.

Timeline 2000 depicts a first time period 2002 during which serving module 0 operates. At module switching boundary 2008, serving module 2 begins operation and continues operating throughout time period 2020. Time period 2004 is a measurement period in which resources are allocated to antenna module 2 to allow antenna module 2 to take measurements and update its L1-RSRP measurement table. As indicated in flowchart 1900, resources are allocated to antenna module 2 if its L1-RSRP measurement table has not been updated within T slots since the last update. During time period 2018, which is within N time slots after the module switch, the beams 2022 in the L1-RSRP measurement table that are measured and updated can be limited to the children beams of the best wide band module of antenna module 2 that were determined during the measurement period 2004. In some embodiments, the severity of the link outage can be reduced by switching, at the module switching boundary or shortly thereafter, to the first beam in the L1-RSRP measurement table of the target antenna module which can provide a satisfactory communications link.

Figure 21:
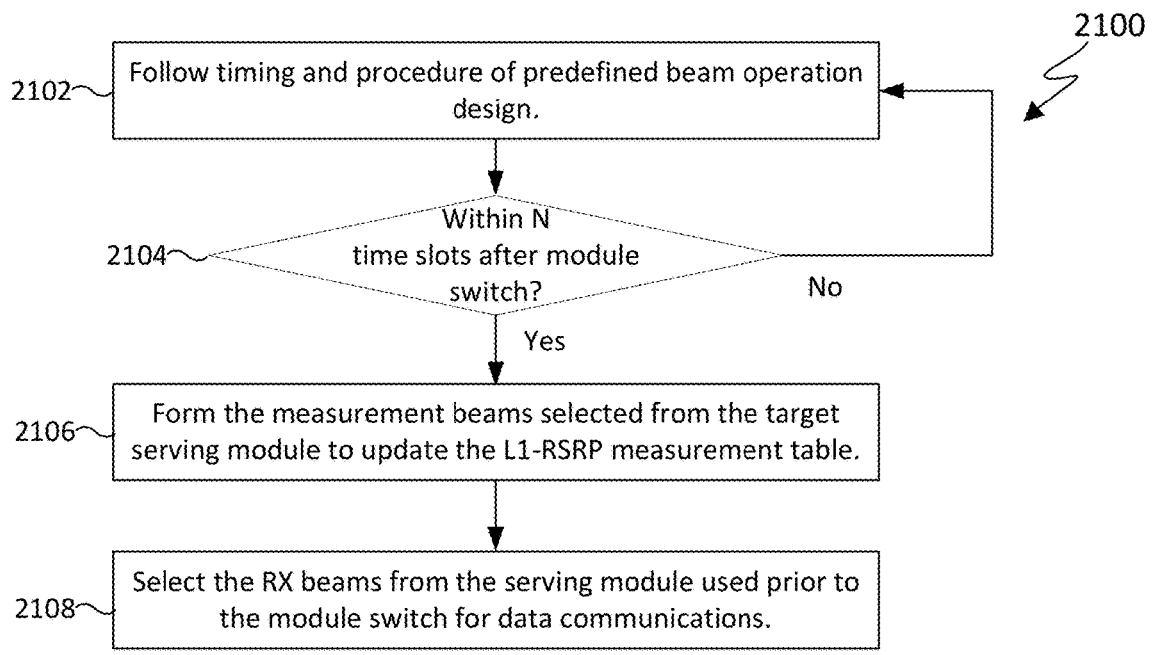
FIG. 21 illustrates a flowchart for switching between a serving antenna panel and a target antenna panel in accordance with various embodiments of this disclosure.

FIG. 21 illustrates a flowchart for switching between a serving antenna panel and a target antenna panel in accordance with various embodiments of this disclosure. Operations of flowchart 2100 can be implemented in a UE, such as UE 116 in FIG. 3.

Flowchart 2100 begins at operation 2102 by following the timing and procedure of predefined beam operation design. In operation 2104 a determination is made as to whether a current time is within N time slots after an antenna module switch. If the current time is not within N time slots after an antenna module switch, then flowchart 2100 returns to operation 2102. However, if the current time is within N time slots after an antenna module switch, then flowchart 2100 proceeds to operation 2106 to form measurement beams selected from the target serving module to update the L1-RSRP measurement table. In operation 2108, receive beams for data communications are selected from the serving module used prior to the antenna module switch.

By using the receive beams from the prior serving module for data communications, severe link outage due to obsolete measurement information of the target serving module can be avoided as long as the receive beams from the prior serving module can still provide reasonable link performance. After full update of the measurement information of the target serving module, then the receive beams from the target serving module can be used for data communications.

Figure 22A:
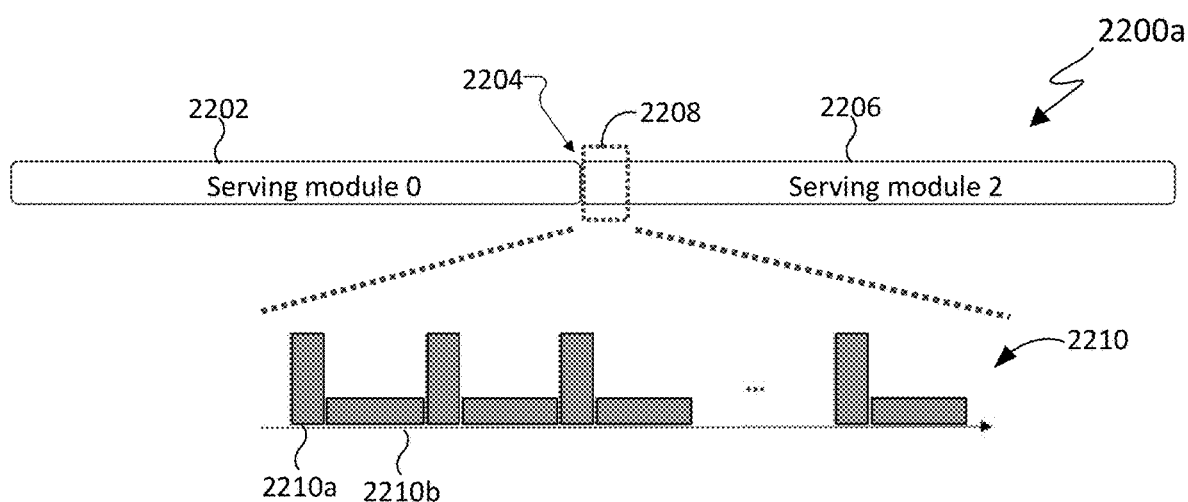
FIG. 22A illustrates a switching timeline between a serving antenna panel and a target antenna panel.

FIG. 22A illustrates a switching timeline between a serving antenna panel and a target antenna panel. Timeline 2200*a* depicts a first time period 2202 during which a serving antenna module 0 operates. At module switching boundary 2204, serving antenna module 2 begins operation and continues operating throughout time period 2206. During time period 2208, which is within N time slots after the module switch, beams 2210 of serving module 2 are used for measurement and data communication. In particular, measurement beams 2210*a* from serving antenna module 2 are used for updating the L1-RSRP measurement table of serving antenna module 2. Receive beams 2210*b* from serving antenna module 2 are used for data communication.

Figure 22B:
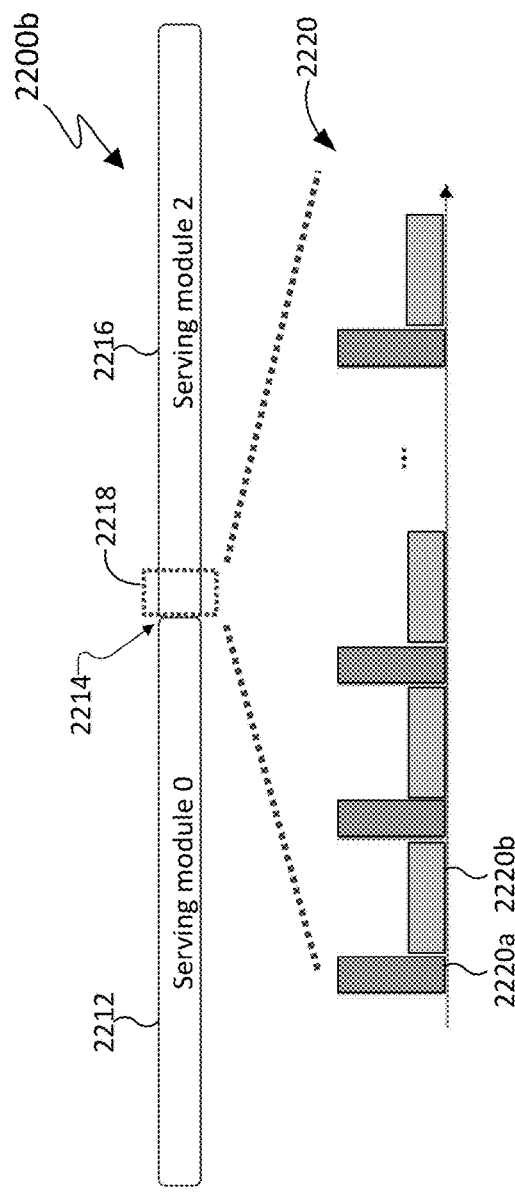
FIG. 22B illustrates a timeline for switching between a serving antenna panel and a target antenna panel in accordance with various embodiments of this disclosure.

FIG. 22B illustrates a timeline for switching between a serving antenna panel and a target antenna panel in accordance with various embodiments of this disclosure, and in particular, to the embodiment described in FIG. 21. Timeline 2200*b* depicts a first time period 2212 during which a serving antenna module 0 operates. At module switching boundary 2214, serving antenna module 2 begins operation and continues operating throughout time period 2216. During time period 2218, which is within N time slots after the module switch, beams 2210 are used for measurement and data communication. However, measurement beams 2220*a* from serving antenna module 2 are used for updating the L1-RSRP measurement table of antenna module 2 and receive beams 2220*b* from previous antenna serving module 0 are used for data communication.

Receive Beam Management at the Mobile Terminal

As previously discussed, TCI state switches can result in undesirable communication outages at the UE. Thus, various embodiments of this disclosure describe several fast yet effective receive beam selection/operation strategies for unknown TCI state switches. Besides the strict known conditions defined in the 3GPP TS 38.133 for a given TCI state, several other practical conditions that can better characterize the target TCI state status are implemented at the UE along with their corresponding receive beam selection/operation strategies.

For instance, by definition, if the last measurement of a TCI state is more than X ms ago (e.g., more than 1280 milliseconds ago) or the SNR for the target TCI state is below a given threshold Th_0, the UE may not be able to directly determine the receive beam to use for the target/switched TCI state, but rather have to perform an exhaustive search over a certain number of beam codewords in the beam codebook to identify the receive beam for the TCI state of interest. In one aspect of this disclosure, the UE could first break the unknown conditions for a given TCI state down into several sub-conditions or one or more of their combinations. The UE may then use different types of beams (e.g., different beamwidths, radiation patterns, beam patterns and etc.) and different receive beam selection strategies for different sub-conditions or one or more of their combinations. For example, if the SNR for the target/switched TCI state is below Th_0, the TCI state of interest is unknown to the UE by definition. In this case, the UE could have performed the last measurement of the target TCI state either more than X ms ago, or less than X ms ago. If the last measurement of the target TCI state is less than X ms ago, the UE could use the receive beam that has the correspondence to the target TCI state, or their steering direction as the reference receive beam or the reference direction. By correspondence, the reference receive beam may result in the highest, second highest, third highest or fourth highest (may be up to the eighth highest) received signal power when receiving the data packets from the target TCI, e.g., TCIx, during the past measurement period.

Figure 23:
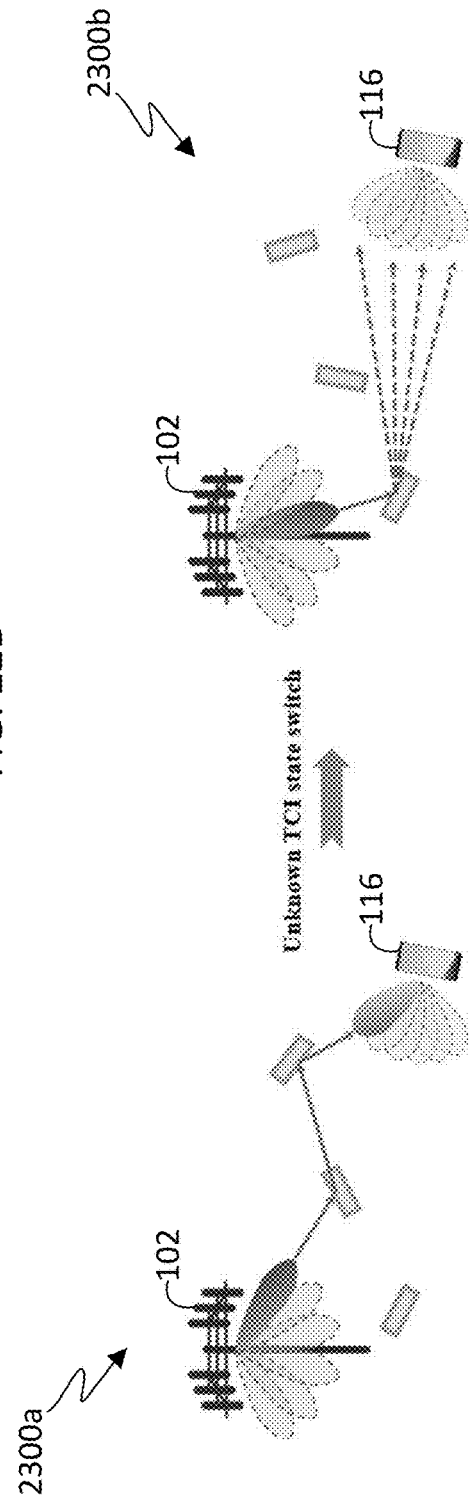
FIG. 23 illustrates an unknown TCI state switch in accordance with various embodiments of this disclosure.

FIG. 23 illustrates an unknown TCI state switch in accordance with various embodiments of this disclosure. In communications system 2300a, UE 116 communicates with BS 102 on a known TCI state. In communications system 2300b, BS 102 switches the TCI state, but the TCI state is unknown to UE 116. When the TCI state is unknown to UE 116, then a search for a corresponding receive beam for the TCI state of interest is performed, which can lead to a communication outage.

FIG. 24 illustrates a comparison of a receive beam search over an entire angular space with a receive beam search over a confined area in accordance with various embodiments of this disclosure. In particular, angular search space 2400a is the full angular search space that can be searched by UE 116 when determining a receive beam for a target TCI state. Angular search space 2400b is a confined search space that surrounds a reference receive beam/direction or spans an angular range. By selecting/forming a relatively small number of beams with relatively small beamwidth surrounding a reference receive beam (or reference direction), or covering a confined angular range, the search complexity and delay can be reduced.

In another embodiment of this disclosure, the UE could also adaptively configure the conditions for the unknown TCI state according to the channel condition and/or other system information. This technique may be useful in a dynamic environment such that the propagation channel condition may change fast due to various mobility settings. For instance, the channel could be highly correlated during a certain amount of time, e.g., with large channel coherence time, but independent during another period of time. In these scenarios, using fixed cutoff thresholds to characterize the obsolete status (X ms) or the detectability (Th_0 for SNR) of the target TCI state may not be a viable solution to achieve promising performance. Hence, in another aspect, the UE can adjust the known/unknown conditions used to characterize a TCI state based on the past measurement, channel condition and other necessary system information, and optimize the receive beam selection/operation strategies accordingly. For example, the UE could first define a set of potential time windows, e.g., $\{X_0, X_1, \ldots, X_{T-1}\}$ ms to depict the last measurement of a TCI state instead of using a fixed time window; further, the UE could also define a set of potential SNR thresholds, e.g., $\{Th_0, Th_1, \ldots, Th_{M-1}\}$ to categorize the actual SNR for the target TCI state instead of using a fixed threshold. For one channel condition, the UE may set the known TCI state conditions as: the last measurement is within $X_2$ ms and the SNR for the target TCI state is beyond $Th_2$; for another channel condition, the UE could set the known conditions for a given TCI state as: the last measurement is within $X_0$ ms and the actual SNR for the TCI state is larger than $Th_{M-1}$. It is expected that by adaptively configuring the known/unknown conditions based on the channel condition and/or other system information, the overall receive beam search complexity and delay at the terminal can be reduced.

The millimeter-wave (mmWave) band holds promise for providing high data rates in wireless local network and fifth generation (5G) cellular network. The small carrier wavelength at mmWave frequencies enable synthesis of compact antenna arrays, providing large beamforming gains to enable favorable received signal power. Grid-of-beams (GoBs) based beam search is the de facto approach for configuring both the transmit and receive beams; variations are used in IEEE 802.11ad systems and 5G. Specifically, for a given channel condition, both the BS and the UE search over all the candidate beam codewords in their own beam codebooks, and select the best combination(s) of the transmit and receive beams to optimize a given performance metric. Such kind of exhaustive search over a large beam codebook, however, may impose significantly high power consumption, implementation complexity, and large access delay for the user terminal, not to mention that the receive beam search at the UE side appears in many essential deployment scenarios in 5G such as directional initial access, beamforming based inter-cell measurement, TCI state switch, and many mobility related configurations. To reduce the access delay, the UE can use a small beam codebook with broad beamwidth to perform the beam search. In this case, however, the corresponding link quality may become poor and the link budgets may not be satisfied especially when the receive SNR/SINR is the key design factor.

In this disclosure, several receive beam selection/operation strategies at the UE side are described, assuming that the BS triggers a TCI state switch due to link blockage, link failure and/or other design factors. The BS can send the TCI state switch command to the UE via RRC, MAC CE, DCI or other types of signaling or one or more of their combinations. Upon receiving the TCI state switch command, the UE checks whether the switched or target TCI state is known to the UE. The explicit conditions for the known TCI state are specified in the 3GPP TS38.133. In some embodiments, a TCI state is known to the UE if it has been measured by the UE at least once before, the last measurement of the target TCI state is no more than X ms ago, and the SNR for the target TCI state is beyond a given threshold, say, Th_0. In some embodiments, the TCI state is unknown to the UE if any of the above conditions does not hold.

Different receive beam operation strategies could be applied for known TCI state switch and unknown TCI state switch. For known TCI state switch, the UE could directly apply the receive beam that has the correspondence to the switched TCI state to receive the data packets. For unknown TCI state switch, the UE may have to perform beam search over a given set of candidate beams, and therefore a certain angular space, to identify the receive beam to use for the switched/target TCI state. To reduce the access delay, power consumption and implementation complexity, efficient and effective receive beam selection strategies need to be implemented at the UE, and their corresponding triggering events/conditions also need to be specified.

In one embodiment, the UE further checks the obsolete status of a target/switched TCI state, though it is unknown to the UE by definition. That is, assuming that the SNR for the target TCI state is less than Th_0 (the triggering condition for the unknown status of the target TCI state), the last measurement of the target TCI state could either be X ms ago, or less than X ms ago. The UE could apply different receive beam operation strategies based on the obsolete status of the switched TCI state. For instance, if the last measurement of the switched/target TCI state is more than X ms ago, the UE would perform a full beam search over the entire angular range or the given beam codebook to identify the receive beam for the target TCI state. Otherwise, the UE would perform the beam search over a confined angular range or a subset of the beam codebook to choose the receive beam for the target TCI state. In this example, the candidate beams to search and/or the beam selection strategies do not depend on the exact SNR value for the target TCI state.

Figure 25B:
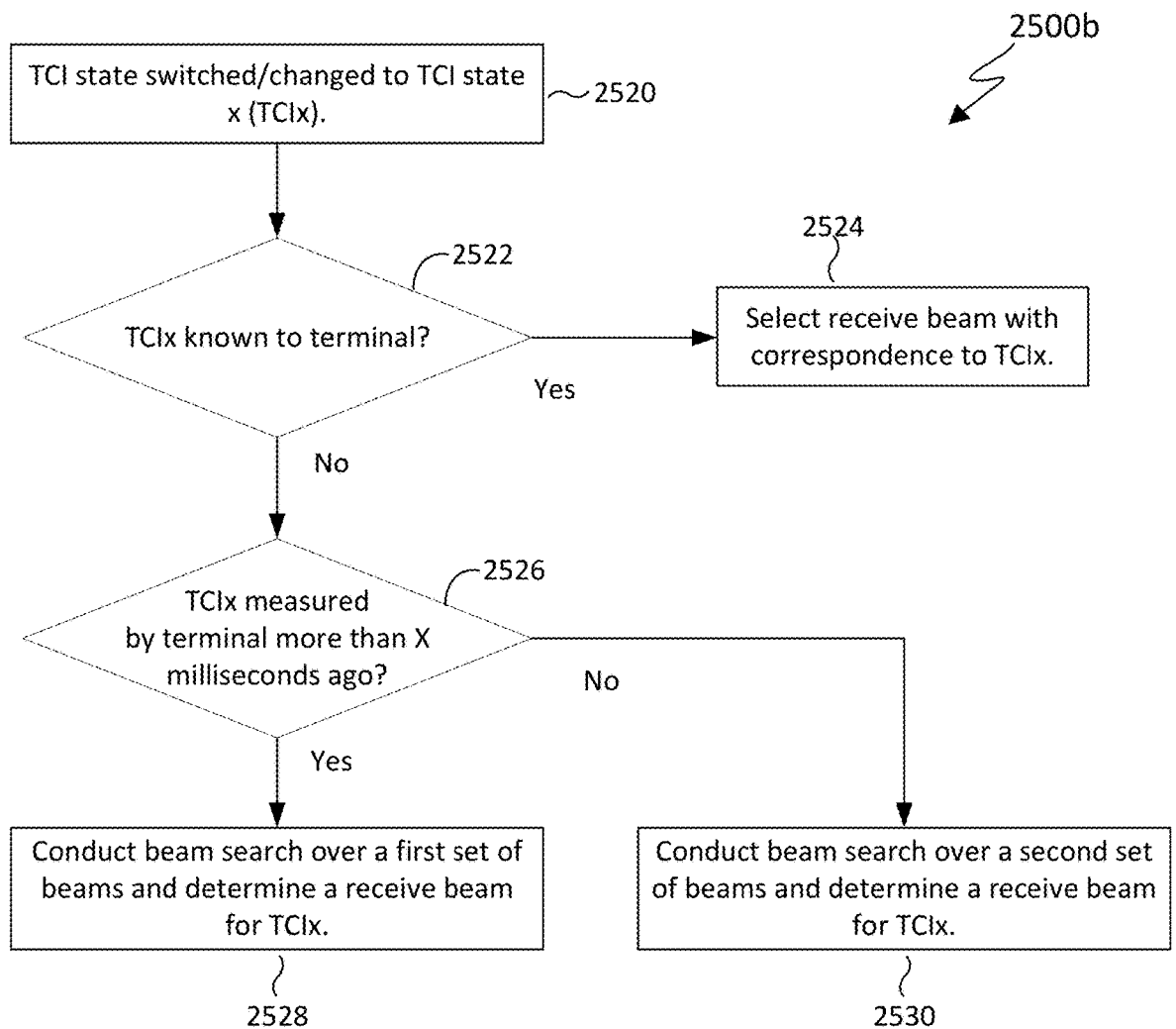
FIG. 25B illustrates another flowchart for a receive beam search for a TCI state switch in accordance with various embodiments of this disclosure.

In FIGS. 25A and 25B, algorithms are presented to illustrate the receive beam operation at the UE for an unknown TCI state switch under various obsolete conditions. The proposed receive beam operation algorithm does not depend on the SNR for the target TCI state, though it may be the sole factor that leads to the unknown status of the target TCI state. That is, the UE optimizes the number of candidate beams to search or the angular range to scan based on the obsolete status of the target TCI state assuming given beamwidth, radiation pattern or beam pattern of the candidate beams. In several other embodiments of this disclosure, the UE may optimize the beamwidth, radiation pattern or beam pattern of the candidate beams based on the SNR for the target TCI state in addition to optimizing the angular space to scan based on the obsolete status of the TCI state.

FIG. 25A illustrates a flowchart for a receive beam search for a TCI state switch in accordance with various embodiments of this disclosure. Operations of flowchart 2500a can be implemented in a UE, such as UE 116 in FIG. 3.

Flowchart 2500a begins at operation 2502 by receiving an indication of a TCI state switch to TCI state x (TCIx). The TCI state switch can be triggered by various factors such as link blockage and link failure. The BS or the network can send the corresponding TCI state switch command to the UE via RRC, MAC CE for PDCCH and DCI for PDSCH. An example of the MAC CE-based TCI state indication procedure is described in more detail in FIG. 26.

In operation 2504 a determination is made as to whether the TCIx is known. The determination can be made based on a set of predefined conditions, which can include: (i) the TCI state of interest has been measured by the UE (at least once) before, (ii) the last measurement of the TCI state of interest is less than X ms ago, and (iii) the SNR of the switched/target TCI state is larger than a given threshold Th_0. If any of the conditions (i), (ii) and (iii) does not hold, the switched TCI state is considered to be unknown to the UE, and the UE can optimize the corresponding receive beam selection strategies as indicated in flowchart 2500.

If the TCIx is known, then flowchart 2500a proceeds from operation 2504 to operation 2506 where a receive beam is selected with correspondence to the TCIx. Thus, the UE knows the receive beam to use for the switched TCI state. This correspondence between the receive beam and the known TCI state may be established during the last measurement(s). The UE can therefore directly apply the receive beam that has the correspondence to the target/switched TCI state when the target/switched TCI state becomes in effect.

If the TCIx is not known, then flowchart 2500a proceeds from operation 2504 to operation 2508 where a determination is made as to whether the TCIx was measured before. For example, the UE can determine whether it has sent at least one measurement report for the switched/target TCI state before.

If the TCIx was not measured before, then flowchart 2500a proceeds from operation 2508 to operation 2510 where a beam search is conducted over a first set of beams and a receive beam is determined for the TCIx. The candidate beams in the first set of beams may cover a relatively large angular range. For instance, the first set of candidate beams to search may correspond to a DFT beam codebook, or a DFT beam codebook with an oversampling factor larger than one. The angular range of interest could be 120 degrees around the UE's azimuth boresight, and 90 degrees around the UE's elevation boresight. To find the receive beam for TCIx, the UE may conduct an exhaustive search over all candidate beams, and select the one that results in the best performance metric. The performance metric could be based on received signal power, RSRP, RSRQ, SNR and/or SINR. For another example, the UE may perform the search/measurement over a subset of beams out of all candidate beams. The UE could then interpolate the search/measurement results from the subset of beams, and select the receive beam from the candidate beams. The selected receive beam may or may not belong to the subset of beams out of all candidate beams in the first set. The measurement over the subset of beams out of all candidate beams in the first set could be based on received signal power, RSRP, RSRQ, SNR and/or SINR.

Returning to operation 2508, if the TCIx was measured before, then flowchart 2500a proceeds to operation 2512 where a determination is made as to whether the TCIx was measured more than X milliseconds ago (i.e., more than a predetermined amount of time ago). This condition characterizes how much the switched/target TCI state is obsolete to the UE for a given channel condition. If the last measurement of TCIx is within the X ms time window, the UE can conclude that the switched TCI state is unknown because the corresponding SNR for TCIx is less than Th_0. That is, the target TCI state is not completely obsolete/outdated in terms of the last measurement time, though it is still considered unknown to the UE since the SNR is low. In this case, flowchart 2500 proceeds to operation 2514.

If the TCIx was measured more than X milliseconds ago, then flowchart 2500a proceeds to operation 2510. In particular, if the last measurement of the target TCI state was conducted by the UE more than X ms ago, the target TCI state is unknown and obsolete/outdated regardless of the SNR. However, if the TCIx was not measured more than X milliseconds ago, then flowchart 2500a proceeds to operation 2514 where a beam search is conducted over a second set of beams to determine the receive beam for TCIx. The candidate beams in the second set of beams may cover a smaller angular range than the candidate beams in the first set of beams that are searched in operation 2510. In operation 2514, the unknown TCI state (TCIx) is not completely obsolete/outdated. The UE can therefore leverage the receive beam (and/or their steering direction) that has the correspondence to the target TCI state to determine (or narrow down) the angular range to search. This correspondence between the receive beam and the TCI state may be established during the last measurement(s).

For instance, the UE could consider the receive beam that has the correspondence to the target TCI state as the reference beam and/or their steering direction as the reference direction, and generate a set of beams surrounding the reference receive beam and/or the reference direction. With the reference receive beam and/or reference direction, a smaller number of candidate beams to search and/or a smaller angular range to scan can be established as compared to those in the first set of beams. This in turn, may reduce the search complexity and access delay. To find the receive beam for TCIx, the UE may conduct an exhaustive search over all candidate beams in the second set, and select the one that results in the best performance metric. The performance metric could be based on received signal power, RSRP, RSRQ, SNR and/or SINR.

For another example, the UE may perform the search/measurement over a subset of beams out of all candidate beams in the second set. The UE could then interpolate the search/measurement results from the subset of beams out of all candidate beams in the second set, and select the receive beam from the candidate beams. The selected receive beam may or may not belong to the subset of beams out of all candidate beams in the second set. The measurement over the subset of beams out of all candidate beams in the second set could be based on received signal power, RSRP, RSRQ, SNR and/or SINR.

In this embodiment in FIG. 25A, operation 2510 and operation 2514 differ on two main points. First, a reference receive beam or a reference direction is defined in operation 2514 to confine the angular space to scan because the target TCI state is not (completely) obsolete/outdated in operation 2514 even though it is unknown. The reference receive beam or the reference direction corresponding to the target TCI state could help the UE narrow down the potential angular range to scan and/or the potential candidate beams to search. Second, the size of the first set of beams in operation 2510 could be different from that of the second set of beams in operation 2514 because the angular range to scan in operation 2514 could be smaller than that in operation 2510 due to the introduction of the reference beam/direction. Note that in this embodiment in FIG. 25A, the candidate beams in the first set and the second set could have the same beamwidth, radiation pattern, beam pattern, etc.

FIG. 25B illustrates another flowchart for a receive beam search for a TCI state switch in accordance with various embodiments of this disclosure. Operations of flowchart 2500b can be implemented in a UE, such as UE 116 in FIG. 3.

Flowchart 2500b begins at operation 2520 by receiving an indication of a TCI state switch to TCI state x (TCIx). In operation 2522 a determination is made as to whether the TCIx is known. If the TCIx is known, then flowchart 2500b proceeds from operation 2522 to operation 2524 where a receive beam is selected with correspondence to the TCIx.

If the TCIx is not known, then flowchart 2500b proceeds from operation 2522 to operation 2526 where a determination is made as to whether the TCIx was measured more than X milliseconds ago (i.e., more than a predetermined amount of time ago). If the TCIx was measured more than X milliseconds ago, then flowchart 2500b proceeds to operation 2528 where a beam search is conducted over a first set of beams to determine a receive beam for TCIx. However, if the TCIx was not measured more than X milliseconds ago, then flowchart 2500b proceeds to operation 2530 where a beam search is conducted over a second set of beams to determine the receive beam for TCIx.

Thus, if the target TCI state is unknown and it was last measured more than X ms ago, the UE may conduct a full sweep over all the candidate beams (first set of beams) to update the corresponding L1-RSRP measurement table, and select the best RX beam for the target TCI state. In this case, no prior information for the target TCI state is or can be exploited by the UE.

If the target TCI state is "unknown" but it was last measured less than X ms ago, a reference beam previously used for the target TCI state can be first determined, then a second set of beams surrounding the reference beam (determined via a predefined metric such as angular distance on the unit sphere, beam pattern overlapping, etc.) is determined. The UE may conduct the sweep over the second set of beams to update the corresponding entries in the L1-RSRP measurement table and select the best RX beam for the target TCI state. By sweeping only a limited set of beams, the access delay can be reduced.

Figure 26:
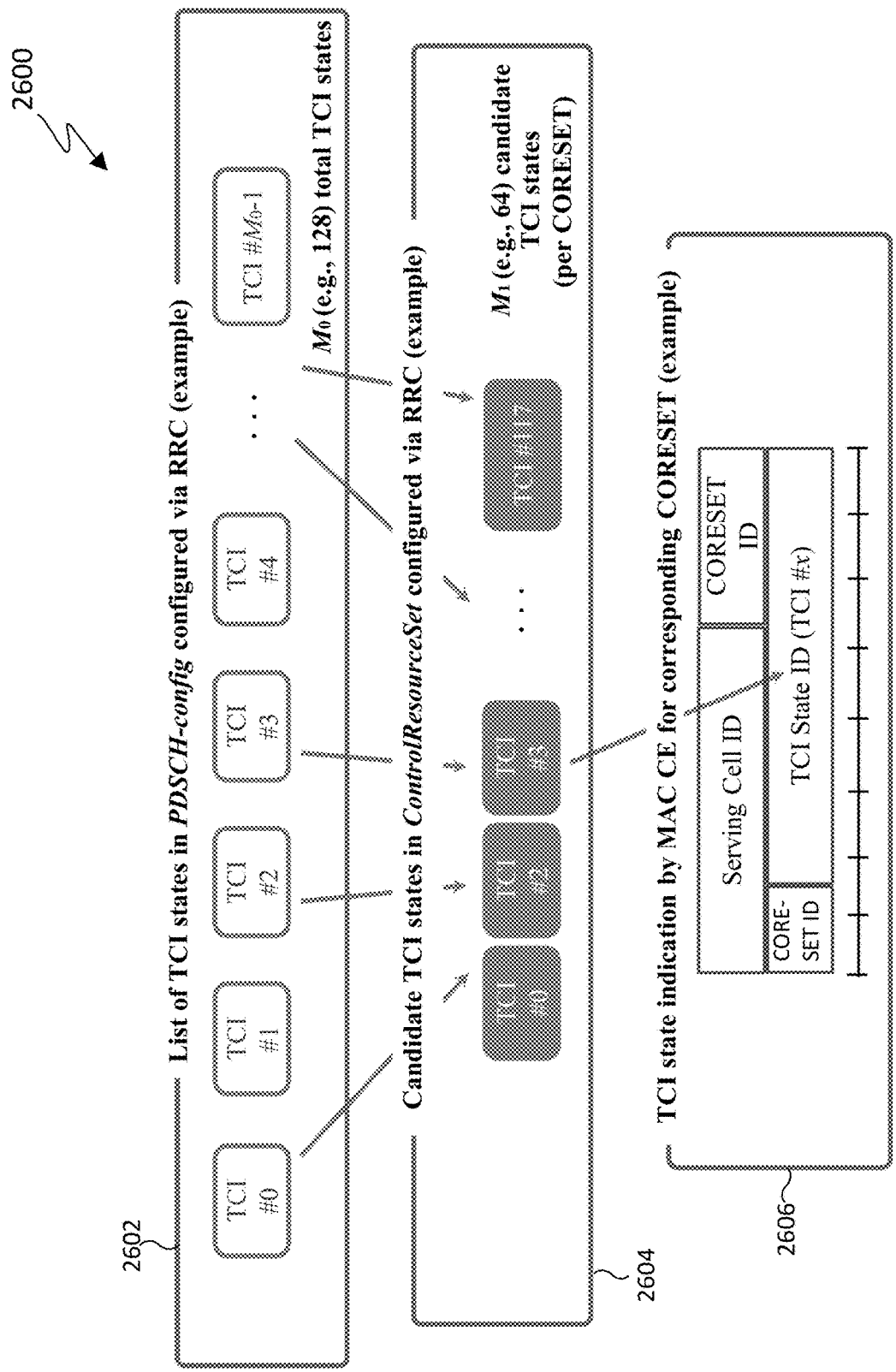
FIG. 26 illustrates a procedure for a MAC CE-enabled TCI state indication for PDCCH in accordance with various embodiments of this disclosure.

FIG. 26 illustrates a procedure for a MAC CE-enabled TCI state indication for PDCCH in accordance with various embodiments of this disclosure. The operations of procedure 2600 can be implemented in a BS, such as BS 102 in FIG. 2.

In operation 2602, the BS or the network first configures a list of $M_0$ (e.g., 128) TCI states via RRC parameter PDSCH-config. In operation 2604, for a given control resource set (CORESET), the network or the BS configures a set of $M_1$ (e.g., 64) candidate TCI states from the list of $M_0$ TCI states via RRC parameter ControlResourceSet. Finally, in operation 2606 the network or the BS sends the indication of the selected TCI state to the UE via MAC CE. Further, the network or the BS can configure a new TCI state from the list of $M_1$ TCI states via the MAC CE indication command to the UE for the corresponding CORESET.

In some embodiments, the UE may not monitor the status of all $M_1$ TCI states in ControlResourceSet. Hence, the switched TCI state can be unknown to the UE. For the DCI enabled TCI state indication/switch for PDSCH, the network or the BS first configures a list of $M_0$ (e.g., 128) TCI states via RRC parameter PDSCH-config. Then, via the UE-specific PDSCH MAC CE, 8 TCI states out of the total $M_0$ TCI states are activated. The network or the BS informs the UE regarding the target/switched TCI state (one of the eight active TCI states) via DCI. The UE is capable of monitoring the eight active TCI states, and in this case, the target/switched TCI state can be considered as always known to the UE. If the UE is only capable of monitoring some of the eight active TCI states, and the switched/target TCI state indicated by the BS is out of the monitoring set of the active TCI states, the target/switched TCI state may then be considered as unknown to the UE.

FIG. 27A illustrates a flowchart for beam selection in accordance with various embodiments of this disclosure. The operations of flowchart 2700a can be implemented in a UE, such as UE 116 in FIG. 3. Further, operations of flowchart 2700a can be implemented as steps in another flowchart for a receive beam search for a TCI state switch. For example, operations of flowchart 2700a can be implemented in operation 2514 of flowchart 2500. The operations of flowchart 2700 will be described along with the illustrations in FIG. 27B, which depict corresponding receive beams based on the operations in FIG. 27A.

Flowchart 2700a begins at operation 2702 by determining a reference receive beam 2722 and/or a reference angular direction 2720. In operation 2704, a set of candidate beams 2724 is formed based on the reference receive beam 2722 and/or reference angular direction 2720. The size of the second set of beams (or the number of candidate beams), the exact candidate beam codewords in the beam codebook and etc. may vary depending on the exact time (<X ms) of the last measurement/report of the target TCI state, the channel condition and other design factors. For instance, if the last measurement of the target TCI state was several time-slots (e.g., less than 10 ms) ago, the second set of candidate beams may only include those closely surrounding the reference beam/direction (e.g., adjacent 4 beams in both the azimuth and elevation domains).

In operation 2706 a receive beam 2726 is selected based on measurements of the candidate beams 2724. Selection of the receive beam is described in operation 2514 in FIG. 25A and, for the sake of brevity, will not be repeated here.

Figure 28:
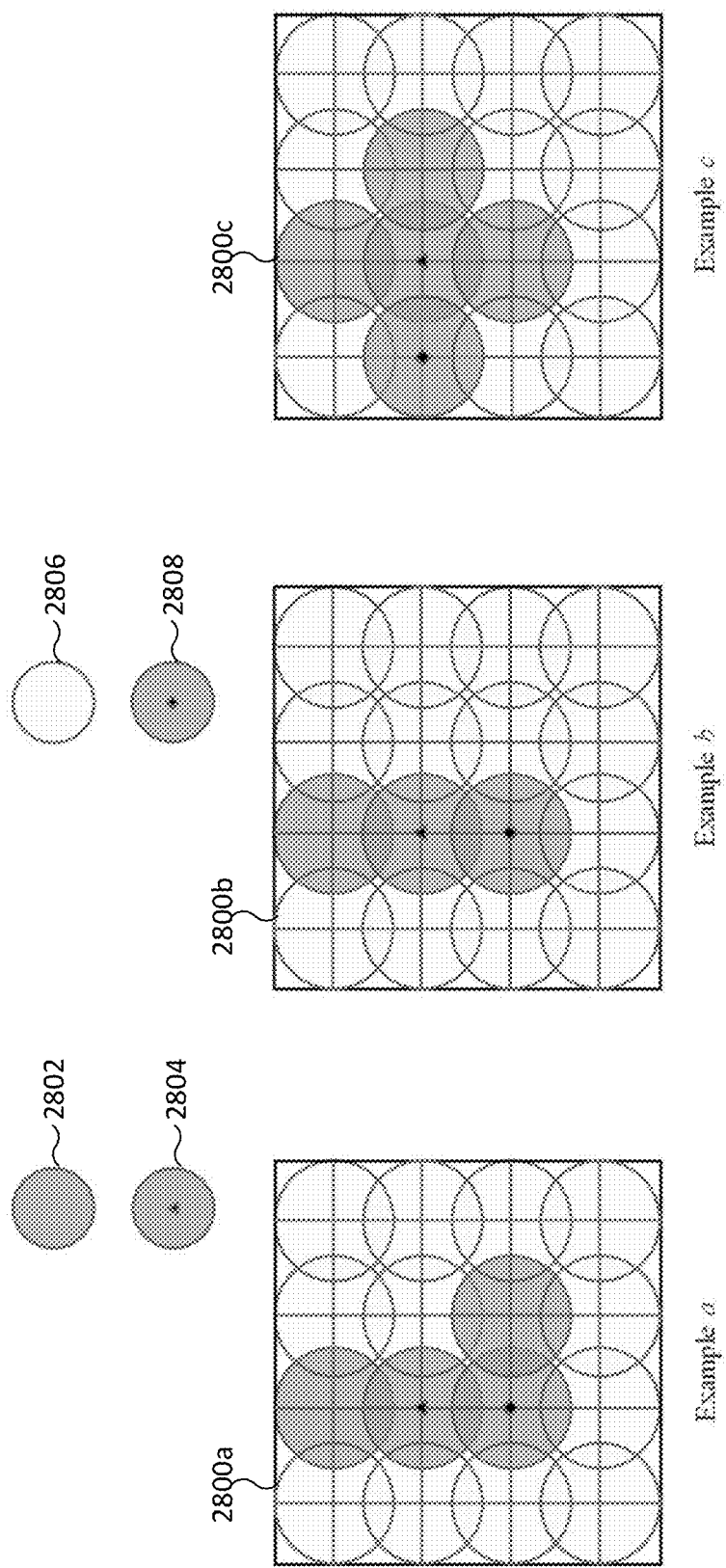
FIG. 28 illustrates examples of selected beams in accordance with various embodiments of this disclosure.

FIG. 28 illustrates examples of selected beams in accordance with various embodiments of this disclosure, and in particular, to the embodiment described in FIGS. 25 and 27. A bird's eye view of three sets of beams 2800a, 2800b, and 2800c of a beam codebook are depicted in FIG. 28. In each of the sets of beams, circles represent the various beams in the beam codebook. Shaded circle 2802 represents the candidate beams in the second set of beams from operation 2514 of flowchart 2500. A shaded circle 2804 with a triangle at the center represents a reference receive beam/direction. A shaded circle 2808 with a diamond in the middle represents a selected receive beam. And an unshaded circle 2806 represents other beams in the beam codebook. The sets of beams 2800a, 2800b, and 2800c show that the candidate beams for selection could be different even for the same reference receive beam and/or reference direction. For instance, in set of beams 2800c, a total of four beams (two in the azimuth domain and two in the elevation domain) surrounding the reference receive beam are formed. Hence, there are a total of five candidate beams in the second set including the reference receive beam. In comparison, set of beams 2800b includes only two beams formed in the elevation domain, yielding a total of three candidate beams.

As previously discussed, the second set of candidate beams may vary even with the same reference beam and/or reference steering direction. The selection of the second set of candidate beams may depend on the exact time of the last measurement of the target TCI state, the channel condition and/or other information collected by the UE (e.g., UE's orientation, moving velocity and heading direction collected by the accelerometer and magnetometer). For instance, for a given orientation of the UE, the UE may prefer to select certain beams as the candidate beams to cover a particular angular space surrounding the reference beam/direction over other beams covering other angular ranges surrounding the reference beam/direction.

Based on the above information, a look-up table that maps one or more combination/pattern of the candidate beams to the exact time of the last measurement of the target TCI state and an information set comprising of but not limited to, the orientation, moving velocity and heading direction of the UE can be implemented at the UE. TABLE 1 is an example of such a look-up table that characterizes the candidate beams patterns. For instance, if the last measurement time t of the target TCI state satisfies $t \in (X_1, X)$ ms and their information set can be best characterized by $\{\Psi_1\}$, the second set of beams, e.g., the second set of beams in operation 2514 in FIG. 25A, are then formed by the UE using Pattern-B candidate beams. Note that the first set of beams, e.g., the first set of beams in operation 2510 in FIG. 25A could be constructed by the UE using Pattern-X candidate beams, i.e., beam pattern 2906 in FIG. 29, which may correspond to all the beam codewords in the beam codebook, covering the entire angular range of interest.

TABLE 1

| Last measurement time t of target TCI state | Information set | Candidate beams pattern |
|---|---|---|
| t > X ms | N/A | Pattern-X |
| t ∈ (X$_1$, X] ms | $\{\Psi_0\}$ | Pattern-A |
| t ∈ (X$_1$, X] ms | $\{\Psi_1\}$ | Pattern-B |
| t ∈ (X$_2$, X$_1$] ms | $\{\Psi_2\}$ | Pattern-C |
| t ∈ (X$_2$, X$_1$] ms | $\{\Psi_3\}$ | Pattern-D |
| t ∈ (X$_3$, X$_2$] ms | $\{\Psi_4\}$ | Pattern-E |
| ... | ... | ... |

Figure 29:
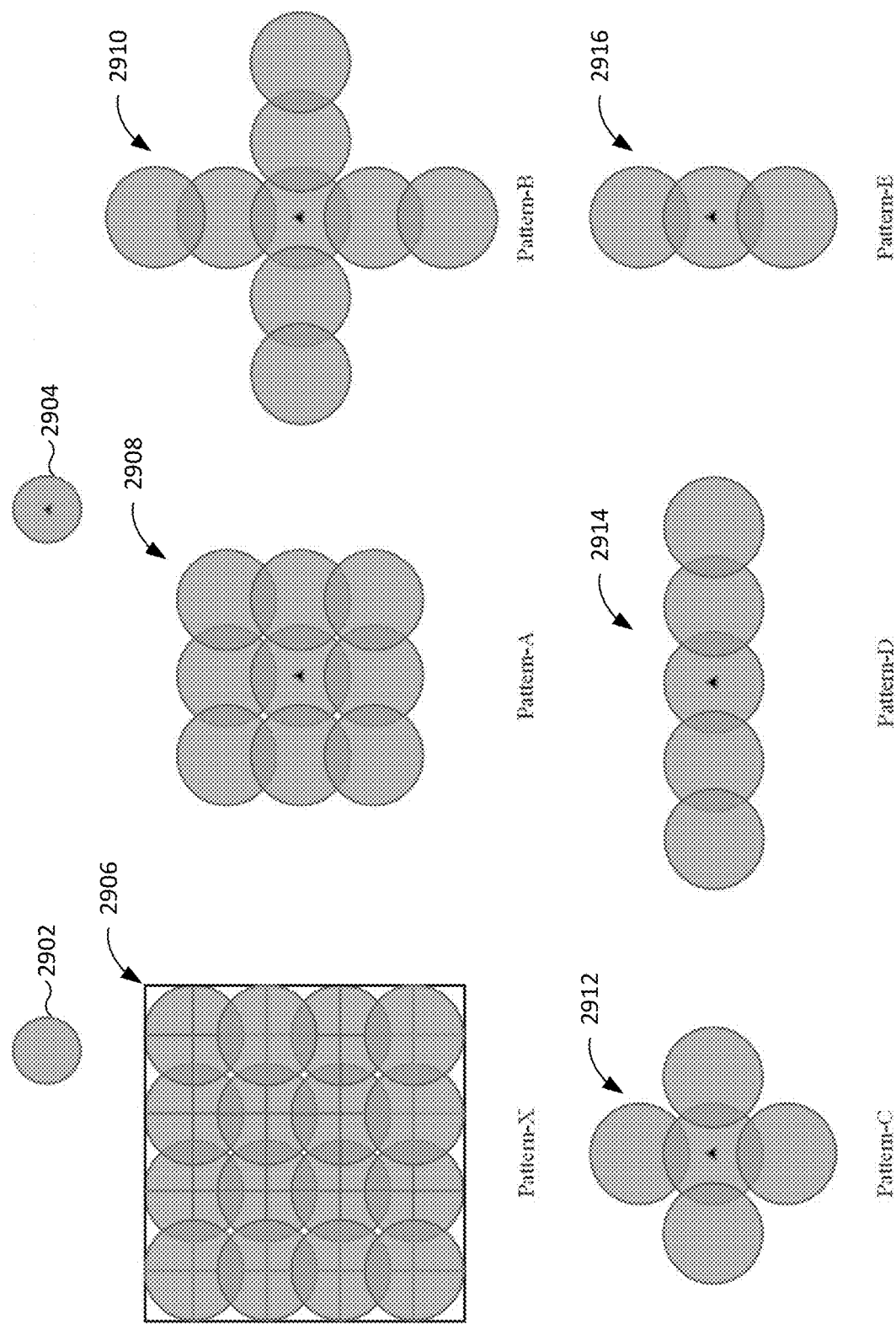
FIG. 29 illustrates various patterns of candidate beams in accordance with various embodiments of this disclosure.

FIG. 29 illustrates various patterns of candidate beams in accordance with various embodiments of this disclosure. In each of the patterns 2906, 2908, 2910, 2912, 2914, and 2916, a shaded circle 2902 represents candidate beams in a beam codebook and a shaded circle 2904 with a triangle in the middle represents a receive beam/direction. It is evident that different patterns may have the same number of candidate beams (e.g., pattern 2908 and pattern 2910). In general, a smaller t may correspond to a smaller number of candidate beams in the candidate beams pattern.

In some embodiments, if the target TCI state is "unknown" and its SNR is below the given threshold Th_0, the UE may conduct a full sweep over all the candidate beams in the second set of beams to update the corresponding L1-RSRP measurement table, and select the best RX beam for the target TCI state. In these embodiments, since the SNR condition is not promising, narrow beams in the second set are used. In some embodiments, if the target TCI state is "unknown" but its SNR is beyond the given threshold Th_0, the UE may conduct a full sweep over all the candidate beams (i.e., first set of beams) to update the corresponding L1-RSRP measurement table, and select the best RX beam for the target TCI state. In these embodiments, wide beams with lower array gain in the first set are used to reduce the beamsearch delay as the SNR condition is promising. These embodiments are described in more detail in FIG. 30 that follows.

Figure 30:
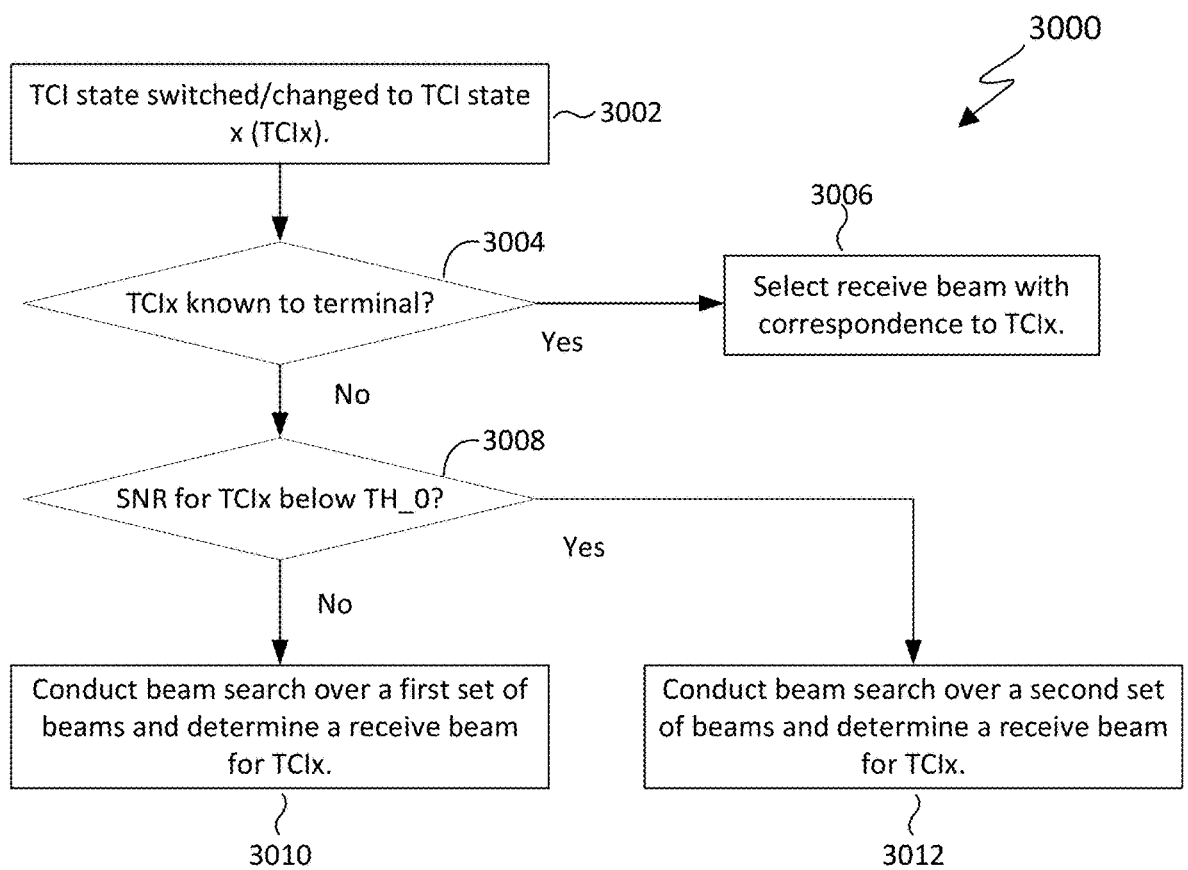
FIG. 30 illustrates a flowchart for receive beam selection under TCI state switch in accordance with various embodiments of this disclosure.

FIG. 30 illustrates a flowchart for receive beam selection under TCI state switch in accordance with various embodiments of this disclosure. In this example in FIG. 30, the SNR for the target/switched TCI state is the triggering condition for various types of receive beam selection strategies. This is different from the example in FIG. 25A, in which the obsolete status is the triggering condition. Operations of flowchart 3000 can be implemented in a UE, such as UE 116 in FIG. 3.

Flowchart 3000 begins at operation 3002 by receiving an indication of a TCI state switch to TCI state x (TCIx). In operation 3004 a determination is made as to whether the TCIx is known. If the TCIx is known, then flowchart 3000 proceeds from operation 3004 to operation 3006 where a receive beam is selected with correspondence to the TCIx.

If the TCIx is not known, then flowchart 3000 proceeds from operation 3004 to operation 3008 where a determination is made as to whether the SNR for TCIx is below a threshold. Operation 3008 characterizes the detectability of the switched/target TCI state during the switching period.

If the SNR for TCIx is not below the threshold, then flowchart 3000 proceeds to operation 3010 where a beam search is conducted over a first set of beams to determine a receive beam for TCIx. If the SNR for the target/switched TCI state is beyond Th_0, it implies that the target/switched TCI state is detectable during the switching period.

However, if the SNR for TCIx is below the threshold, then flowchart 3000 proceeds from operation 3008 to operation 3012 where a beam search is conducted over a second set of beams to determine a receive beam for TCIx. If the SNR for TCIx is below the given threshold, Th_0, the target TCI state may become undetectable during the switching period.

In this example in FIG. 30, the selection of the first and second sets of candidate beams does not depend on the obsolete status of the target TCI state, or even whether the UE has measured the target/switched TCI state before.

In operation 3010, the UE performs the receive beam search over a first set of candidate beams for the switched/target TCI state. In operation 3012, the UE performs the receive beam search over a second set of candidate beams for the switched/target TCI state. In this example, both the first set of candidate beams and the second set of candidate beams may cover the same angular range of interest. For example, the angular range of interest could be 120 degrees around the UE's azimuth boresight, and 90 degrees around the UE's elevation boresight. The first set of candidate beams may correspond to a DFT beam codebook, or a DFT beam codebook with an oversampling factor larger than one. The second set of candidate beams may correspond to another DFT beam codebook, or another DFT beam codebook with an oversampling factor larger than one. The design principle of the first and second sets of beams in operations 3010 and 3012 is different from that of the first and second sets of beams in operations 2510 and 2514 in FIG. 25A. In the former, the two sets of beams may cover the same angular space but with different one or more beam-specific parameters such as beamwidth, radiation pattern and beam pattern. In the latter, the two sets of beams may cover different areas using different number of beams but their beamwidth, radiation pattern, beam pattern, etc. are the same.

The following procedure is common for operations 3010 and 3012, i.e., searching over the first set of candidate beams and the second set of candidate beams. To find the receive beam for TCIx, the UE may conduct an exhaustive search over all candidate beams, and select the one that results in the best performance metric. The performance metric could be based on received signal power, RSRP, RSRQ, SNR and/or SINR. For another example, the UE may perform the search/measurement over a subset of beams out of all candidate beams. The UE could then interpolate the search/measurement results from the subset of beams, and select the receive beam from the candidate beams. The selected receive beam may or may not belong to the subset of beams. The measurement over the subset of beams could be based on received signal power, RSRP, RSRQ, SNR and/or SINR.

Figure 31:
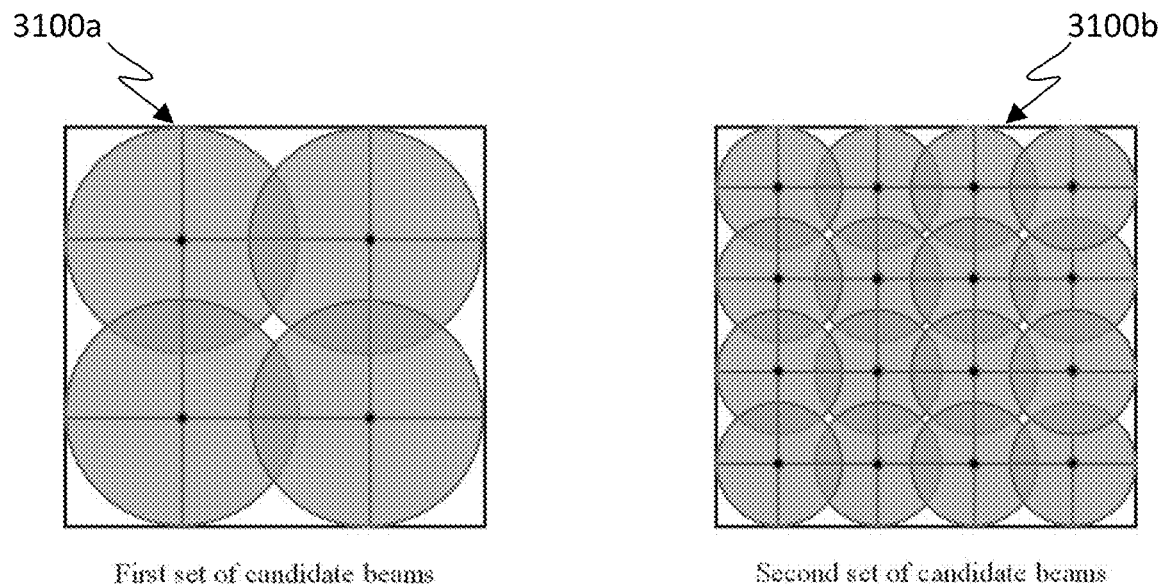
FIG. 31 illustrates candidate beams in a first set and a second set in accordance with various embodiments of this disclosure.

FIG. 31 illustrates candidate beams in a first set and a second set in accordance with various embodiments of this disclosure. One of the main differences between the first set of candidate beams 3100a and the second set of candidate beams 3100b is their beamwidths. In this example, the beamwidth, e.g., the 3 dB beamwidth of the candidate beams in the first set 3100a could be larger than that of the candidate beams in the second set 3100b. The bird's eye views of the first set of candidate beams 3100a and the second set of candidate beams 3100b show that the first set of candidate beams 3100a and the second set of candidate beams 3100b have different beamdwidths, and therefore, different numbers of candidate beams in the set to cover the same angular range of interest. One of the motivations of using different sets of beams with different beamwidths is that they could be suitable for various SNR conditions/constraints. For instance, the SNR for the switched/target TCI state being larger than Th_0 implies that the link quality may be good enough to allow the use of relatively wide beams with relatively small beamforming/array gain (the first set 3100a in this example). If the SNR for the switched/target TCI state is lower than the given threshold Th_0, relatively narrow candidate measurement beams (the second set 3100b in this example) may be required to ensure certain link quality and link budgets. A larger number of narrow beams are required to cover the same angular space than that of wide beams. This in turn, may result in high computational complexity and access delay if the exhaustive search is performed on the candidate measurement beams. In the examples shown in FIG. 31, the UE searches all 16 beams in the second set 3100b (in both azimuth and elevation domains) to find the receive beam for the target TCI state, while the UE only searches 4 beams in the first set of candidate beams 3100a.

The beamwidth of the candidate beams, and therefore, the total number of candidate beams in a given set may vary depending on the exact value of the SNR for the target TCI state. For instance, assume that the second set 3100b contains a total of 16 candidate measurement beams, covering an angular range A. If the SNR for the target/switched TCI state exceeds Th_0 by more than 3 dB, it may be preferable to have the beamwidth of the beams in the first set approximately twice of that in the second set, and therefore the number of candidate beams in the first set one half of that in the second set (i.e., 8 in this example), to cover the same angular range A. If the SNR for the target/switched TCI state exceeds Th_0 by more than 6 dB, it may be preferable to have the beamwidth of the beams in the first set approximately four times of that in the second set 3100b, and therefore the number of candidate beams in the first set one fourth of that in the second set (i.e., 4 in this example), to cover the same angular range A. The mapping between the SNR for the target/switched TCI state and the desired beamwidth can be implemented at the UE in form of a look-up table.

In TABLE 2, an example of such a look-up table is presented, in which each row maps the SNR for the target/switched TCI state to a desired beamwidth and a candidate beams type. It can be observed from TABLE 2 that, for instance, if the SNR for the target TCI state satisfies Th_0<$\gamma$≤Th_1, the UE could choose $\Theta_1$ as the desired beamwidth to generate a set of candidate beam codewords. For another example, if the SNR for the target TCI state satisfies Th_2<$\gamma$≤Th_3, the UE could choose $\Theta_3$ as the desired beamwidth to generate another set of candidate beam codewords, possibly covering the same angular space as in the previous example. It is evident from TABLE 2 that the candidate beams types may have one-to-one correspondence to the desired beamwidths, and therefore, the exact SNRs for the target TCI state.

TABLE 2

| SNR for target/switched TCI state | Desired beam width | Candidate beams type |
|---|---|---|
| $\gamma$ ≤ Th_0 | $\Theta_0$ | Type-I |
| Th_0 < $\gamma$ ≤ Th_1 | $\Theta_1$ | Type-II |
| Th_1 < $\gamma$ ≤ Th_2 | $\Theta_2$ | Type-III |
| Th_2 < $\gamma$ ≤ Th_3 | $\Theta_3$ | Type-IV |
| ... | ... | ... |

Figure 32:
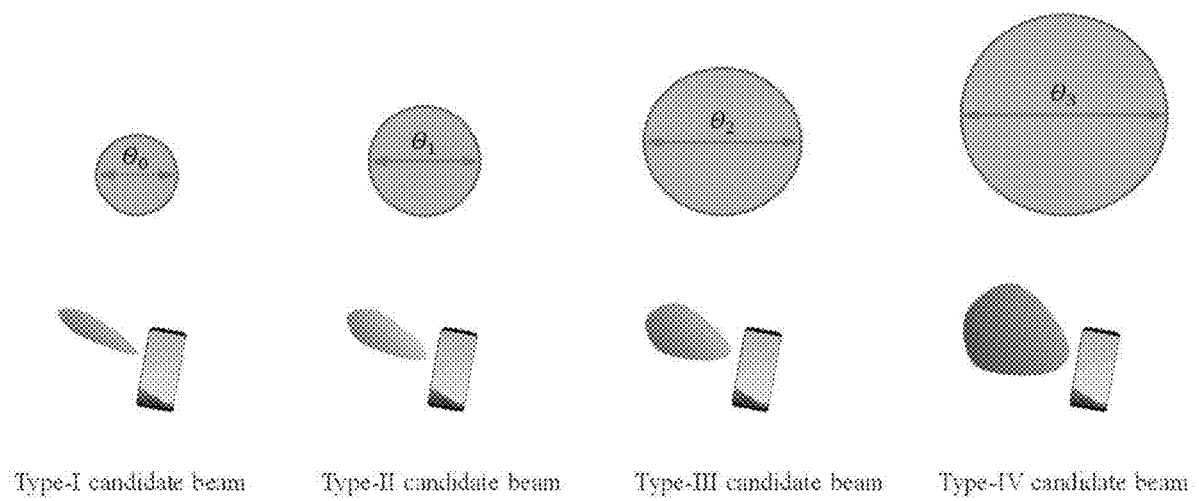
FIG. 32 illustrates various types of candidate beams in accordance with various embodiments of this disclosure.

FIG. 32 illustrates various types of candidate beams in accordance with various embodiments of this disclosure. It can be seen that different candidate beams types may correspond to different beamwidths, and in this example, starting from Type-I to Type-IV, the beamwidth of the candidate beams becomes larger and larger (i.e., from narrow beams to increasingly wider beams). Note that an alternative to directly generating the candidate beams for a desired beamwidth is to map the existing beam codebook to the desired beamwidth, which could reduce the implementation complexity. For instance, the beam codebook implemented at the UE could have a hierarchical structure, comprising of multiple tiers of beam codewords with each tier corresponding to a different beamwidth. The beamwidth of the beam codewords selected from a lower tier (e.g., the $1^{st}$ tier) could be larger than that of the beam codewords selected from a higher tier (e.g., the $3^{rd}$ tier). According to TABLE 2, the 3rd tier beam codewords could therefore be mapped to $\Theta_0$ (Type-I candidate beam), the 2nd tier beam codewords could be mapped to $\Theta_1$ (Type-II candidate beam), and the 1st tier beam codewords could be mapped to $\Theta_2$ (Type-III candidate beam).

In the preceding embodiments, obsolete and detectable conditions were considered for establishing an "unknown" TCI state, and the obsolete/detectable condition was characterized by a single threshold. In some embodiments, it can be desirable to jointly consider the obsolete and detectable conditions for an "unknown" TCI state and apply different thresholds (or even adaptive thresholds) to better characterize the obsolete and detectable conditions. These embodiments are discussed in more detail in the figures that follow.

Figure 33:
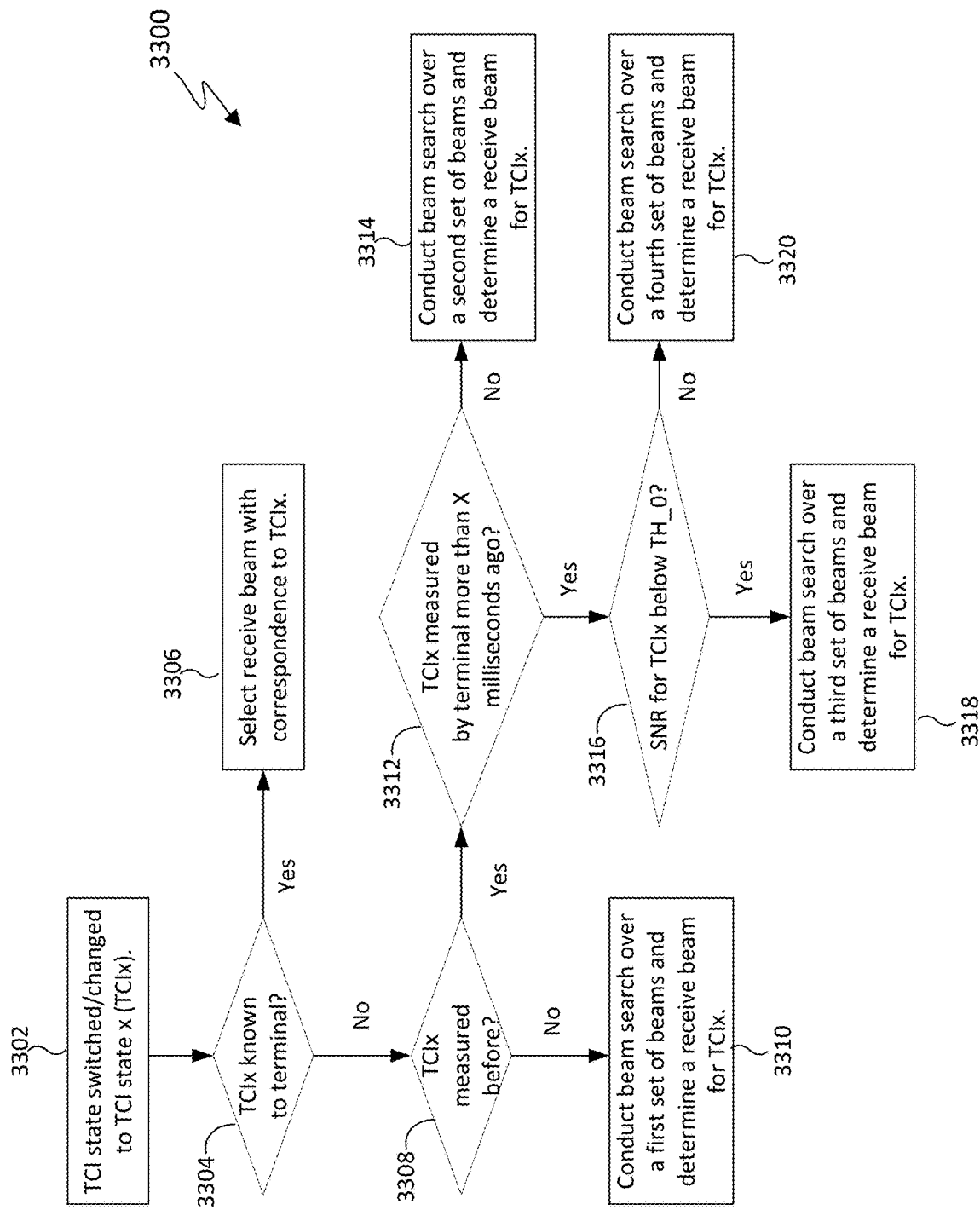
FIG. 33 illustrates a flowchart for receive beam selection under TCI state switch in accordance with various embodiments of this disclosure.

FIG. 33 illustrates a flowchart for receive beam selection under TCI state switch in accordance with various embodiments of this disclosure. Operations of flowchart 3300, which can be implemented in a UE, such as UE 316 in FIG. 2, incorporates both the obsolete status and the exact SNR for the target/switched TCI state.

Flowchart 3300 begins at operation 3302 by receiving an indication of a TCI state switch to TCI state x (TCIx). In operation 3304 a determination is made as to whether the TCIx is known. If the TCIx is known, then flowchart 3300 proceeds from operation 3304 to operation 3306 where a receive beam is selected with correspondence to the TCIx.

If the TCIx is not known, then flowchart 3300 proceeds from operation 3304 to operation 3308 where a determination is made as to whether the TCIx was measured before. If the TCIx was not measured before, then flowchart 3300 proceeds from operation 3308 to operation 3310 where a beam search is conducted over a first set of beams for determining a receive beam for TCIx.

Returning to operation 3308, if the determination was made that the TCIx was measured before, then flowchart 3300 proceeds to operation 3312 where a determination is made as to whether the TCIx was measured more than X milliseconds ago (i.e., more than a predetermined amount of time ago). If the TCIx was not measured more than X milliseconds ago, then flowchart 3300 proceeds to operation 3314 where a beam search is conducted over a second set of beams to determine a receive beam for TCIx. Note that at this operation, the SNR for TCIx ought to be below the threshold Th_0 because the target TCI state is unknown to the UE.

However, if the TCIx was measured more than X milliseconds ago, then flowchart 3300 proceeds from operation 3312 to operation 3316 where a determination is made as to whether SNR for TCIx is below a threshold. Note that at this operation, the SNR for the target/switched TCI state could be either beyond or below the predefined threshold because the target TCI state is completely obsolete/outdated, which could lead to the unknown status of the target TCI state to the UE.

If the SNR for TCIx is below the threshold, then flowchart 3300 proceeds to operation 3318 where a beam search is conducted over a third set of beams to determine a receive beam for TCIx. However, if the SNR for TCIx is not below the threshold, then flowchart 3300 proceeds from operation 3316 to operation 3320 where a beam search is conducted over a fourth set of beams to determine a receive beam for TCIx.

In the example shown in FIG. 33, different sets of candidate beams in operations 3310, 3314, 3318, and 3320 may have different candidate beam patterns and/or candidate beams types. This is different from the algorithms developed previous embodiments where different sets of candidate beams are different in terms of either the candidate beam pattern (e.g., operations 2510 and 2514 in FIG. 25A) or the candidate beam type (e.g., operations 3010 and 3012 in FIG. 30), but not the both.

In operation 3310, the first set of candidate beams could be generated by the UE without relying on the obsolete status and/or the SNR condition for the target TCI state. Hence, the candidate beams in the first set could cover the entire angular range of interest with moderate beamwidth to tradeoff the beam search complexity and accuracy. For instance, the first set of candidate beams can have a beam pattern of Pattern-X, i.e., beam pattern 2906 in FIG. 29, to cover the entire angular space of interest, and the candidate beams in the first set can have a type that corresponds to Type-III in FIG. 32.

In operation 3314 of FIG. 33, the second set of candidate beams could be generated by the UE leveraging the conditions that the target TCI state TCIx is not (completely) obsolete/outdated and the SNR for TCIx is below Th_0. In this case, the UE may perform the beam selection over a confined angular space surrounding the reference beam (direction) that has the correspondence to TCIx. That is, the second set of candidate beams may contain a relatively small number of candidate beams with relatively small beamwidth to improve the link quality because the SNR for the target TCI state is low (<Th_0). For example, the second set of candidate beams could be generated by the UE using candidate beams Pattern-C, i.e., beam pattern 2912 in FIG. 29 and candidate beams of Type-I in FIG. 32.

In operation 3318 of FIG. 33, the third set of candidate beams could be generated by the UE based on the conditions that the target TCI state TCIx is (completely) obsolete/outdated and the SNR for TCIx is below Th_0. In this case, the candidate beams in the third set could cover the entire angular range of interest and have a relatively small beamwidth to ensure the link quality. For example, the third set of candidate beams could be generated by the UE using candidate beams Pattern-X, i.e., beam pattern 2906 in FIG. 29 and candidate beams of Type-I in FIG. 32.

In operation 3320 of FIG. 33, the fourth set of candidate beams could be generated by the UE using candidate beams Pattern-X, i.e., beam pattern 2906 in FIG. 29, to cover the entire angular space of interest and candidate beams of Type-II in FIG. 32. In one embodiment, the third set of beams and the fourth set of beams differ only in beamwidth, which depends on the exact value of the SNR for the target TCI state and how it is compared with Th_0.

Figure 34:
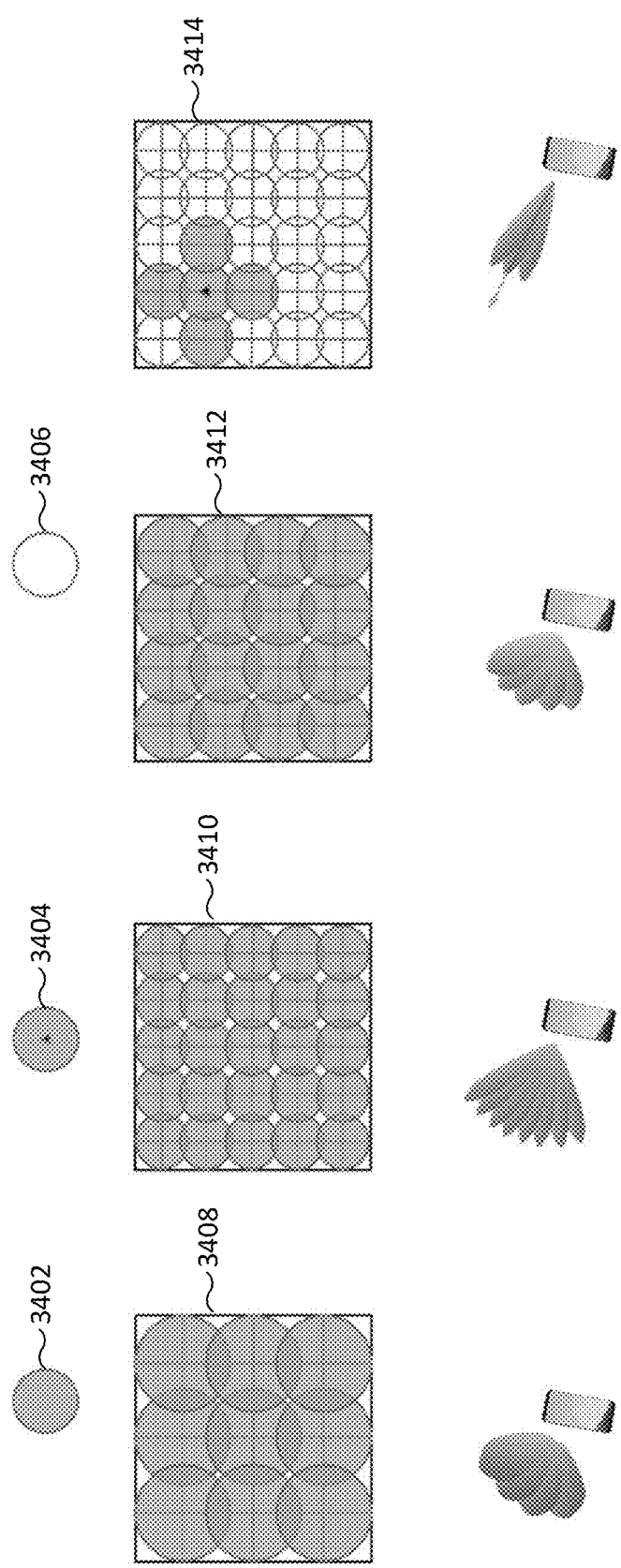
FIG. 34 illustrates candidate beam selection corresponding in accordance with various embodiments of this disclosure.

FIG. 34 illustrates candidate beam selection in accordance with various embodiments of this disclosure, and in particular, to the embodiment described in FIG. 33. Set of beams 3408 corresponds to the first set of candidate beams from operation 3310 in FIG. 33, i.e., Type-III candidate beams in Pattern-X. Set of beams 3410 corresponds to the second set of candidate beams from operation 3314 in FIG. 33, i.e., Type-I candidate beams in Pattern-C. Set of beams 3412 corresponds to the third set of candidate beams 3318, i.e., Type-II candidate beams in Pattern-X. Set of beams 3414 corresponds to the fourth set of candidate beams from operation 3320 in FIG. 33, i.e., Type-II candidate beams in Pattern-X.

As described earlier, a shaded circle 3402 in each of the sets of beams 3408, 3410, 3412, and 3414 represents candidate beams. A shaded circle 3404 with a triangle in the center represents a reference receive beam/direction. An unshaded circle 3406 represents any remaining beams in the beam codebook.

Figure 35A:
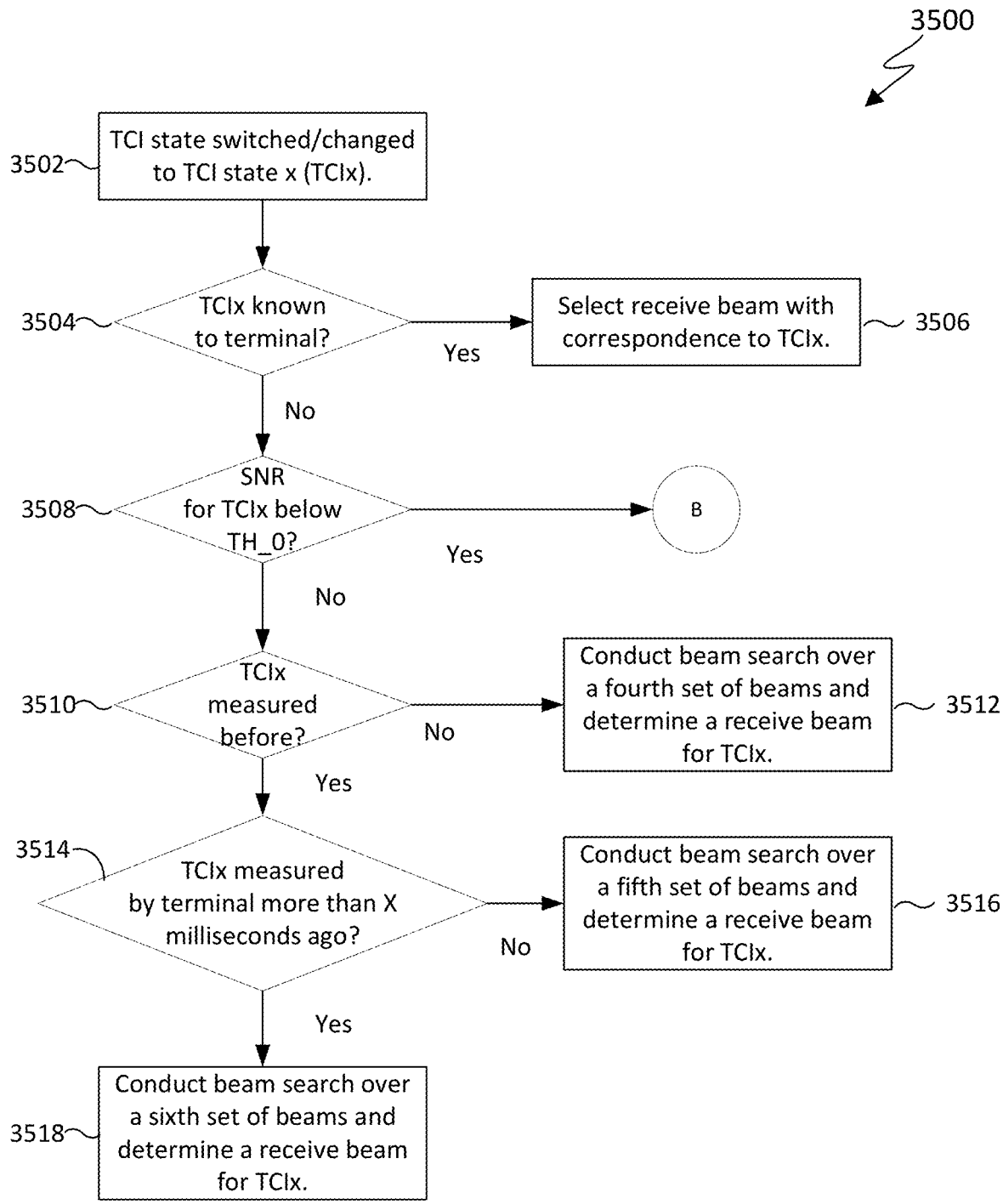
FIGS. 35A and 35B illustrate a flowchart for receive beam selection in accordance with various embodiments of this disclosure.
Figure 35B:
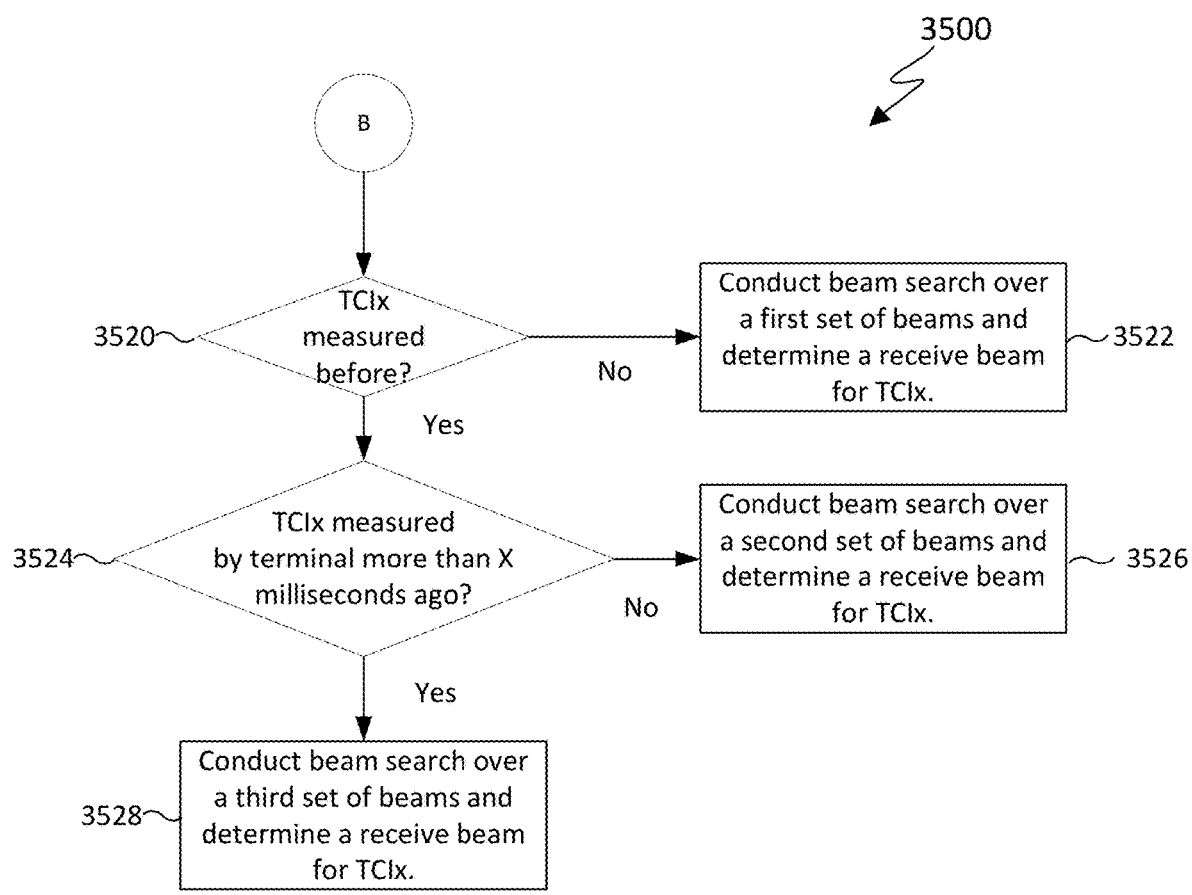

FIGS. 35A and 35B illustrate a flowchart for receive beam selection in accordance with various embodiments of this disclosure. Operations of flowchart 3500 can be implemented in a UE, such as UE 116 in FIG. 3.

Flowchart 3500 differs from flowchart 3300 based on the order in which obsolete status and the SNR condition of the target TCI state is considered. In flowchart 3300, the obsolete status of the target TCI state is checked first and then the SNR condition. In flowchart 3500 the SNR for the target TCI is checked first and then the obsolete status. As can be seen, this difference may lead to different receive beam operation/selection strategies and/or different sets of beams.

Flowchart 3500 begins at operation 3502 by receiving an indication of a TCI state switch to TCI state x (TCIx). In operation 3504 a determination is made as to whether the TCIx is known. If the TCIx is known, then flowchart 3500 proceeds from operation 3504 to operation 3506 where a receive beam is selected with correspondence to the TCIx.

If the TCIx is not known, then flowchart 3500 proceeds from operation 3504 to operation 3508 where a determination is made as to whether SNR for TCIx is below a threshold. Operation 3508 serves as a global triggering event/condition in FIG. 35 such that if the SNR for TCIx is below Th_0, a first beam type is selected (e.g., Type-I narrow beam in FIG. 32) and if SNR for TCIx is above Th_0, then a second beam type is selected (e.g., Type-III wide beams in FIG. 32).

If the SNR for TCIx is not below the threshold, then flowchart 3500 proceeds from operation 3508 to operation 3510 where another determination is made as to whether TCIx was measured before. If the TCIx was not measured before, then flowchart 3500 proceeds from operation 3510 to operation 3512 where a beam search is conducted over a fourth set of beams for determining a receive beam for TCIx.

Returning to operation 3510, if the determination was made that the TCIx was measured before, then flowchart 3500 proceeds to operation 3514 where a determination is made as to whether the TCIx was measured more than X milliseconds ago (i.e., more than a predetermined amount of time ago). If the TCIx was not measured more than X milliseconds ago, then flowchart 3500 proceeds to operation 3516 where a beam search is conducted over a fifth set of beams to determine a receive beam for TCIx. However, if the TCIx was measured more than X milliseconds ago, then flowchart 3500 proceeds from operation 3514 to operation 3518 where a beam search is conducted over a sixth set of beams to determine a receive beam for TCIx.

Returning to operation 3508, if the determination is made that the SNR for the TCIx is below the threshold Th_0, then flowchart 3500 proceeds to operation 3520 in FIG. 35B where a determination is made as to whether TCIx was measured before. If the TCIx was not measured before, then flowchart 3500 proceeds from operation 3520 to operation 3522 where a beam search is conducted over a first set of beams for determining a receive beam for TCIx. In operation 3522 the first set of candidate beams ought to cover the entire angular space of interest (e.g., 120 degrees in the UE's azimuth domain and 90 degrees in the UE's elevation domain). In this example, the candidate beams in the first set could correspond to Pattern-X and Type-I candidate beams.

Returning to operation 3520, if the determination was made that the TCIx was measured before, then flowchart 3500 proceeds to operation 3524 where a determination is made as to whether the TCIx was measured more than X milliseconds ago (i.e., more than a predetermined amount of time ago). If the TCIx was not measured more than X milliseconds ago, then flowchart 3500 proceeds to operation 3526 where a beam search is conducted over a second set of beams to determine a receive beam for TCIx. In operation 3526, the implication is that the target TCI state is not (completely) obsolete/outdated, and the receive beam that has the correspondence to the target TCI state could be used as the reference receive beam (direction) to narrow down the angular range to scan. Thus, in operation 3526 the UE searches over a second set of candidate beams to determine the receive beam for TCIx. The candidate beams in the second set may correspond to Pattern-C, obtained from Table I, and Type-I beams for a given reference receive beam (reference steering direction).

However, if the TCIx was measured more than X milliseconds ago, then flowchart 3500 proceeds from operation 3524 to operation 3528 where a beam search is conducted over a third set of beams to determine a receive beam for TCIx. If the last measurement of the target/switched TCI state was conducted by the UE more than X ms ago, then the receive beam that has the correspondence to the target TCI state may no longer be valid and is therefore not used by the UE as the reference receive beam and/or reference direction to narrow down the angular space to scan. In operation 3528 a search is performed over a third set of candidate beams to identify the receive beam for TCIx, and in this non-limiting embodiment, the candidate beams in the third set could correspond to Pattern-X and Type-I candidate beams. In this example, the first set of candidate beams and the third set of candidate beams can be identical because they are constructed under the same triggering events/conditions. Note that they may comprise of different candidate beams (different candidate beams patterns and/or types) depending on practical requirements.

Operations 3510-3518 are similar to operations 3520-3528. Therefore, the design principles of the fourth, fifth and sixth sets of candidate beams in operations 3512, 3516, and 3518, respectively, are similar to those of the first, second and third sets of candidate beams in operations 3522, 3526, and 3528. However, because the triggering conditions for operations 3510-3518 differs from the triggering conditions for operations 3520-3528, the candidate beams generated in operations 3512, 3516, and 3518 may have larger beamwidth than those generated in operations 3522, 3526, and 3528. For instance, in operation 3518, a search is performed over the sixth set of candidate beams to find the receive beam for the target TCI state TCIx, and the corresponding candidate beams could correspond to Pattern-X (covering the entire angular space of interest) and Type-III candidate beams.

Generally, in flowchart 3500, to find the receive beam for TCIx, the UE may conduct an exhaustive search over all candidate beams, and select the one that results in the best performance metric. The performance metric could be based on received signal power, RSRP, RSRQ, SNR and/or SINR. For another example, the UE may perform the search/measurement over a subset of beams out of all candidate beams. The UE could then interpolate the search/measurement results from the subset of beams, and select the receive beam from the candidate beams. The selected receive beam may or may not belong to the subset of beams. The measurement over the subset of beams could be based on received signal power, RSRP, RSRQ, SNR and/or SINR.

In preceding embodiments, various receive beam selection strategies are proposed for (unknown) TCI state switch assuming fixed thresholds or criteria to characterize the detectability and obsolete status of a given TCI state. For instance, to determine whether the target/switched TCI state is detectable during the switching period, the UE may compare the SNR for the target TCI state with a predefined threshold Th_0, which could be set as a fixed value, e.g., −3 dB, throughout the entire process. For another example, assuming that the target TCI state has been measured by the UE at least once before, the UE may compare the last measurement of the target TCI state with a predefined time window X ms to determine their obsolete status. Here, X ms may correspond to a fixed value, e.g., 80 ms. In practice, however, using a fixed threshold Th_0 and/or a fixed time window X ms to characterize the target TCI state may not achieve promising receive beam selection performance especially when the channel condition varies. For example, the channel could be highly correlated in time with large channel coherence time during a certain period of time, while it could be independent during another period of time. In this case, the target TCI state could be (completely) obsolete/outdated for a given channel realization but for a different channel realization, the target TCI state is not (completely) obsolete/outdated and could be used to determine the reference receive beam/direction, though the last measurement of the target TCI state was conducted by the UE more than a fixed X ms ago. Hence, there may be a need to adaptively configure the thresholds or criteria that characterize the detectability and obsolete status of a given TCI state according to various system settings such as the propagation channel condition. These embodiments are discussed in more detail in the figures that follow.

Figure 36:
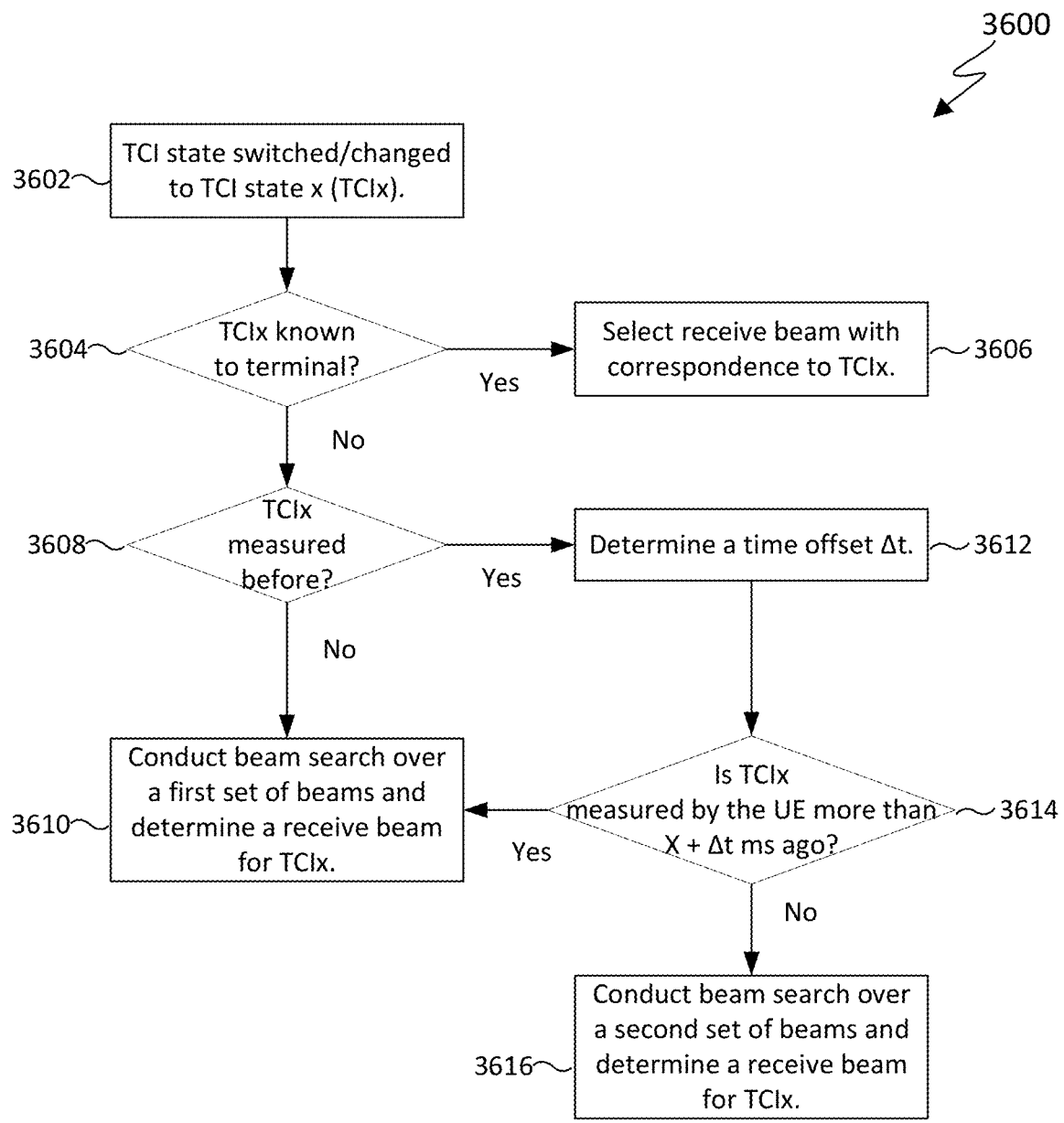
FIG. 36 illustrates a flowchart for receive beam selection in accordance with various embodiments of this disclosure.

FIG. 36 illustrates a flowchart for receive beam selection in accordance with various embodiments of this disclosure. Operations of flowchart 3600 can be implemented in a UE, such as UE 116 in FIG. 3.

The receive beam selection strategy described in flowchart 3600 is based on the obsolete status of the target TCI state and is similar to flowchart 2500A in FIG. 25. However, flowchart 3600 differs from flowchart 2500A in that it incorporates an adjustable time window to determine the obsolete status of the target TCI state. That is, in this example in FIG. 36, the UE is able to flexibly configure the obsolete status of a given TCI state to generate the corresponding candidate measurement beams and find the receive beam suited for the target TCI state TCIx.

Flowchart 3600 begins at operation 3602 by receiving an indication of a TCI state switch to TCI state x (TCIx). In operation 3604 a determination is made as to whether the TCIx is known. If the TCIx is known, then flowchart 3600 proceeds from operation 3604 to operation 3606 where a receive beam is selected with correspondence to the TCIx. If the TCIx is not known, then flowchart 3600a proceeds from operation 3604 to operation 3608 where a determination is made as to whether the TCIx was measured before.

If the TCIx was not measured before, then flowchart 3600 proceeds from operation 3608 to operation 3610 where a beam search is conducted over a first set of beams and a receive beam is determined for the TCIx.

If the TCIx was measured before, then flowchart 3600 proceeds from operation 3608 to operation 3612 where a time offset $\Delta t$ is determined. In this embodiment of the disclosure, the time offset parameter $\Delta t$ could be either a positive number or a negative number. For one example, the time offset $\Delta t$ could be implemented at the UE using a set of V discrete values, e.g., $\Delta t = \{\Delta t_0, \Delta t_1, \ldots, \Delta t_{V-1}\}$. An exemplary set of potential time offset values are presented in TABLE 3 (other values are also possible depending on practical implementation). For a given time-slot (period) and/or channel realization, the UE could select one time offset value from TABLE 3 and apply it to update the time window in operation 3614 that follows to characterize the obsolete status of the target TCI state. For instance, the UE could choose a time offset value from TABLE 3 based on their moving velocity. If the UE moves fast with high absolute/angular speed, the propagation channel would also change fast, resulting in, e.g., relatively small channel coherence time. In this case, a relatively small time window to characterize the obsolete status of the target TCI state may be needed to ensure good link quality, though the overall beam search complexity may also be increased. The UE may therefore choose $\Delta t_1 = -35$ from TABLE 3 as the time offset value to adjust/update the baseline X ms time window.

TABLE 3

| $\Delta t_0$ | $\Delta t_1$ | ... | $\Delta t_{V-2}$ | $\Delta t_{V-1}$ |
|---|---|---|---|---|
| −40 | −35 | ... | 35 | 40 |

After the time offset is determined, flowchart 3600 proceeds to operation 3614 where a determination is made as to whether the TCIx was measured more than X+$\Delta t$ milliseconds ago. In this operation, the UE applies the time offset value $\Delta t$ to adjust/update the baseline X millisecond time window. The new time window then becomes to X+$\Delta t$ ms to characterize the obsolete status of a given TCI state. If $\Delta t = 0$, the UE would continue to use the X ms time window to characterize the obsolete status of a given TCI state.

If the TCIx was measured more than X+$\Delta t$ milliseconds ago, the target TCI state would be considered to be (completely) obsolete/outdated so that flowchart 3600 proceeds from operation 3614 to operation 3610. However, if the TCIx was not measured more than X+$\Delta t$ milliseconds ago, the target TCI state is not considered (completely) obsolete/outdated so that flowchart 3600 proceeds to operation 3616 where a beam search is conducted over a second set of beams to determine the receive beam for TCIx.

The first set and the second set of candidate beams in operations 3610 and 3616, respectively, could be similarly generated/constructed by the UE to those in operations 2510 and 2514 in FIG. 25A. As only the obsolete status is checked by the UE in this example without accounting for the SNR for the target TCI state, the candidate beams in the first and second sets in operations 3610 and 3616 are mainly different in terms of the candidate beams pattern, which can be selected from a look-up table predetermined at the terminal. An exemplary look-up table is presented in TABLE 4. The look-up table maps the candidate beams pattern to the last measurement time of the target TCI state along with certain information set that captures the necessary sensing information collected at the UE. TABLE 4 differs from TABLE 1 in that the time offset value is incorporated in TABLE 4 to adjust the corresponding time windows for all the rows. For instance, if the last measurement of the target/switched TCI state was performed by the UE more than $X_3+\Delta t$ ms but less than $X_2+\Delta t$ ms ago, and the UE's information set can be best characterized by $\{\Psi_4\}$, the second set of candidate beams could correspond to Pattern-E candidate beams in FIG. 29, formed surrounding the reference receive beam that has the correspondence to the target TCI state.

TABLE 4

| Last measurement time t of target TCI state | Information set | Candidate beams pattern |
|---|---|---|
| t > X + $\Delta t$ ms | N/A | Pattern-X |
| t ∈ ($X_1 + \Delta t$, X + $\Delta t$] ms | $\{\Psi_0\}$ | Pattern-A |
| t ∈ ($X_1 + \Delta t$, X + $\Delta t$] ms | $\{\Psi_1\}$ | Pattern-B |
| t ∈ ($X_2 + \Delta t$, $X_1 + \Delta t$] ms | $\{\Psi_2\}$ | Pattern-C |

TABLE 4-continued

| Last measurement time t of target TCI state | Information set | Candidate beams pattern |
|---|---|---|
| t ∈ (X$_2$ + Δt, X$_1$ + Δt] ms | {Ψ$_3$} | Pattern-D |
| t ∈ (X$_3$ + Δt, X$_2$ + Δt] ms | {Ψ$_4$} | Pattern-E |
| ... | ... | ... |

Figure 37:
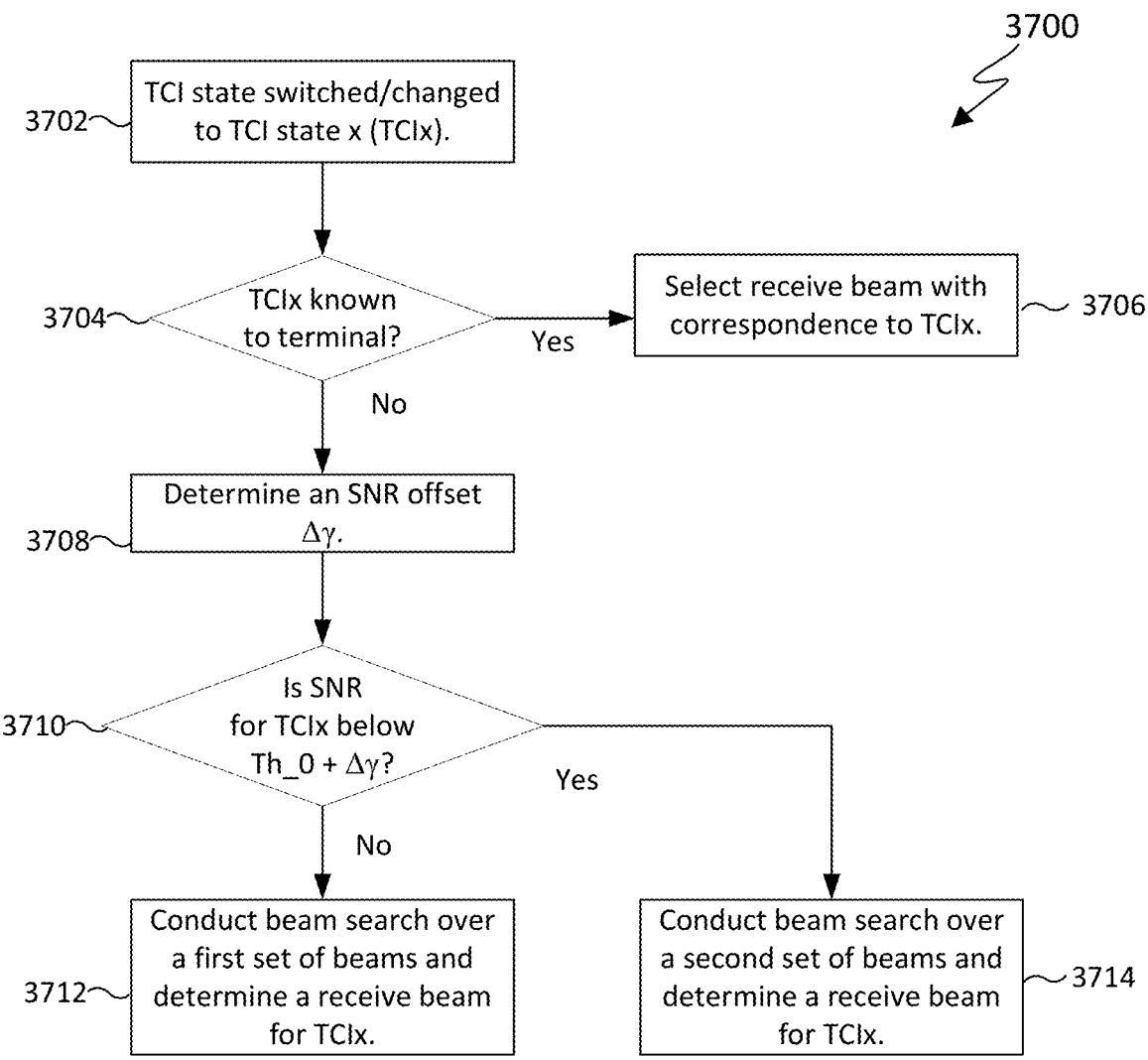
FIG. 37 illustrates a flowchart for receive beam selection in accordance with various embodiments of this disclosure.

FIG. 37 illustrates a flowchart for receive beam selection in accordance with various embodiments of this disclosure. Operations of flowchart 3700 can be implemented in a UE, such as UE 116 in FIG. 3.

The receive beam selection strategy described in flowchart 3700 is based on the SNR condition for the target/switched TCI state and is similar to flowchart 3000 in FIG. 30. However, flowchart 3700 differs from flowchart 3000 in that it incorporates an SNR offset value Δγ to adaptively adjust/update the SNR threshold and therefore flexibly configure the detectability of a given TCI state to generate the corresponding candidate measurement beams to find the receive beam suited for the target TCI state TCIx.

Flowchart 3700 begins at operation 3702 by receiving an indication of a TCI state switch to TCI state x (TCIx). In operation 3704 a determination is made as to whether the TCIx is known. If the TCIx is known, then flowchart 3700 proceeds from operation 3704 to operation 3706 where a receive beam is selected with correspondence to the TCIx.

If the TCIx is not known, then flowchart 3700 proceeds from operation 3704 to operation 3708 where an SNR offset Δγ is determined. In one embodiment, the SNR offset Δγ could be either positive or negative. For one example, the SNR offset Δγ could be implemented at the UE using a set of U discrete values, e.g., Δγ={Δγ$_0$, Δγ$_1$, . . . , Δγ$_{U-1}$}. In TABLE 5, a set of potential SNR offset values are given (other values are also possible depending on practical implementation). For a given time-slot (period) and/or channel realization, the UE could select one SNR offset value from TABLE 5 and apply it to update the SNR threshold in operation 3710 to characterize the detectability of the target TCI state. For instance, the UE could choose an SNR offset value from TABLE 5 based on certain past measurement. The past measurement may correspond to one or more SNRs for the target TCI state measured in the past, e.g., during the last several measurements and/or in the previous several time-slots. The sum, average and/or other forms of the previously measured SNRs for the target TCI state could also be considered as the past SNR measurement. For example, the past SNR measurement for the target TCI state could be much higher than the baseline threshold Th_0. In this case, a relatively large SNR threshold may be preferable to characterize the detectability of the target TCI state to reduce the overall beam search complexity. The UE may therefore choose Δγ$_{U-2}$=20 from TABLE 5 as the SNR offset value to adjust/update the baseline SNR threshold Th_0.

TABLE 5

| Δγ$_0$ | Δγ$_1$ | ... | Δγ$_{U-2}$ | Δγ$_{U-1}$ |
|---|---|---|---|---|
| -25 | -20 | ... | 20 | 25 |

Flowchart 3700 proceeds from operation 3708 to operation 3710 where a determination is made as to whether the SNR for TCIx is below Th_0+Δγ. The SNR offset value is applied to to adjust/update the baseline SNR threshold Th_0. The new SNR threshold could then become to Th_0+Δγ to characterize the detectability of a given TCI state. If Δγ=0, the UE would continue to use the baseline SNR threshold Th_0 to characterize the detectability of a given TCI state.

If the SNR for TCIx is not below Th_0+Δγ, then flowchart 3700 proceeds from operation 3710 to operation 3712 where a beam search is conducted over a first set of beams to determine a receive beam for TCIx. However, if the SNR for TCIx is below Th_0+Δγ, then flowchart 3700 proceeds from operation 3710 to operation 3714 where a beam search is conducted over a second set of beams to determine a receive beam for TCIx.

The first set and the second set of candidate beams in operations 3712 and 3714 could be similarly generated/constructed by the UE to those in operation 3010 and 3012 in FIG. 30. As only the SNR condition is checked by the UE in this example without further examining the obsolete status, the candidate beams in the first and second sets of candidate beams in operation 3712 and 3714 differ mainly in terms of the candidate beams type, which can be selected from a look-up table implemented at the terminal. An exemplary lookup table is provided in TABLE 6, which maps the candidate beams type and/or the desired beamwidth to the exact SNR for the target TCI state. TABLE 6 differs from TABLE 2 in that the SNR offset value is incorporated in TABLE 6 to adjust the corresponding SNR thresholds for all the rows. For instance, if the SNR for the target TCI state is beyond Th_1+Δγ but less than Th_2+Δγ, the desired beamwidth for the candidate beams could be Θ$_2$ from Table 6, and the candidate beams in the second set may correspond to Type-III candidate beam depicted in FIG. 32. In this case, the UE uses Pattern-X & Type-III candidate beams in the second set to cover the entire angular range of interest.

TABLE 6

| SNR for target/switched TCI state | Desired beam width | Candidate beams type |
|---|---|---|
| γ ≤ Th_0 + Δγ | Θ$_0$ | Type-I |
| Th_0 + Δγ < γ ≤ Th_1 + Δγ | Θ$_1$ | Type-II |
| Th_1 + Δγ < γ ≤ Th_2 + Δγ | Θ$_2$ | Type-III |
| Th_2 + Δγ < γ ≤ Th_3 + Δγ | Θ$_3$ | Type-IV |
| ... | ... | ... |

Figure 38:
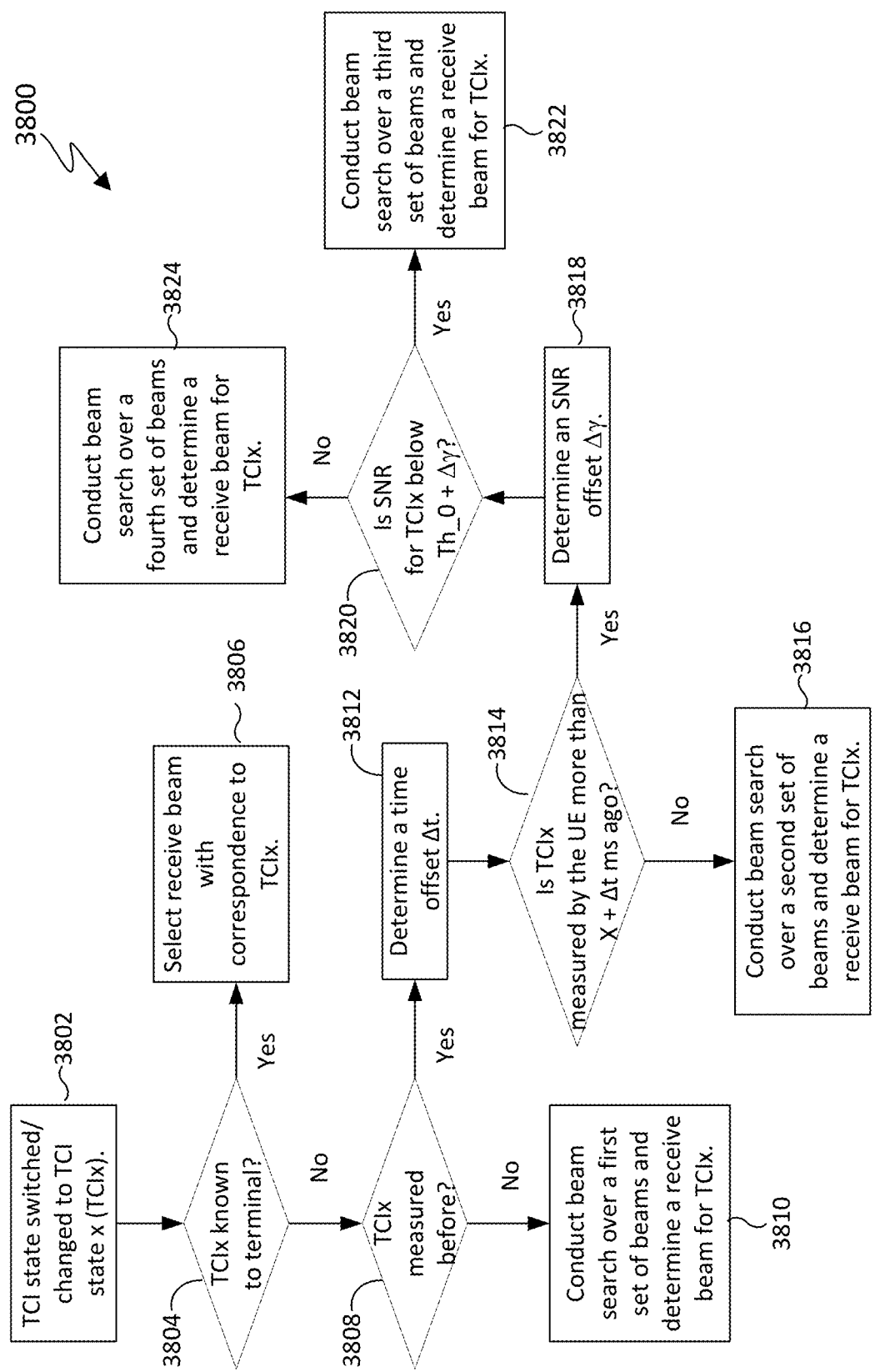
FIG. 38 illustrates a flowchart for receive beam selection in accordance with various embodiments of this disclosure.

In FIGS. 38 and 39 that follow, two additional algorithms supporting fast receive beam selection/operation strategies are developed for the TCI state switch. In these two algorithms, both the obsolete status and the SNR condition for the target TCI state are examined by the UE to facilitate the receive beam search process under unknown TCI state switch. The thresholds and criteria used to characterize the obsolete status and detectability of the target TCI state can be flexibly configured by the UE based on past measurement, channel condition and etc.

FIG. 38 illustrates a flowchart for receive beam selection in accordance with various embodiments of this disclosure. Operations of flowchart 3800 can be implemented in a UE, such as UE 116 in FIG. 3.

Flowchart 3800 begins at operation 3802 by receiving an indication of a TCI state switch to TCI state x (TCIx). In operation 3804 a determination is made as to whether the TCIx is known. If the TCIx is known, then flowchart 3800 proceeds from operation 3804 to operation 3806 where a receive beam is selected with correspondence to the TCIx.

If the TCIx is not known, then flowchart 3800 proceeds from operation 3804 to operation 3808 where a determination is made as to whether the TCIx was measured before. If the TCIx was not measured before, then flowchart 3800 proceeds from operation 3808 to operation 3810 where a beam search is conducted over a first set of beams for determining a receive beam for TCIx.

Returning to operation 3808, if the determination was made that the TCIx was measured before, then flowchart 3800 proceeds to operation 3812 where a time offset Δt is determined. In operation 3814 a determination is made as to whether the TCIx was measured more than X+Δt milliseconds ago. If the TCIx was not measured more than X+Δt milliseconds ago, then flowchart 3800 proceeds from operation 3814 to operation 3816 where a beam search is conducted over a second set of beams to determine the receive beam for TCIx.

Returning to operation 3814, if the TCIx was measured more than X+Δt milliseconds ago, then flowchart 3800 proceeds to operation 3818 and determines an SNR offset Δγ. In operation 3820 a determination is made as to whether the SNR for TCIx is below Th_0+Δγ. If the SNR for TCIx is below Th_0+Δγ, then flowchart 3800 proceeds from operation 3820 to operation 3822 where a beam search is conducted over a third set of beams to determine a receive beam for TCIx. However, if the SNR for TCIx is not below Th_0+Δγ, then flowchart 3800 proceeds from operation 3820 to operation 3824 where a beam search is conducted over a fourth set of beams to determine a receive beam for TCIx.

The construction of the candidate beams in the first set, second set, third set, and fourth set in operations 3810, 3816, 3822, and 3824, respectively, and their corresponding receive beam search procedure are similar to those in operations 3310, 3314, 3318, and 3320 in FIG. 33. However, flowchart 3800 differs from flowchart 3300 in that flowchart 3800 incorporates a time offset value Δt and an SNR offset value Δγ. The calculations of the time offset Δt and the SNR offset Δγ follow those described in FIGS. 36 and 37.

In operation 3814 of flowchart 3800, the time offset is applied to adjust/update the time window used to characterize the obsolete status of the target TCI state. In operation 3820 of flowchart 3800, the SNR offset is applied to adjust/update the SNR threshold to characterize the detectability of the target TCI state. Operations 3814 and 3820 in flowchart 3800 are similar to operation 3614 in flowchart 3600 and operation 3710 in flowchart 3700, respectively.

Figure 39A:
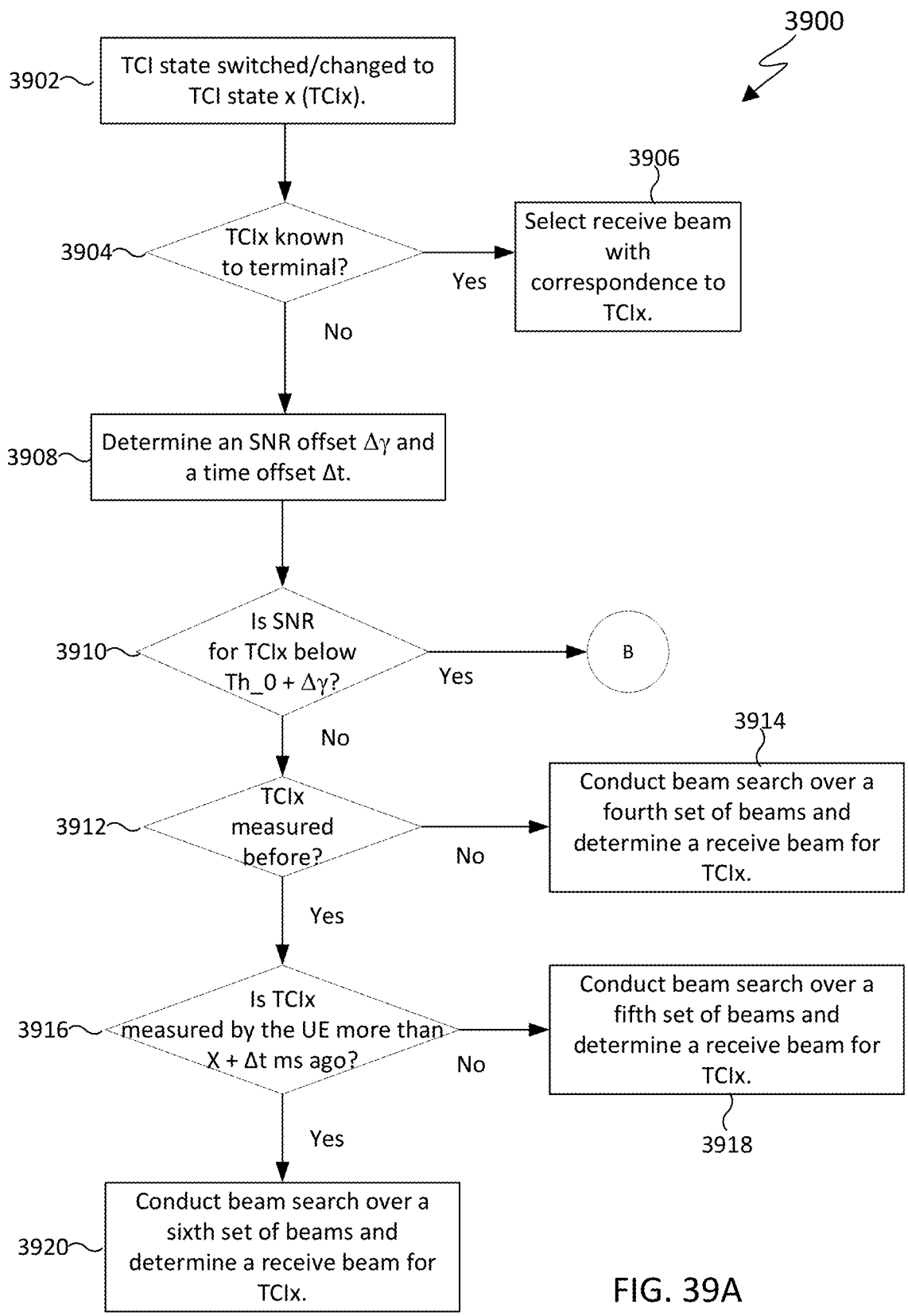
FIGS. 39A and 39B illustrate a flowchart for receive beam selection in accordance with various embodiments of this disclosure.
Figure 39B:
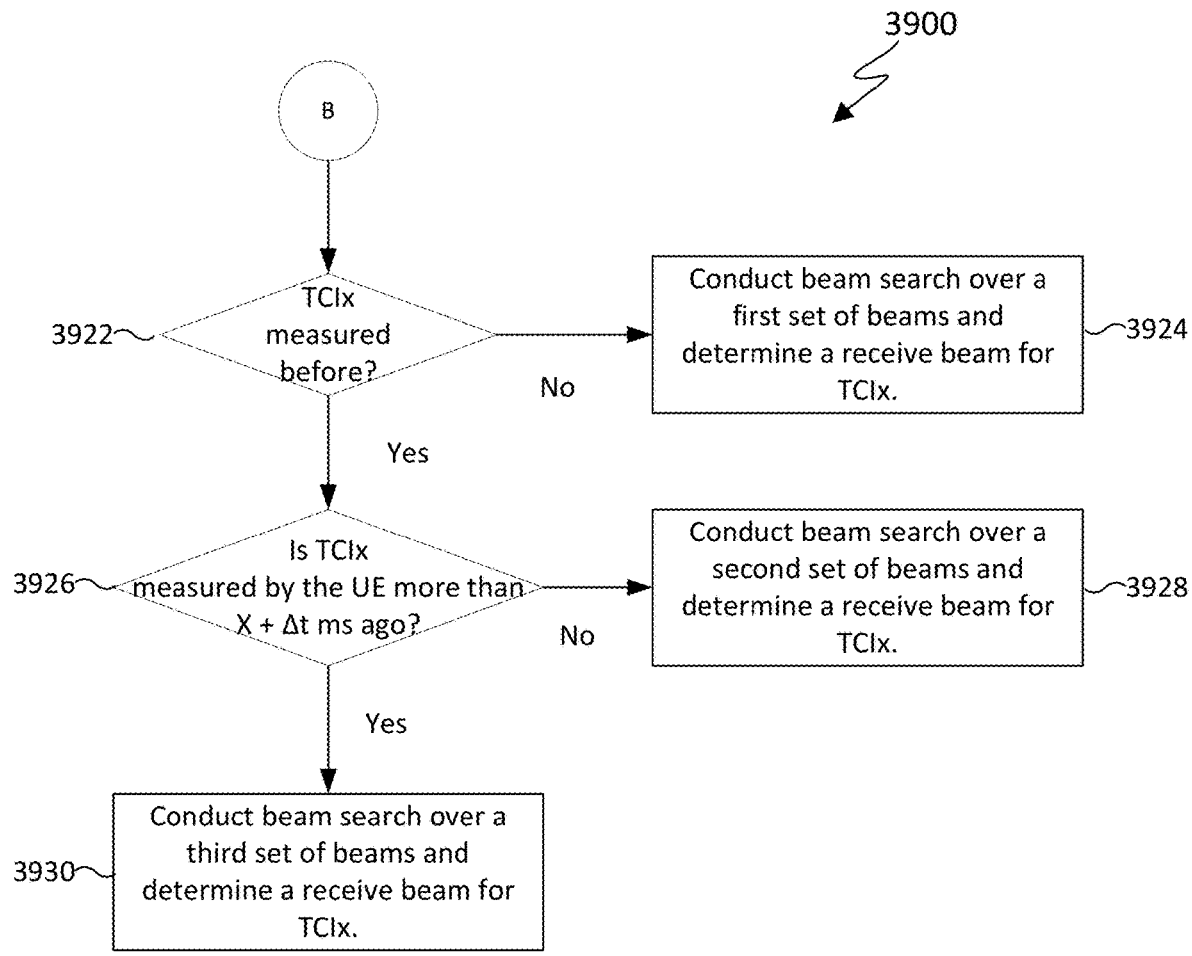

FIGS. 39A and 39B illustrate a flowchart for receive beam selection in accordance with various embodiments of this disclosure. Operations of flowchart 3900 can be implemented in a UE, such as UE 116 in FIG. 3.

Flowchart 3900 begins at operation 3902 by receiving an indication of a TCI state switch to TCI state x (TCIx). In operation 3904 a determination is made as to whether the TCIx is known. If the TCIx is known, then flowchart 3900 proceeds from operation 3904 to operation 3906 where a receive beam is selected with correspondence to the TCIx. If the TCIx is not known, then flowchart 3900 proceeds to operation 3908 where an SNR offset Δγ and a time offset Δt are determined.

In operation 3910 a determination is made as to whether the SNR for TCIx is below Th_0+Δγ. If the SNR for TCIx is not below Th_0+Δγ, then flowchart 3900 proceeds to operation 3912 a determination is made as to whether TCIx was measured before. If the TCIx was not measured before, then flowchart 3900 proceeds from operation 3912 to operation 3914 where a beam search is conducted over a fourth set of beams for determining TCIx. If TCIx was measured before, then flowchart 3900 proceeds from operation 3912 to operation 3916 where a determination is made as to whether the TCIx was measured more than X+Δt milliseconds ago. If the TCIx was not measured more than X+Δt milliseconds ago, then flowchart 3900 proceeds from operation 3916 to operation 3918 where a beam search is conducted over a fifth set of beams to determine the receive beam for TCIx. However, if the TCIx was measured more than X+Δt milliseconds ago, then flowchart 3900 proceeds from operation 3916 to operation 3920 where a beam search is conducted over a sixth set of beams to determine the receive beam for TCIx.

Returning to operation 3910, if the SNR for TCIx is below Th_0+Δγ, then flowchart 3900 proceeds from operation 3910 to operation 3922 in FIG. 39B where a determination is made as to whether TCIx was measured before. If TCIx was not measured before, then flowchart 3900 proceeds to operation 3924 where a beam search is conducted over a first set of beams to determine the receive beam for TCIx. If TCIx was measured before, then flowchart 3900 proceeds from operation 3922 to operation 3926 where a determination is made as to whether the TCIx was measured more than X+Δt milliseconds ago. If the TCIx was not measured more than X+Δt milliseconds ago, then flowchart 3900 proceeds from operation 3926 to operation 3928 where a beam search is conducted over a second set of beams to determine the receive beam for TCIx. If the TCIx was measured more than X+Δt milliseconds ago, then flowchart 3900 proceeds from operation 3926 to operation 3930 where a beam search is conducted over a third set of beams to determine the receive beam for TCIx.

The construction of the candidate beams and their corresponding receive beam search procedure in the first set, the second set, the third set, the fourth set, the fifth set, and the sixth set in operations 3924, 3928, 3930, 3914, 3918, and 3920 of FIG. 39, respectively, correspond to the construction and search of the first set, the second set, the third set, the fourth set, the fifth set, and the sixth set in operations 3522, 3526, 3528, 3512, 3516, and 3518 of FIG. 35, respectively. Flowchart 3900 differs from flowchart 3500 in that flowchart 3900 incorporates a time offset value Δt and an SNR offset value Δγ. The calculations of the time offset Δt and the SNR offset Δγ follow those described in FIGS. 36 and 37.

In operation 3910 of flowchart 3900, the SNR offset is applied to adjust/update the SNR threshold to characterize the detectability of the target TCI state. In operations 3916 and 3926 of flowchart 3900, the time offset is applied to adjust/update the time window used to characterize the obsolete status of the target TCI state. Operation 3910 in flowchart 3900 is similar to operation 3710 in flowchart 3700 and operations 3916 and 3926 are similar to operation 3614 in flowchart 3600.

In some of the previous embodiments of this disclosure, for a given time instant, time period, time slot or channel realization, the receive beam selection is conducted by the UE assuming an SNR threshold, e.g., Th_0, to characterize the detectability of a given TCI state, and/or a time window, e.g., X ms, to characterize the obsolete status of a given TCI state, though in some cases, the SNR threshold and the time window could be adjusted/updated based on the channel variation and/or past measurement. In some deployment scenarios, however, multiple (more than one) SNR thresholds (e.g., two thresholds Th_0 and Th_1) and/or multiple (more than one) time windows (e.g., two time windows X and Y ms) to respectively characterize the detectability and the obsolete status of a given TCI state may be needed for a given time instant, time period, time slot or channel realization.

In the next embodiment, an algorithm flow-chart explaining several receive beam selection strategies are presented assuming that the obsolete status of the target TCI state is checked by two time windows, which are Y ms and X ms in this example satisfying Y>X. In this example, the X ms can be considered as the baseline time window, while Y ms is an additional time window.

Figure 40:
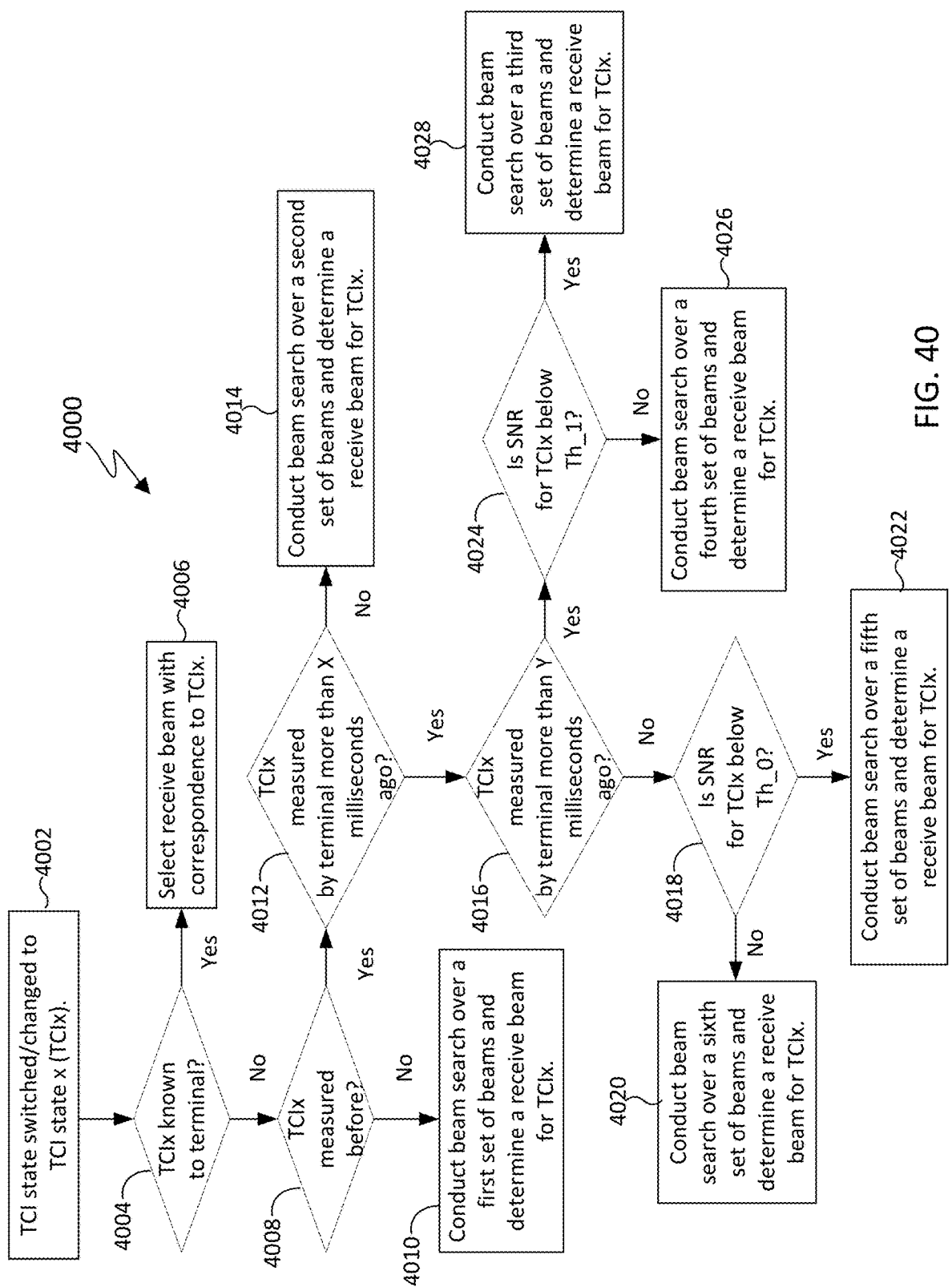
FIG. 40 illustrates a flowchart for receive beam selection in accordance with various embodiments of this disclosure.

FIG. 40 illustrates a flowchart for receive beam selection in accordance with various embodiments of this disclosure. Operations of flowchart 4000 can be implemented in a UE, such as UE 116 in FIG. 3.

Flowchart 4000 begins at operation 4002 by receiving an indication of a TCI state switch to TCI state x (TCIx). In operation 4004 a determination is made as to whether the TCIx is known. If the TCIx is known, then flowchart 4000 proceeds from operation 4004 to operation 4006 where a receive beam is selected with correspondence to the TCIx.

If the TCIx is not known, then flowchart 4000 proceeds from operation 4004 to operation 4008 where a determination is made as to whether the TCIx was measured before. If the TCIx was not measured before, then flowchart 4000 proceeds from operation 4008 to operation 4010 where a beam search is conducted over a first set of beams for determining a receive beam for TCIx.

Returning to operation 4008, if the determination was made that the TCIx was measured before, then flowchart 4000 proceeds to operation 4012 where a determination is made as to whether the TCIx was measured more than X milliseconds ago (i.e., more than a predetermined amount of time ago). If the TCIx was not measured more than X milliseconds ago, then flowchart 4000 proceeds to operation 4014 where a beam search is conducted over a second set of beams to determine a receive beam for TCIx.

However, if the TCIx was measured more than X milliseconds ago, then flowchart 4000 proceeds from operation 4012 to operation 4016 where a determination is made as to whether TCIx was measured more than Y milliseconds ago (i.e., more than a predetermined amount of time ago where Y>X). If the TCIx was not measured more than Y milliseconds ago, then flowchart 4000 proceeds to operation 4018 where a determination is made as to whether SNR for TCIx is below a threshold Th_0.

If the SNR for TCIx is below the threshold, then flowchart 4000 proceeds to operation 4022 where a beam search is conducted over a fifth set of beams to determine a receive beam for TCIx. However, if the SNR for TCIx is not below the threshold, then flowchart 4000 proceeds from operation 4018 to operation 4020 where a beam search is conducted over a sixth set of beams to determine a receive beam for TCIx.

Returning to operation 4016, if the determination is made that the TCIx was measured more than Y milliseconds ago, then flowchart 4000 proceeds to operation 4024 where a determination is made as to whether SNR for TCIx is below a second threshold Th_1. If the SNR for TCIx is below the second threshold, then flowchart 4000 proceeds to operation 4028 where a beam search is conducted over a third set of beams to determine a receive beam for TCIx. However, if the SNR for TCIx is not below the second threshold, then flowchart 4000 proceeds from operation 4024 to operation 4026 where a beam search is conducted over a fourth set of beams to determine a receive beam for TCIx.

The construction of the candidate beams in the first set, the second set, the third set, the fourth set, the fifth set, and the sixth set in flowchart 4000 are similar to the construction of the candidate beams in the first set, the second set, the third set, the fourth set, the fifth set, and the sixth set in flowchart 4000, respectively. Beam search procedures are also similar.

In flowchart 4000, the UE further checks whether the last measurement of the target TCI state is conducted by the UE more than Y ms ago in operation 4016, where Y>X. If the last measurement of the target TCI state was measured by the UE more than X ms ago but less than Y ms ago, the target TCI state is still considered as not (completely) obsolete/outdated such that the receive beam that has the correspondence to the target TCI state can still be used as the reference beam (direction) to confine the angular range of interest to scan.

Note that the second time window Y ms in addition to the baseline X ms time window, or multiple time windows (more than two) can be applied to the algorithms in flowcharts 2500*a*, 3300, 3500, 3600, 3700, 3800, 3900, and 4000 for the UE to further examine the obsolete status of the target TCI state, and perform the corresponding receive beam operations. A second SNR threshold, e.g., Th_1 in addition to the baseline SNR threshold Th_0, or multiple SNR thresholds (more than two) can also be applied to the algorithms in flowcharts 3000, 3300, 3500, 3600, 3700, 3800, 3900, and 4000 for the UE to further check the detectability of the target TCI state, and perform the corresponding receive beam selection strategies.

Figure 41:
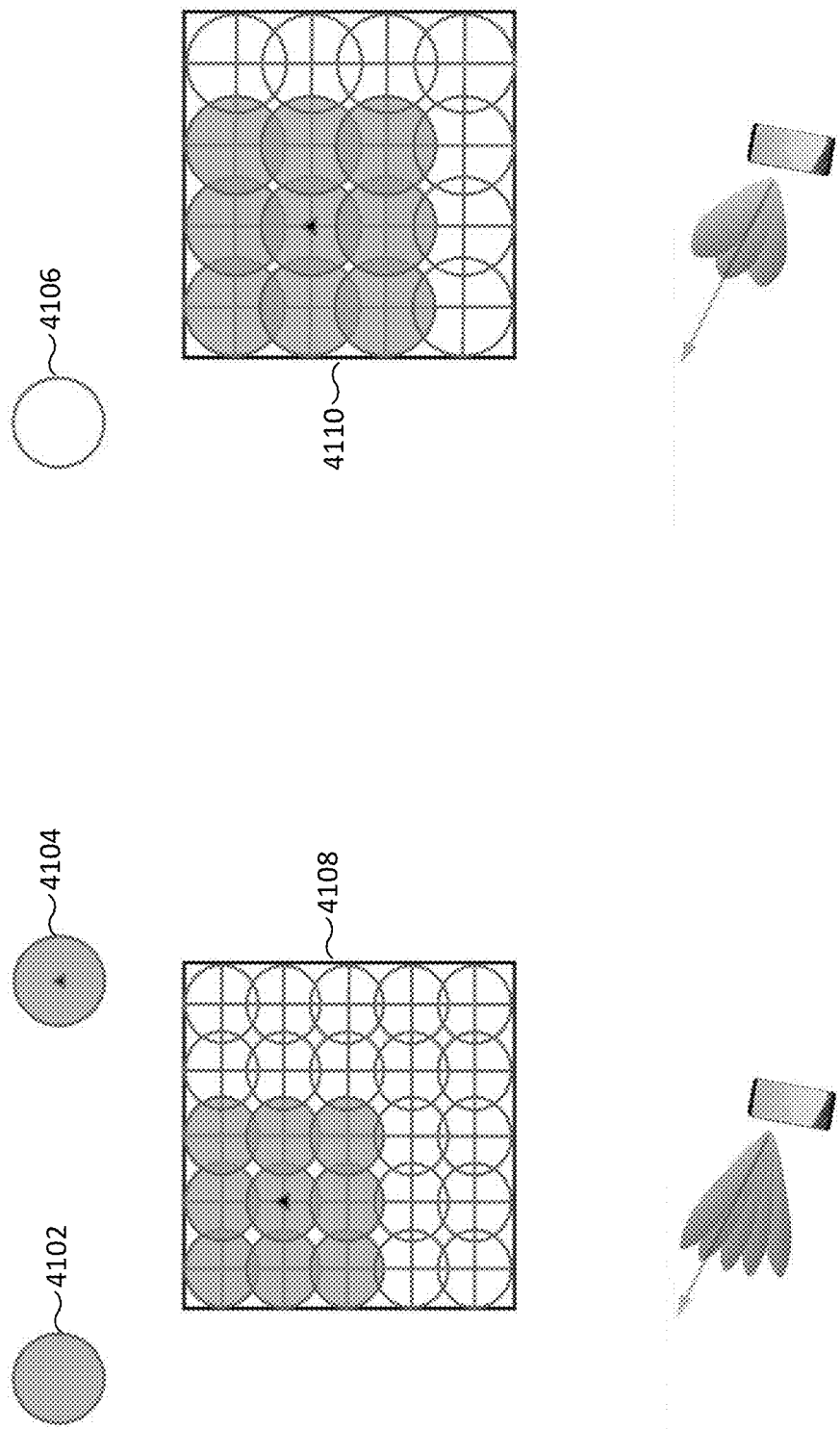
FIG. 41 illustrates conceptual examples of candidate beams for selection for the fifth set of beams and the sixth set of beams in accordance with various embodiments of this disclosure.

FIG. 41 illustrates conceptual examples of candidate beams for selection for the fifth set of beams and the sixth set of beams in accordance with various embodiments of this disclosure, and in particular, to the embodiment described in FIG. 40. Set of beams 4108 corresponds to the fifth set of candidate beams from operation 4022 in FIG. 40, e.g., Type-I candidate beams in Pattern-A. Set of beams 4110 corresponds to the sixth set of candidate beams from operation 4020 in FIG. 40, e.g., Type-II candidate beams in Pattern-A.

As described earlier, a shaded circle 4102 in each of the set of beams 4108 and 4110 represents candidate beams. A shaded circle 4104 with a triangle in the center represents a reference receive beam/direction. An unshaded circle 4106 represents any remaining beams in the beam codebook.

The receive beam selection strategies described herein can be applied to various application scenarios, though the detailed design procedure is explicitly discussed for unknown TCI state switch. For example, the exploitation of a reference beam (direction) to narrow down the angular search space and adjusting the beam-specific parameters such as beamwidth, beam shape, etc. based on the SNR can also be exploited in the initial access process and the beamforming based inter-cell measurement. Several related use cases are presented and discussed as follows.

Use case 1: fast receive beam selection under unknown TCI state switch. Due to sudden link failure, blockage, etc., the BS or the network may change the TCI state, and send the corresponding command to the UE to inform the UE about the switched TCI state. If the switched TCI state is unknown to the UE such that the UE has never measured the switched TCI state before, or the last measurement is completely obsolete, the UE may have to perform a full receive beam sweep to find a receive beam for the switched TCI state. The proposed receive beam operation/selection strategies could be applied here to reduce the search complexity, access delay, and outage rate.

Use case 2: fast receive beam selection during initial access. In the third phase during the initial access process, the UE refines the receive beam by means of receive beam sweep/search over the given angular space. By implementing the proposed receive beam operation/selection strategies at the UE, the receive beam refinement in p-3 can be greatly facilitated, and the corresponding initial access delay can be significantly reduced.

Use case 3: directional beamforming based inter-cell measurement. To perform the inter-cell measurement, the UE may need to form narrow measurement beams to ensure sufficient link quality. A relatively large number of narrow measurement beams may be needed to cover the entire angular range. Sweeping over all the narrow measurement beams may be time and power consuming, and may introduce additional delay. Obviously, the proposed receive beam operation/selection strategies can be applied here as well to facilitate the inter-cell measurement process.

Use case 4: beam search in several mobility scenarios such as handover, RRC re-connection and RRC re-establishment. In many mobility configurations such as handover and RRC re-connection/re-establishment, receive beam search is usually executed at the UE to find the best cell/beam to connect or camp on. If the target cell or target frequency is unknown to the UE such that the target cell or the target frequency is never measured by the UE before or the last measurement is completely obsolete, full receive beam search may be needed to properly handle various mobility conditions.

Transmit Beam Management at the Mobile Terminal

As previously discussed, the asymmetry in the downlink and uplink link budget limits radio coverage for UEs. To mitigate the asymmetry in downlink and uplink link budget, the UE can employ wide Rx beam to receive downlink signals and narrow Tx beam to transmit uplink signals because narrow Tx beam has higher beam gain than the wide Rx beam. A wide Rx beam is advantageous to support robust mobility and reduce the time needed for beam searching. A narrow Tx beam can be used to extend uplink coverage and effectively increase the cell coverage since uplink is the bottleneck for cell coverage.

Figure 42:
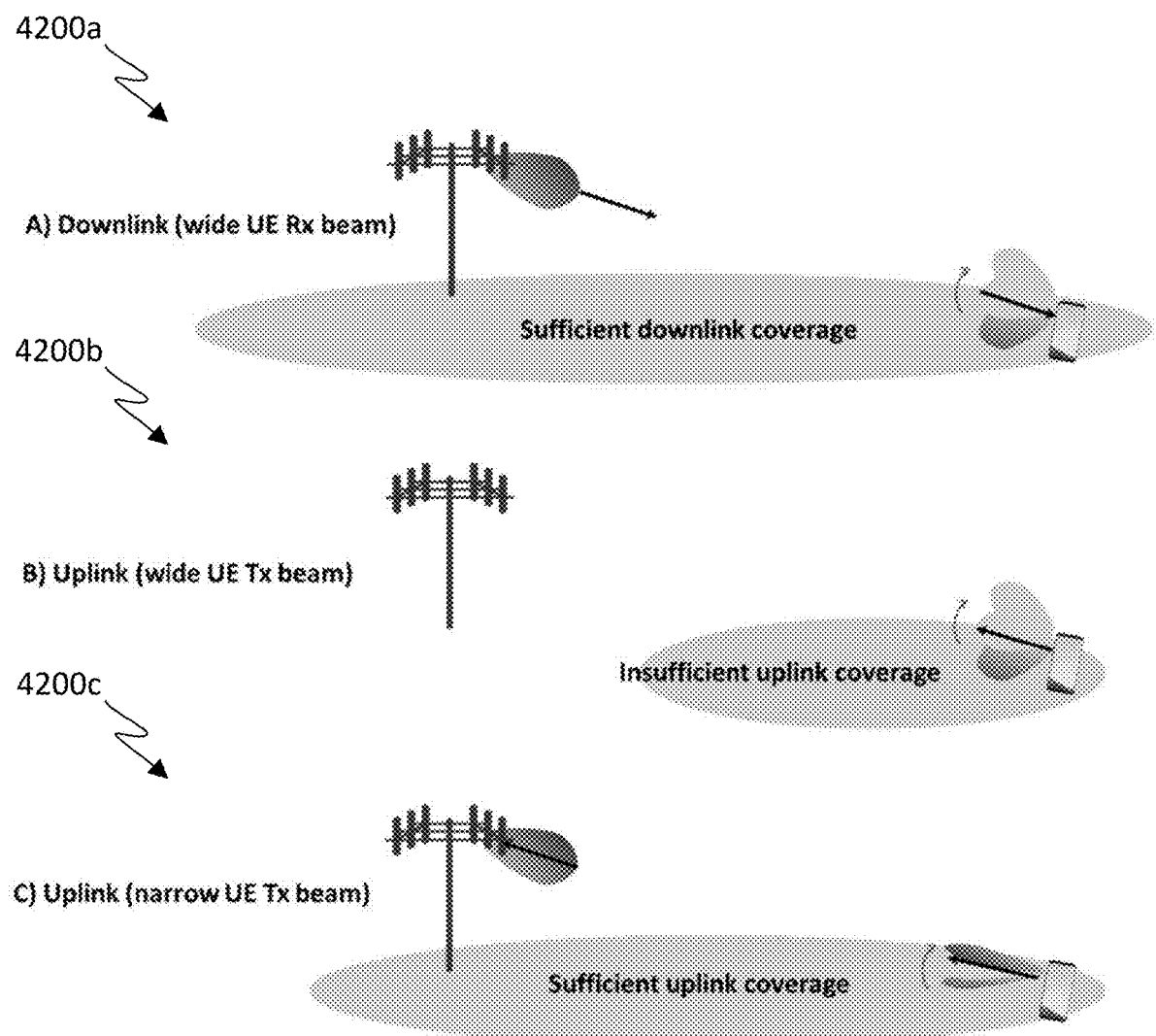
FIG. 42 illustrates the asymmetry in the downlink and uplink link budget limits for UE radio coverage in accordance with various embodiments of this disclosure.

FIG. 42 illustrates the asymmetry in the downlink and uplink link budget limits for UE radio coverage in accordance with various embodiments of this disclosure. In 4200*a*, a UE employing a wide Rx beam to receive signals in the downlink has sufficient downlink coverage, represented by an area that encompasses both the BS and the UE. In 4200*b*, a UE employing a wide Tx beam to transmit signals in the uplink has insufficient uplink coverage, represented by an area that only encompasses the UE. In 4200*c*, a UE employing a narrow Tx beam to transmit signals in the uplink has sufficient uplink coverage, represented by an area that encompasses both the BS and the UE.

The UE may need to switch between a wide Tx beam (beam type 1) and a narrow Tx beam (beam type 2) depending on the channel condition. Some of the embodiments that follow with describe methods to enable the UE to detect the condition(s) to switch from one Tx beam type to another. The beam type is used to indicate the beam gain and the beamwidth characteristics. Although two beam types are assumed in the embodiments of this disclosure, the embodiments can also be applied to a beamforming system with more than two beam types.

Figure 43:
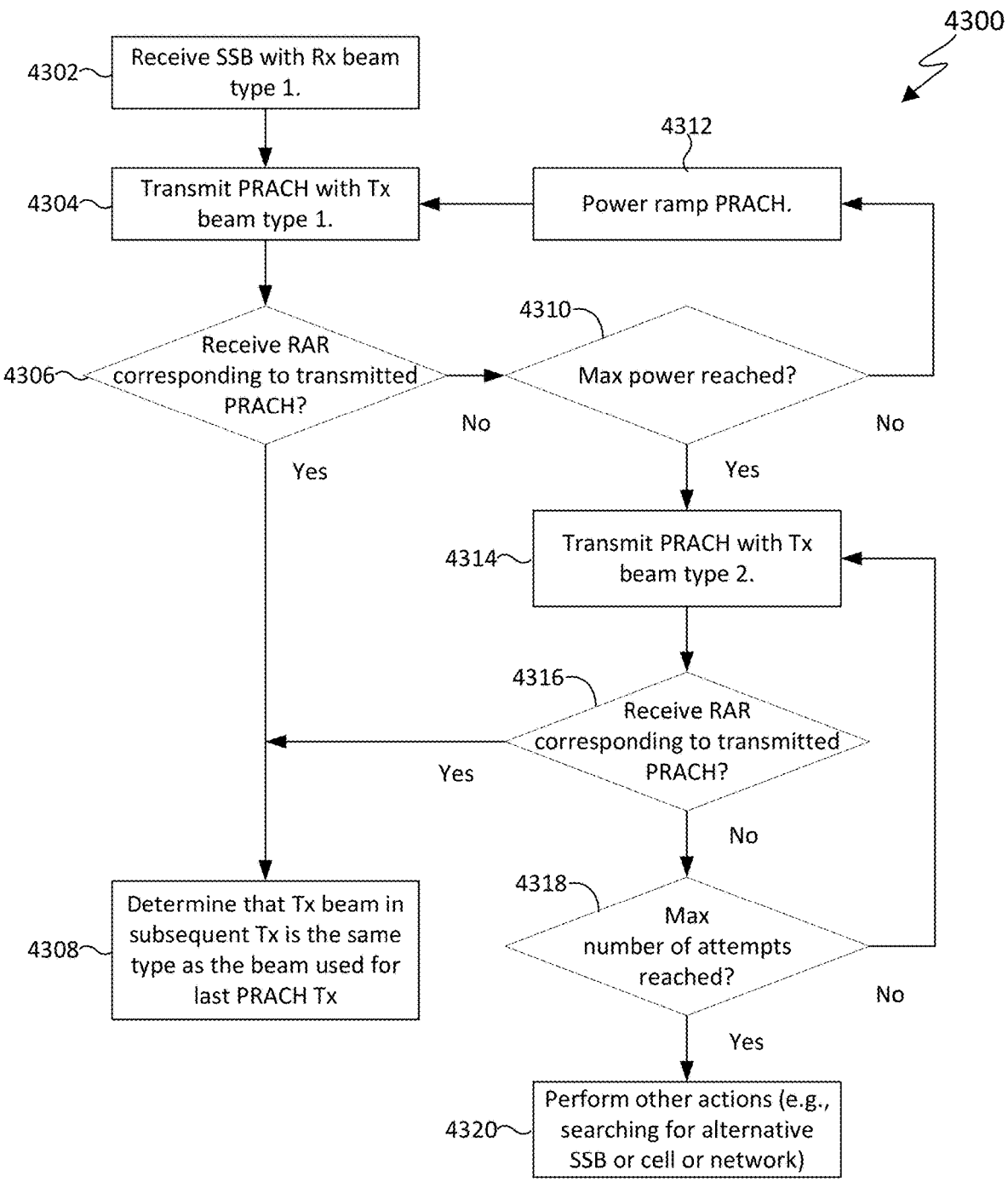
FIG. 43 illustrates a flowchart for determining a transmit beam from a random access procedure in accordance with various embodiments of this disclosure.

FIG. 43 illustrates a flowchart for determining a transmit beam from a random access procedure in accordance with various embodiments of this disclosure. The random access procedure can be contention based or non-contention based. An example of contention based random access procedure is the random access performed for initial cell access. An example of non-contention based random access procedure is the random access performed for beam failure recovery. Operations of flowchart 4300 can be implemented in a UE, such as UE 116 in FIG. 3.

Flowchart 4300 begins at operation 4302 by receiving a synchronization signal block (SSB) on a type 1 Rx beam, i.e. a wide Rx beam. For initial access, the SSB is the one the UE has chosen to receive Master Information Block (MIB) to gain the necessary information to access the cell. For beam failure recovery, the SSB can be the reference signal for new candidate beam identification in one embodiment; however, CSI-RS can also be used in another embodiment.

In operation 4304, a physical random access channel (PRACH) is transmitted with Tx beam type 1. The transmit beam can be of the same spatial filter as the one used for the receive beam to receive the SSB or the CSI-RS. In some embodiments, operation 4304 occurs after receiving the other system information, e.g. SIB1 using the same receive beam in operation 4302.

In operation 4306 a determination is made as to whether a random access response (RAR) is received corresponding to the transmitted PRACH. If the RAR is received that corresponds with the transmitted PRACH, then flowchart 4300 proceeds to operation 4308 where the transmit beam in the subsequent transmission is determined to be the same type as the transmit beam used for the last PRACH transmission. Examples of subsequent transmissions includes physical uplink control channel (PUCCH), physical uplink shared channel (PUSCH), and PRACH transmissions. In some embodiments, the same transmit beam is used until new configuration is received, or otherwise indicated by the network.

In operation 4306, if the RAR corresponding to the transmitted PRACH is not received, then flowchart 4300 proceeds to operation 4310 where a determination is made as to whether max transmission power has been reached. If max transmission power has not been reached, then flowchart 4300 proceeds to operation 4312 where the transmission power for the PRACH is ramped up before returning to operation 4304.

Returning to operation 4310, if the determination is made that max power is reached, then flowchart 4300 proceeds to operation 4314 and the PRACH is transmitted with a transmit beam of type 2. In some embodiments, the PRACH can be transmitted with maximum power, or the most recently used transmit power. In some embodiments, the transmit beam of type 2 has a similar spatial parameter as the current receive beam used for SSB or CSI-RS reception (i.e. quasi co-location of type D as defined in TS 38.214). Additionally, a suitable transmit beam or a best Tx beam of type 2 can be determined by first determining the suitable or best receive beam of type 2 via reciprocity or beam correspondence, e.g. by performing receive beam sweeping/measurement with type 2 beams. The receive beam type 2 measurements can be performed using the SSB or CSI-RS signals received using the receive beam of type 1 in operation 4302. The measurements and determination of the receive beam of type 2 can also be performed before the condition to use transmit beam of type 2 is met to reduce latency. The candidate receive beams of type 2 are typically a subset of all receive beams of type 2, such as the children beams of the receive beam of type 1 which is used to receive the SSB or CSI-RS at operation 4302, i.e. hierarchical codebook with receive beams of type 1 in the first tier and the receive beams of type 2 in the second tier. The candidate receive beams of type 2 can be considered to be quasi co-located with type D with the receive beam of type 1 that is used to receive the SSB or CSI-RS at operation 4302.

In operation 4316, a determination is made as to whether a RAR corresponding to the transmitted PRACH is received. If the RAR corresponding to the transmitted PRACH is received, then flowchart 4300 proceeds to operation 4308 where the transmit beam in the subsequent transmission is determined to be the same type as the transmit beam used for the last PRACH transmission. In some embodiments, the same transmit beam is used until new configuration is received, or otherwise indicated by the network.

If, in operation 4316, the determination is made that the RAR corresponding to the transmitted PRACH is not received, then flowchart 4300 proceeds to operation 4318 where a determination is made as to whether the maximum number of attempts has been reached. If the maximum number of attempts have not been reached, then flowchart 4300 returns to operation 4314. However, if the maximum number of attempts has been reached in operation 4318, then flowchart 4300 continues to operation 4320 where other actions can be performed (e.g., searching for an alternative SSB, cell, or network). Thus, PRACH transmission with the same TX beam of type 2 is repeated until the random access procedure is successful or until the maximum number of PRACH transmissions as configured by the network is reached.

If the an SSB or CSI-RS is received in operation 4302 with a receive beam of type 2 (i.e., narrow receive beam), a transmit beam of type 2 is used for PRACH transmission in operation 4304, i.e. a transmit beam type 1 is not used.

Figure 44:
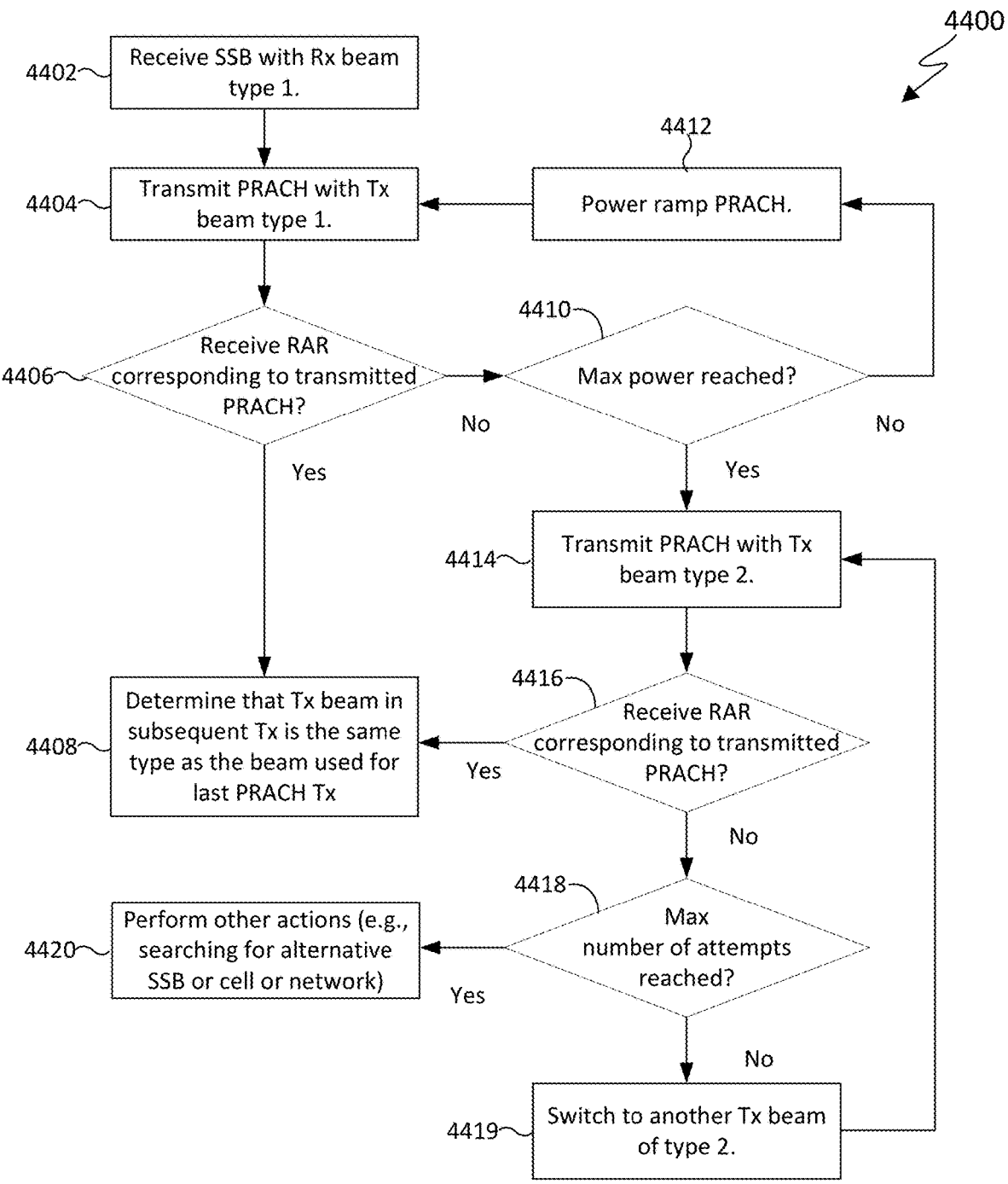
FIG. 44 illustrates another flowchart for determining a transmit beam from a random access procedure in accordance with various embodiments of this disclosure.

FIG. 44 illustrates another flowchart for determining a transmit beam from a random access procedure in accordance with various embodiments of this disclosure. The random access procedure can be contention based or non-contention based. An example of contention based random access procedure is the random access performed for initial cell access. An example of non-contention based random access procedure is the random access performed for beam failure recovery. Operations of flowchart 4400 can be implemented in a UE, such as UE 116 in FIG. 3.

Flowchart 4400 begins at operation 4402 by receiving a synchronization signal block (SSB) on a type 1 Rx beam, i.e. a wide Rx beam. For initial access, the SSB is the one the UE has chosen to receive Master Information Block (MIB) to gain the necessary information to access the cell. For beam failure recovery, the SSB can be the reference signal for new candidate beam identification in one embodiment; however, CSI-RS can also be used in another embodiment.

In operation 4404, a physical random access channel (PRACH) is transmitted with Tx beam type 1. The transmit beam can be of the same spatial filter as the one used for the receive beam to receive the SSB or the CSI-RS. In some embodiments, operation 4404 occurs after receiving the other system information, e.g. SIB1 using the same receive beam in operation 4402.

In operation 4406 a determination is made as to whether a random access response (RAR) is received corresponding to the transmitted PRACH. If the RAR is received that corresponds with the transmitted PRACH, then flowchart 4400 proceeds to operation 4408 where the transmit beam in the subsequent transmission is determined to be the same type as the transmit beam used for the last PRACH transmission. Thus, when proceeding to operation 4408 from operation 4406, then the same TX beam is used in operation 4408 that was used in operation 4404. In some embodiments, the same transmit beam is used until new configuration is received, or otherwise indicated by the network.

In operation 4406, if the RAR corresponding to the transmitted PRACH is not received, then flowchart 4400 proceeds to operation 4410 where a determination is made as to whether max transmission power has been reached. If max transmission power has not been reached, then flowchart 4400 proceeds to operation 4412 where the transmission power for the PRACH is ramped up before returning to operation 4404.

Returning to operation 4410, if the determination is made that max power is reached, then flowchart 4400 proceeds to operation 4414 and the PRACH is transmitted with a transmit beam of type 2. In some embodiments, the PRACH can be transmitted with maximum power, or the most recently used transmit power. In some embodiments, the transmit beam of type 2 has a similar spatial parameter as the current receive beam used for SSB or CSI-RS reception (i.e. quasi co-location of type D as defined in TS 38.214).

In operation 4416, a determination is made as to whether a RAR corresponding to the transmitted PRACH is received. If the RAR corresponding to the transmitted PRACH is received, then flowchart 4400 proceeds to operation 4408 where the transmit beam in the subsequent transmission is determined to be the same type as the transmit beam used for the last PRACH transmission. Thus, when proceeding to operation 4408 from operation 4416, then the same TX beam is used in operation 4408 that was used in operation 4414. In some embodiments, the same transmit beam is used until new configuration is received, or otherwise indicated by the network.

If, in operation 4416, the determination is made that the RAR corresponding to the transmitted PRACH is not received, then flowchart 4400 proceeds to operation 4418 where a determination is made as to whether the maximum number of attempts has been reached. If the maximum number of attempts have not been reached, then flowchart 4400 proceeds to operation 4419 and switches to another transmit beam of type 2 before returning to operation 4414. However, if the maximum number of attempts has been reached in operation 4418, then flowchart 4400 continues to operation 4420 where other actions can be performed (e.g., searching for an alternative SSB, cell, or network). Thus, transmission beam switching among type 2 beams can be repeated until the random access procedure is successful or until the maximum number of PRACH transmissions as configured by the network is reached.

If the an SSB or CSI-RS is received in operation 44022 with a receive beam of type 2 (i.e., narrow receive beam), a transmit beam of type 2 is used for PRACH transmission in operation 4404, i.e. a transmit beam type 1 is not used.

Figure 45:
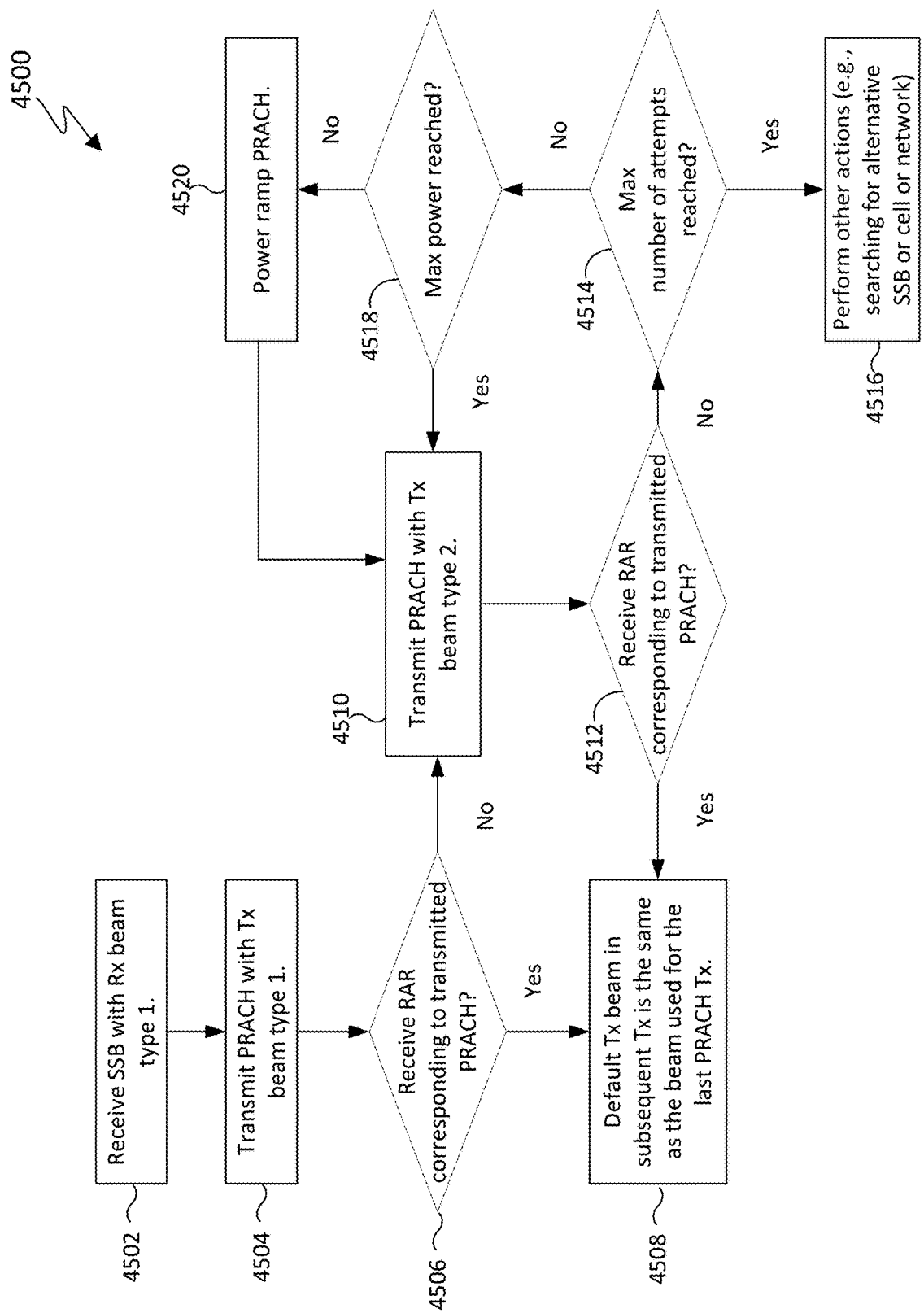
FIG. 45 illustrates another flowchart for determining a transmit beam from a random access procedure in accordance with various embodiments of this disclosure.

FIG. 45 illustrates another flowchart for determining a transmit beam from a random access procedure in accordance with various embodiments of this disclosure. The random access procedure can be contention based or non-contention based. An example of contention based random access procedure is the random access performed for initial cell access. An example of non-contention based random access procedure is the random access performed for beam failure recovery. Operations of flowchart 4500 can be implemented in a UE, such as UE 116 in FIG. 3.

Flowchart 4500 begins at operation 4502 by receiving a synchronization signal block (SSB) on a type 1 Rx beam, i.e. a wide Rx beam. For initial access, the SSB is the one the UE has chosen to receive Master Information Block (MIB) to gain the necessary information to access the cell. For beam failure recovery, the SSB can be the reference signal for new candidate beam identification in one embodiment; however, CSI-RS can also be used in another embodiment.

In operation 4504, a physical random access channel (PRACH) is transmitted with Tx beam type 1. The transmit beam can be of the same spatial filter as the one used for the receive beam to receive the SSB or the CSI-RS. In some embodiments, operation 4504 occurs after receiving the other system information, e.g. SIB1 using the same receive beam in operation 4502.

In operation 4506 a determination is made as to whether a random access response (RAR) is received corresponding to the transmitted PRACH. If the RAR is received that corresponds with the transmitted PRACH, then flowchart 4500 proceeds to operation 4508 where the transmit beam in the subsequent transmission is determined to be the same type as the transmit beam used for the last PRACH transmission. Thus, when proceeding to operation 4508 from operation 4506, then the same TX beam is used in operation 4508 that was used in operation 4504. Examples of subsequent transmissions includes physical uplink control channel (PUCCH), physical uplink shared channel (PUSCH), and PRACH transmissions. In some embodiments, the same transmit beam is used until new configuration is received, or otherwise indicated by the network.

In operation 4506, if the RAR corresponding to the transmitted PRACH is not received, then flowchart 4500 proceeds to operation 4510 where the PRACH is transmitted with a transmit beam of type 2. In some embodiments, the PRACH can be transmitted with the most recently used transmit power. In some embodiments, the transmit beam of type 2 has a similar spatial parameter as the current receive beam used for SSB or CSI-RS reception (i.e. quasi co-location of type D as defined in TS 38.214). Additionally, a suitable transmit beam or a best Tx beam of type 2 can be determined by first determining the suitable or best receive beam of type 2 via reciprocity or beam correspondence, e.g. by performing receive beam sweeping/measurement with type 2 beams. The receive beam type 2 measurements can be performed using the SSB or CSI-RS signals received using the receive beam of type 1 at operation 4502. The measurements and determination of the receive beam of type 2 can also be performed before the condition to use transmit beam of type 2 is met to reduce latency. The candidate receive beams of type 2 are typically a subset of all receive beams of type 2, such as the children beams of the receive beam of type 1 which is used to receive the SSB or CSI-RS at operation 4502, i.e. hierarchical codebook with receive beams of type 1 in the first tier and the receive beams of type 2 in the second tier. The candidate receive beams of type 2 can be considered to be quasi co-located with type D with the receive beam of type 1 that is used to receive the SSB or CSI-RS at operation 4502.

Flowchart 4500 proceeds from operation 4510 to operation 4512 where a determination is made as to whether a RAR corresponding to the transmitted PRACH is received. If the RAR corresponding to the transmitted PRACH is received, then flowchart 4500 proceeds to operation 4508 where the transmit beam in the subsequent transmission is determined to be the same type as the transmit beam used for the last PRACH transmission. Thus, when proceeding to operation 4508 from operation 4512, then the same TX beam is used in operation 4508 that was used in operation 4510. In some embodiments, the same transmit beam is used until new configuration is received, or otherwise indicated by the network.

If, in operation 4512, the determination is made that the RAR corresponding to the transmitted PRACH is not received, then flowchart 4500 proceeds to operation 4514 where a determination is made as to whether the maximum number of attempts has been reached. If the maximum number of attempts has been reached in operation 4514, then flowchart 4500 continues to operation 4516 where other actions can be performed (e.g., searching for an alternative SSB, cell, or network). If the maximum number of attempts has not been reached in operation 4514, then flowchart 4500 proceeds to operation 4518 where a determination is made as to whether the maximum power has been reached. If the maximum power has been reached, the flowchart 4500 returns to operation 4510. If the maximum power has not been reached, then flowchart 4500 proceeds to operation 4520 where the power for PRACH is ramped up before returning to operation 4510. Thus, PRACH transmission with the same TX beam of type 2 is repeated until the random access procedure is successful or until the maximum number of PRACH transmissions as configured by the network is reached.

If an SSB or CSI-RS is received in operation 4502 with a receive beam of type 2 (i.e., narrow receive beam), a transmit beam of type 2 is used for PRACH transmission in operation 4504, i.e. a transmit beam type 1 is not used.

Figure 46:
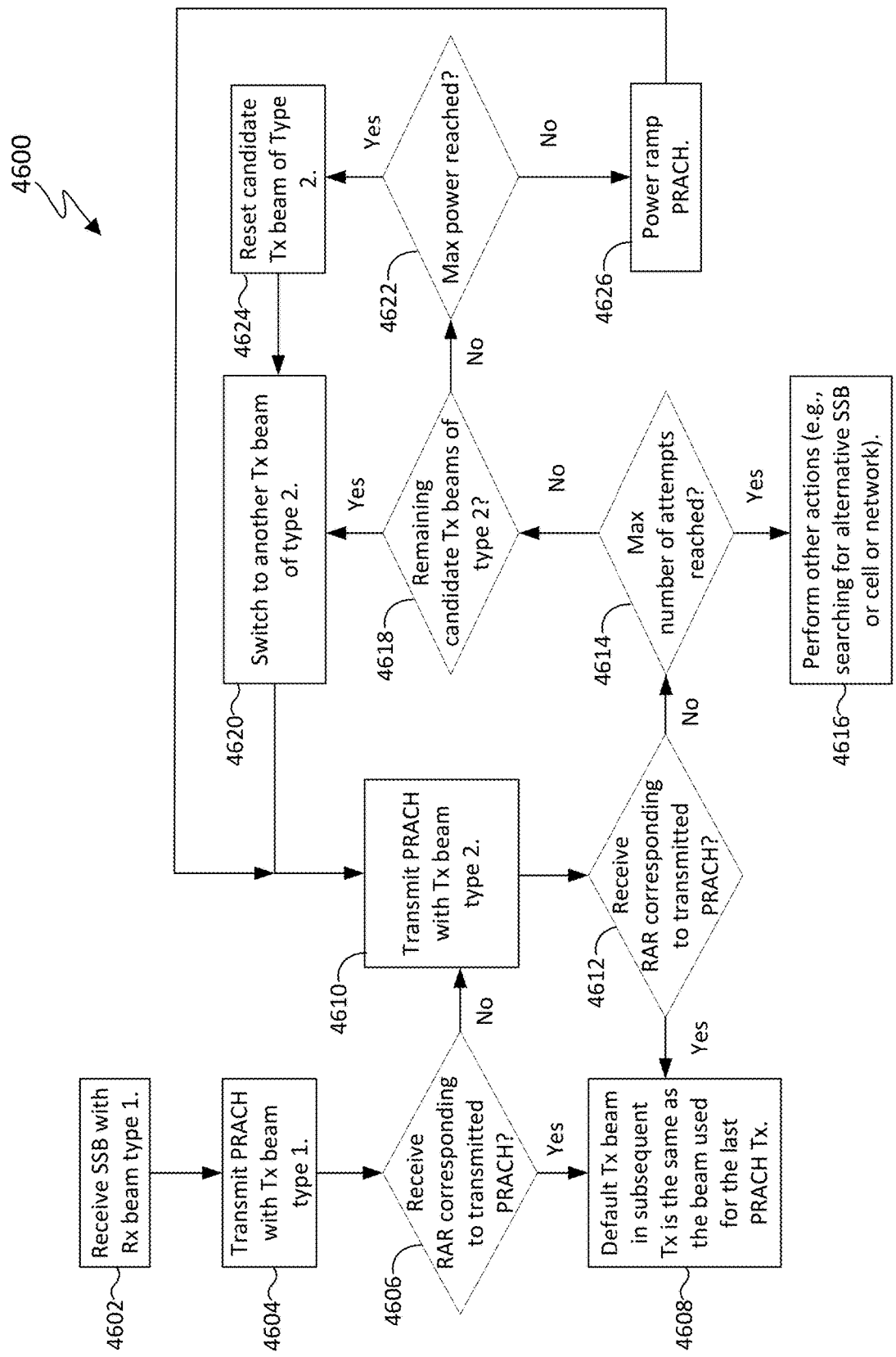
FIG. 46 illustrates a flowchart for determining a transmit beam from a random access procedure in accordance with various embodiments of this disclosure.

FIG. 46 illustrates a flowchart for determining a transmit beam from a random access procedure in accordance with various embodiments of this disclosure. The random access procedure can be contention based or non-contention based. An example of contention based random access procedure is the random access performed for initial cell access. An example of non-contention based random access procedure is the random access performed for beam failure recovery. Operations of flowchart 4600 can be implemented in a UE, such as UE 116 in FIG. 3.

Flowchart 4600 begins at operation 4602 by receiving a synchronization signal block (SSB) on a type 1 Rx beam, i.e. a wide Rx beam. For initial access, the SSB is the one the UE has chosen to receive MIB to gain the necessary information to access the cell. For beam failure recovery, the SSB can be the reference signal for new candidate beam identification in one embodiment; however, CSI-RS can also be used in another embodiment.

In operation 4604, a physical random access channel (PRACH) is transmitted with Tx beam type 1. The transmit beam can be of the same spatial filter as the one used for the receive beam to receive the SSB or the CSI-RS. In some embodiments, operation 4604 occurs after receiving the other system information, e.g. SIB1 using the same receive beam in operation 4602.

In operation 4606 a determination is made as to whether a random access response (RAR) is received corresponding to the transmitted PRACH. If the RAR is received that corresponds with the transmitted PRACH, then flowchart 4600 proceeds to operation 4608 where the transmit beam in the subsequent transmission is determined to be the same type as the transmit beam used for the last PRACH transmission. Thus, when proceeding to operation 4608 from operation 4606, then the same TX beam is used in operation 4608 that was used in operation 4604. In some embodiments, the same transmit beam is used until new configuration is received, or otherwise indicated by the network.

In operation 4606, if the RAR corresponding to the transmitted PRACH is not received, then flowchart 4600 proceeds to operation 4610 where the PRACH is transmitted with a transmit beam of type 2. In some embodiments, the PRACH can be transmitted with the most recently used transmit power. In some embodiments, the transmit beam of type 2 has a similar spatial parameter as the current receive beam used for SSB or CSI-RS reception (i.e. quasi co-location of type D as defined in TS 38.214).

In operation 4612, a determination is made as to whether a RAR corresponding to the transmitted PRACH is received.

If the RAR is received that corresponds with the transmitted PRACH, then flowchart 4600 proceeds to operation 4608 where the transmit beam in the subsequent transmission is determined to be the same type as the transmit beam used for the last PRACH transmission. Thus, when proceeding to operation 4608 from operation 4612, then the same TX beam is used in operation 4608 that was used in operation 4610.

In operation 4612, if a RAR corresponding to the transmitted PRACH is not received, then flowchart 4600 proceeds to operation 4614 where a determination is made as to whether a maximum number of attempts has been reached. If the maximum number of attempts has been reached, then flowchart 4600 proceeds to operation 4616 where other actions can be performed (e.g., searching for an alternative SSB, cell, or network). However, if the maximum number of attempts has not been reached in operation 4614, then flowchart 4600 proceeds to operation 4618 where a determination is made as to whether any candidate transmits beams of type 2 remain. If transmission beams of type 2 remain, then flowchart 4600 proceeds to switch to another transmission beam of type 2 in operation 4620 before returning back to operation 4610.

If at operation 4618 a determination is made that no candidate transmission beams of type 2 remain, then flowchart 4600 proceeds to operation 4622 where a determination is made as to whether maximum power has been reached. If maximum power has been reached, then flowchart 4600 proceeds to operation 4624 where the candidate transmission beam of type 2 is reset before proceeding to operation 4620. If maximum power has not been reached in operation 4622 then flowchart 4600 proceeds to operation 4626 where the transmission power for the PRACH is ramped up before continuing to operation 4610.

Thus, if a UE does not receive the corresponding RAR in operation 4612, then the UE can switch to another transmit beam of type 2 in operation 4620 and transmit PRACH with the same Tx power in operation 4610. Transmission beam switching among type 2 beams can be repeated until one of the following conditions is met.

Condition 1: The random access procedure is successful. The UE uses the same TX beam of type 2 as the one used for PRACH transmission for subsequent transmissions (until new configuration, or indicated otherwise by the network).

Condition 2: The maximum number of PRACH transmissions as configured by the network is reached.

Condition 3: All candidate transmit beams of type 2 which are QCL-ed in type D with respect to the current receive beam used for SSB or CSI-RS reception have been used for PRACH transmission. Just beam sweeping a subset of all such transmit beams of Type 2 is also possible if, for example, the likelihood of the success for the remaining transmit beams is considered low.

If the UE does not receive the corresponding RAR in operation 4612 and condition (3) is met while condition (2) is not met yet, the UE repeats the transmit beam sweeping with beam type 2 of PRACH transmission with ramped-up power. If random access procedure is successful with a PRACH transmission with increased power, the UE uses the same TX beam of type 2 as the one used for PRACH transmission for subsequent transmissions (until new configuration, or indicated otherwise by the network).

If the UE receives a SSB or CSI-RS with Rx beam type 2 (narrow Rx beam), then the UE uses Tx beam type 2 for PRACH transmission, i.e. Tx beam type 1 is not used.

After the UE has determined to use Tx beam of type 2 with Rx beam of type 1 according to the embodiments in the present disclosure, the UE also identifies the condition to switch from Tx beam of type 2 to Tx beam of type 1, because the channel condition can change over time. The condition to switch can be based on signal strength or quality, as discussed in some of the embodiments that follow.

Figure 47:
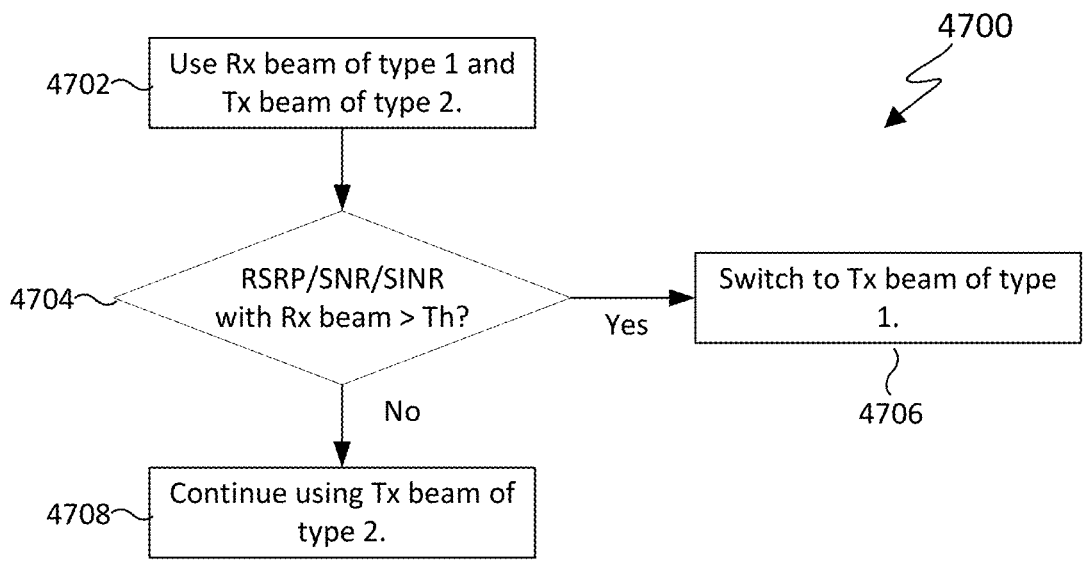
FIG. 47 illustrates a flowchart for switching between transmission beams of type 1 and type 2 based on signal strength or quality in accordance with various embodiments of this disclosure.

FIG. 47 illustrates a flowchart for switching between transmission beams of type 1 and type 2 based on signal strength or quality in accordance with various embodiments of this disclosure. Operations of flowchart 4700 can be implemented in a UE, such as UE 116 in FIG. 3.

Flowchart 4700 begins at operation 4702 by using a receive beam of type 1 and a transmit beam of type 2 for wireless communication. In operation 4704 a determination is made as to whether a signal strength or quality of the receive beam is above a threshold. Examples of signal strength or quality can include RSRP, SNR or SINR of the received signals based on the current receive beam. If in operation 4704 the determination is made that the signal strength or quality of the receive beam is above the threshold, then flowchart 4700 proceeds to operation 4706 where the transmit beam is switched from a transmit beam of type 2 to a transmit beam of type 1. However, if in operation 4704 the determination is made that the signal strength or quality of the receive beam is not above the threshold, then flowchart 4700 proceeds to operation 4708 where the transmit beam of type 2 is still used.

Signal strength or quality can be a condition because the need to use transmit beam of type 2 was to boost the signal strength or quality. The transmit beam of type 1 to switch to when the condition is satisfied should have a similar spatial parameter as the transmit beam of type 2 (i.e. quasi co-location of type D as defined in TS 38.214). In the case where hierarchical codebook is implemented, the transmit beam of type 1 is the parent beam of the transmit beam of type 2.

Figure 48:
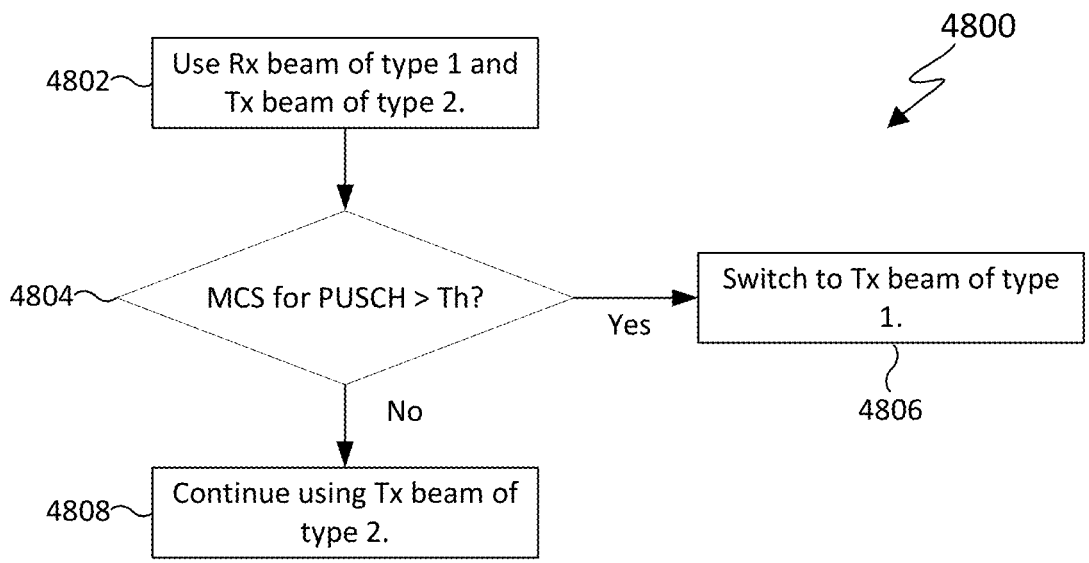
FIG. 48 illustrates a flowchart for switching between transmission beams of type 1 and type 2 based on the modulation and coding scheme for PUSCH in accordance with various embodiments of this disclosure.

FIG. 48 illustrates a flowchart for switching between transmission beams of type 1 and type 2 based on the modulation and coding scheme for PUSCH in accordance with various embodiments of this disclosure. Operations of flowchart 4800 can be implemented in a UE, such as UE 116 in FIG. 3.

Flowchart 4800 begins at operation 4802 by using a receive beam of type 1 and a transmit beam of type 2 for wireless communication. In operation 4804 a determination is made as to whether the MCS for PUSCH is above a threshold. If the MCS for PUSH is greater than the threshold, then flowchart 4800 proceeds to operation 4806 where the transmit beam can be switched from a transmit beam of type 2 to a transmit beam of type 1. However, if in operation 4804 the determination is made that the MCS for PUSCH is not greater than the threshold, then flowchart 4800 proceeds to operation 4808 where the transmit beam of type 2 is still used.

MCS can be a condition because higher MCS as scheduled by the base station implies that the received signals at the base station is sufficiently high such that switching to transmit beam of type 1 would not compromise uplink connectivity.

Assuming the UE has determined to use a transmit beam of type 1 with a receive beam of type 1 according to the embodiments in the present disclosure, there is also a need for the UE to identify the condition to switch from a transmit beam of type 1 to a transmit beam of type 2, because the channel condition can change over time. The similar principles as illustrated in the preceding two flowcharts also be applied in enabling the condition determination to switch from a transmit beam of type 1 to a transmit beam of type 2, as shown in FIGS. 49 and 50 that follow.

Additionally, the transmit beam of type 2 to switch to when the condition is satisfied should have a similar spatial parameter as the transmit beam of type 1 (i.e. quasi co-location of type D as defined in TS 38.214). In the case where hierarchical codebook is implemented, the transmit beam of type 2 is a child beam of the transmit beam of type 1. As in previous embodiments, the suitable or best transmit beam of type 2 can be determined through the determination of the suitable or best receive beam of type 2 (reciprocity or beam correspondence). The measurements and determination of the receive beam of type 2 can also be performed before the condition to use transmit beam of type 2 is met to reduce latency.

Figure 49:
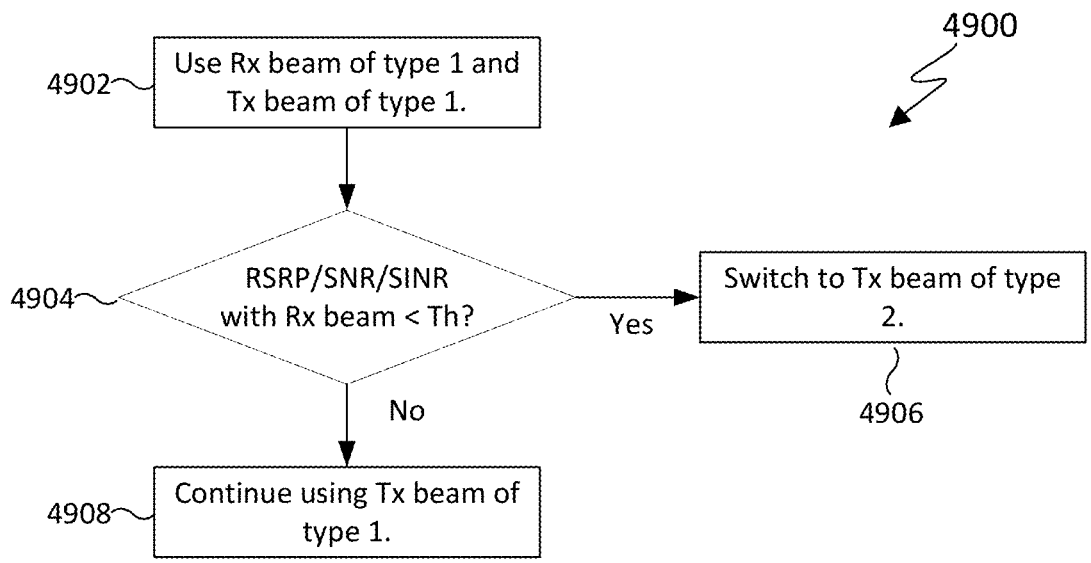
FIG. 49 illustrates another flowchart for switching between transmission beams of type 1 and type 2 based on signal strength or quality in accordance with various embodiments of this disclosure.
Figure 50:
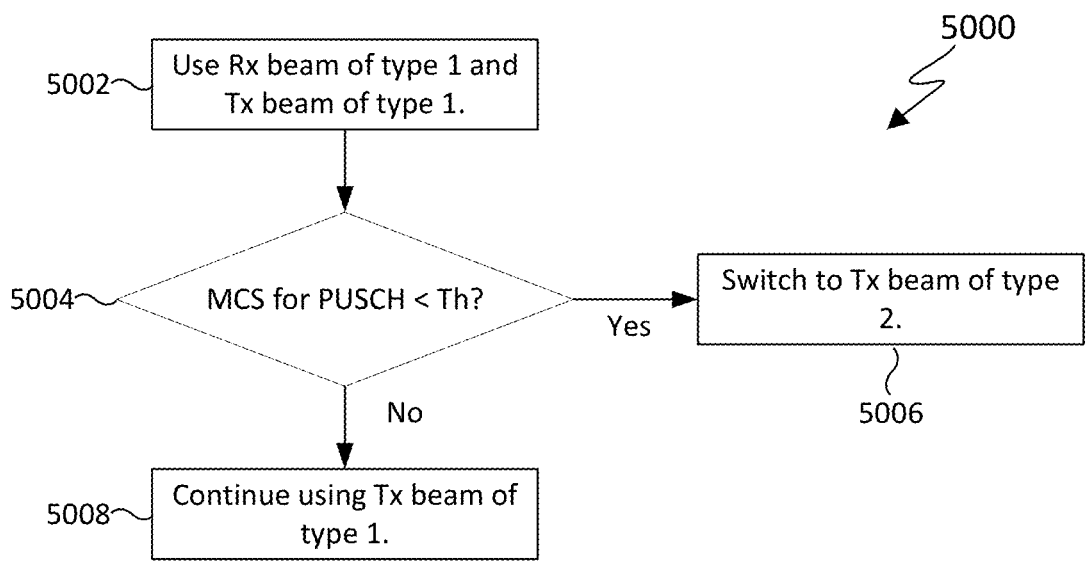
FIG. 50 illustrates another flowchart for switching between transmission beams of type 1 and type 2 based on the modulation and coding scheme for PUSCH in accordance with various embodiments of this disclosure.

FIG. 49 illustrates another flowchart for switching between transmission beams of type 1 and type 2 based on signal strength or quality in accordance with various embodiments of this disclosure. Operations of flowchart 4900 can be implemented in a UE, such as UE 116 in FIG. 3.

Flowchart 4900 begins at operation 4902 by using a receive beam of type 1 and a transmit beam of type 1 for wireless communication. In operation 4904 a determination is made as to whether a signal strength or quality of the receive beam is below a threshold. Examples of signal strength or quality can include RSRP, SNR or SINR of the received signals based on the current receive beam. If in operation 4904 the determination is made that the signal strength or quality of the receive beam is below the threshold, then flowchart 4900 proceeds to operation 4906 where the transmit beam is switched from a transmit beam of type 1 to a transmit beam of type 2. However, if in operation 4904 the determination is made that the signal strength or quality of the receive beam is not below the threshold, then flowchart 4900 proceeds to operation 4908 where the transmit beam of type 1 is still used.

FIG. 50 illustrates another flowchart for switching between transmission beams of type 1 and type 2 based on the modulation and coding scheme for PUSCH in accordance with various embodiments of this disclosure. Operations of flowchart 5000 can be implemented in a UE, such as UE 116 in FIG. 3.

Flowchart 5000 begins at operation 5002 by using a receive beam of type 1 and a transmit beam of type 1 for wireless communication. In operation 5004 a determination is made as to whether the MCS for PUSCH is below a threshold. If the MCS for PUSH is less than the threshold, then flowchart 5000 proceeds to operation 5006 where the transmit beam can be switched from a transmit beam of type 1 to a transmit beam of type 2. However, if in operation 5004 the determination is made that the MCS for PUSCH is not less than the threshold, then flowchart 5000 proceeds to operation 5008 where the transmit beam of type 1 is still used.

The RRC message IE PUCCH-SpatialRelationInfo (TS 38.331) is used to configure the spatial setting for PUCCH transmission and the parameters for PUCCH power control. The RRC configured parameter referenceSignal in PUCCH-SpatialRelationInfo (TS 38.331 & TS 38.214) indicates the spatial setting reference for PUCCH transmission in terms of the Rx beam used by the UE to receive the configured reference signal. TABLE 7 summarizes how the UE can determine the Tx beam type used for PUCCH transmission based on the Rx beam type used to receive the configured reference signal and the embodiments in the present disclosure. In particular, if Rx beam type 1 is used to receive the RS corresponding to referenceSignal in PUCCH-SpatialRelationInfo, the UE determines the Tx beam type to use for PUCCH transmission according to the embodiments as described from FIGS. 44-50. If the Rx beam type 2 is used to receive the RS corresponding to referenceSignal in PUCCH-SpatialRelationInfo, the UE uses Tx beam of type 2 for PUCCH transmission.

TABLE 7

| referenceSignal in PUCCH-SpatialRelationInfo | Rx beam type 1 used for RS | Rx beam type 2 used for RS |
| --- | --- | --- |
| SSB | Tx beam type according to procedures from embodiments | Tx beam type 2 |
| CSI-RS | Tx beam type according to procedures from embodiments | Tx beam type 2 |
| SRS | N/A | N/A |

The same method to determine the Tx beam type for PUCCH transmission can also be applied to SRS transmission as shown in TABLE 8. The RRC message IE SRS-SpatialRelationInfo is used to indicate the configuration of the spatial relation between a reference RS and the target SRS, and the reference RS can be SSB/CSI-RS/SRS (TS 38.331). If Rx beam type 1 is used to receive the RS corresponding to referenceSignal in SRS-SpatialRelationInfo, the UE determines the Tx beam type to use for SRS transmission according to the embodiments as described from FIGS. 44-50. If the Rx beam type 2 is used to receive the RS corresponding to referenceSignal in SRS-SpatialRelationInfo, the UE uses Tx beam of type 2 for SRS transmission.

TABLE 8

| referenceSignal in SRS-SpatialRelationInfo | Rx beam type 1 used for RS | Rx beam type 2 used for RS |
| --- | --- | --- |
| SSB | Tx beam type according to procedures from embodiments | Tx beam type 2 |
| CSI-RS | Tx beam type according to procedures from embodiments | Tx beam type 2 |
| SRS | N/A | N/A |

The Tx beam used for PUSCH transmission is determined by the TX beam for PUCCH transmission or SRS transmission depending on the DCI format (TS 38.214, TS 38.212). Therefore, the embodiments as described in TABLE 7 and TABLE 8 can be used to determine the Tx beam for PUSCH transmission.

Figure 51:
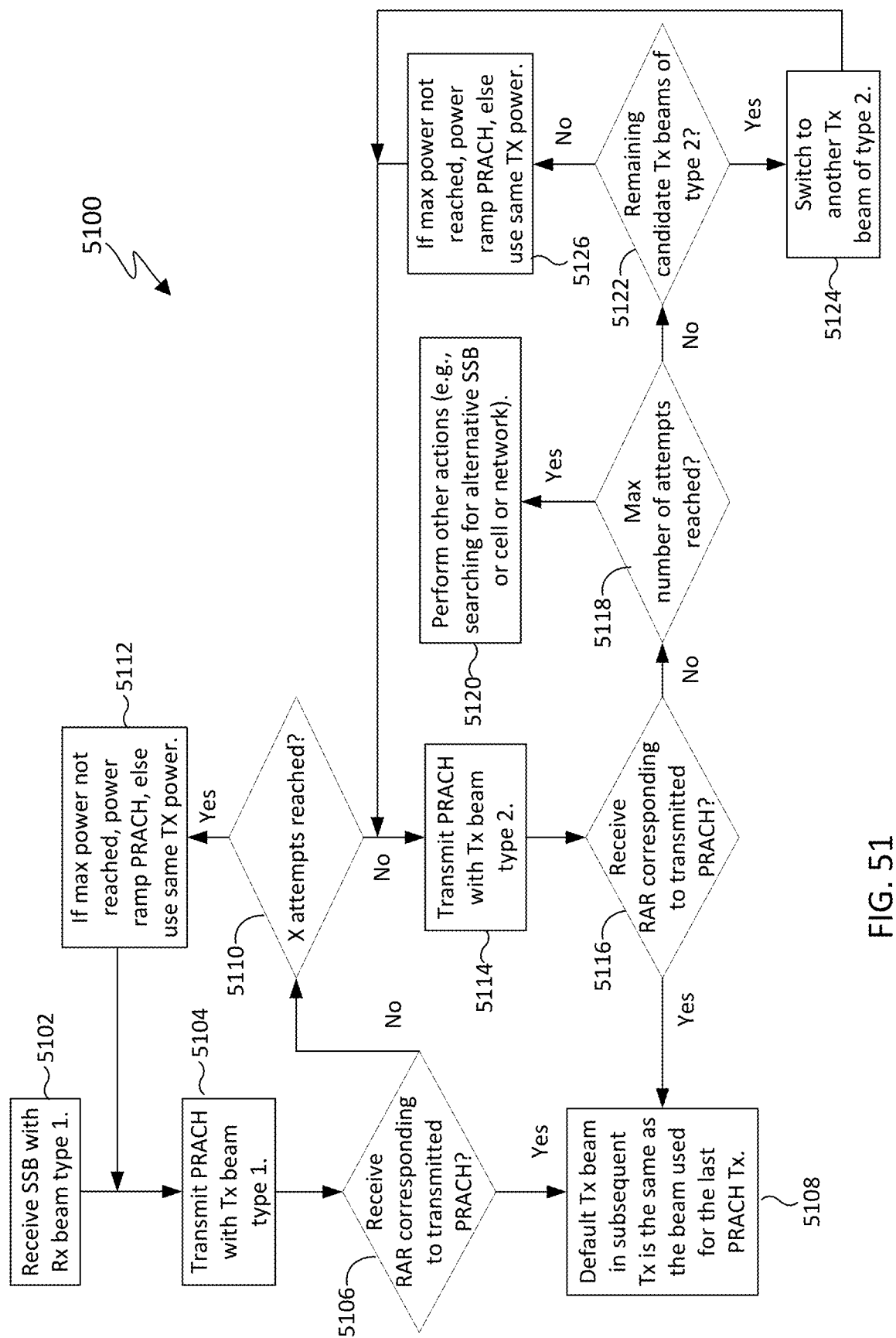
FIG. 51 illustrates a flowchart for determining a transmit beam from a random access procedure in accordance with various embodiments of this disclosure.

FIG. 51 illustrates a flowchart for determining a transmit beam from a random access procedure in accordance with various embodiments of this disclosure. The random access procedure can be contention based or non-contention based. An example of contention based random access procedure is the random access performed for initial cell access. An example of non-contention based random access procedure is the random access performed for beam failure recovery. Operations of flowchart 5100 can be implemented in a UE, such as UE 116 in FIG. 3.

Flowchart 5100 begins at operation 5102 by receiving a synchronization signal block (SSB) on a type 1 Rx beam, i.e. a wide Rx beam. For initial access, the SSB is the one the UE has chosen to receive MIB to gain the necessary information to access the cell. For beam failure recovery, the SSB can be the reference signal for new candidate beam identification in one embodiment; however, CSI-RS can also be used in another embodiment.

In operation 5104, a physical random access channel (PRACH) is transmitted with Tx beam type 1. The transmit beam can be of the same spatial filter as the one used for the receive beam to receive the SSB or the CSI-RS. In some embodiments, operation 5104 occurs after receiving the other system information, e.g. SIB1 using the same receive beam in operation 5102.

In operation 5106 a determination is made as to whether a random access response (RAR) is received corresponding to the transmitted PRACH. If the RAR is received that corresponds with the transmitted PRACH, then flowchart 5100 proceeds to operation 5108 where the transmit beam in the subsequent transmission is determined to be the same type as the transmit beam used for the last PRACH transmission. Thus, when proceeding to operation 5108 from operation 5106, then the same TX beam is used in operation 5108 that was used in operation 5104. In some embodiments, the same transmit beam is used until new configuration is received, or otherwise indicated by the network.

In operation 5106, if the RAR corresponding to the transmitted PRACH is not received, then flowchart 5100 proceeds to operation 5110 where a determination is made as to whether a predetermined number of transmission attempts have been reached. If the predetermined number of transmission attempts have been reached, then flowchart 5100 proceeds to operation 5112 where transmit power is selected for PRACH. In particular, if max power has not been reached, then power is ramped. If max power has been reached, then the same transmit power is used as before and flowchart 5100 returns back to operation 5104 to transmit PRACH with a transmit beam of type 1 using the power selected in operation 5112.

In operation 5110, if the determination is made that the predetermined number of transmission attempts have not been reached, then flowchart 5100 proceeds to operation 5114 where PRACH is transmitted with a transmit beam of type 2. In some embodiments, the transmit beam of type 2 should have a similar spatial parameter as the current receive beam used for SSB or CSI-RS reception (i.e. quasi co-location of type D as defined in TS 38.214).

Flowchart 5100 then proceeds to operation 5116 where a determination is made as to whether a random access response (RAR) is received corresponding to the transmitted PRACH. If the RAR is received that corresponds with the transmitted PRACH, then flowchart 5100 proceeds to operation 5108 where the transmit beam in the subsequent transmission is determined to be the same type as the transmit beam used for the last PRACH transmission. Thus, when proceeding to operation 5108 from operation 5116, then the same TX beam is used in operation 5108 that was used in operation 5114. In some embodiments, the same transmit beam is used until new configuration is received, or otherwise indicated by the network.

In operation 5116, if the RAR corresponding to the transmitted PRACH is not received, then flowchart 5100 proceeds to operation 5118 where a determination is made as to whether a maximum number of transmission attempts have been reached. If the maximum number of transmission attempts have been reached, then flowchart 5100 proceeds to operation 5120 where other actions can be performed (e.g., searching for an alternative SSB, cell, or network).

In operation 5118 if the determination is made that a maximum number of transmission attempts has not been reached, the flowchart 5100 proceeds to operation 5122 where a determination is as to whether any candidate transmits beams of type 2 remain. If transmission beams of type 2 remain, then flowchart 5100 proceeds to switch to another transmission beam of type 2 in operation 5124 before returning back to operation 5114.

In operation 5122 if the determination is made that no candidate transmission beams of type 2 remain, then flowchart 5100 proceeds to operation 5126 where transmit power is selected for PRACH. In particular, if max power has not been reached, then power is ramped. If max power has been reached, then the same transmit power is used as before and flowchart 5100 returns to operation 5114.

Thus, transmit beam switching among type 2 beams can be repeated until the random access procedure is successful, or until the maximum number of PRACH transmissions as configured by the network is reached, or if all candidate Tx beams of type 2 which are QCL-ed in type D with respect to the current Rx beam used for SSB or CSI-RS reception have been used for PRACH transmission. Just beam sweeping a subset of all such transmit beams of Type 2 is also possible if, for example, the likelihood of the success for the remaining transmit beams is considered low. If the UE does not receive the corresponding RAR after completion of Tx beam type 2 sweeping, then the UE can ramp up the transmit power for PRACH transmission (if max power not yet reached) and repeat the transmit beam sweeping with beam type 2 with the ramped up power. If random access procedure is successful with a PRACH transmission with increased power, the UE uses the same transmit beam of type 2 as the one used for PRACH transmission for subsequent transmissions (until new configuration, or indicated otherwise by the network).

Instead of performing switching on the transmit beam of type 2, the UE may also just use the transmit beam of type 2 which is determined from measurements of the receive beam of type 2, exploiting the reciprocity or beam correspondence property as described in previous embodiments.

If the UE receives a SSB or CSI-RS with a receive beam type 2 (narrow Rx beam), then the UE uses transmit beam type 2 for PRACH transmission, i.e. transmit beam type 1 is not used.

Figure 52:
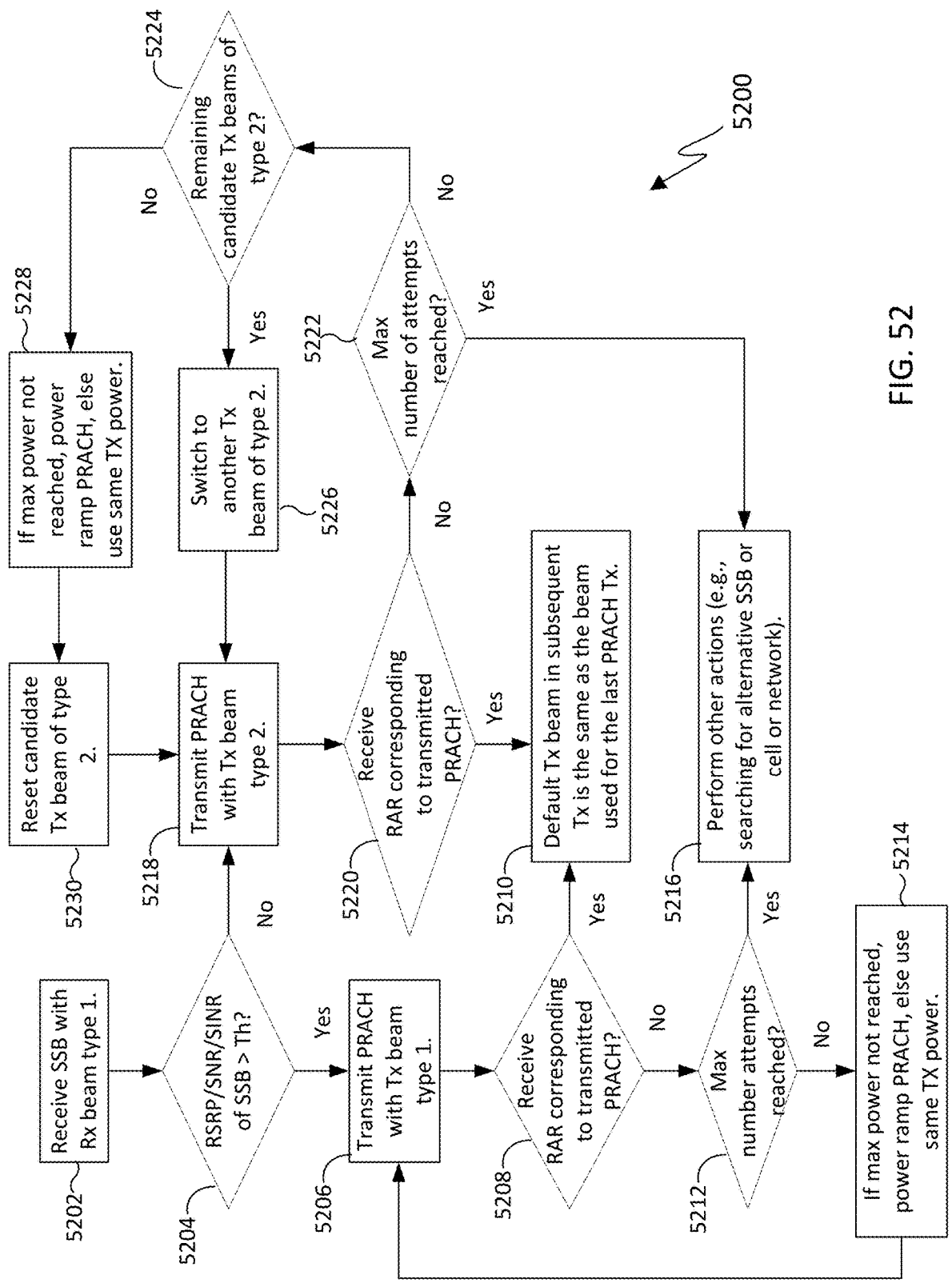
FIG. 52 illustrates a flowchart for determining a transmit beam from a random access procedure in accordance with various embodiments of this disclosure.

FIG. 52 illustrates a flowchart for determining a transmit beam from a random access procedure in accordance with various embodiments of this disclosure. The random access procedure can be contention based or non-contention based. An example of contention based random access procedure is the random access performed for initial cell access. An example of non-contention based random access procedure is the random access performed for beam failure recovery. Operations of flowchart 5200 can be implemented in a UE, such as UE 116 in FIG. 3.

Flowchart 5200 begins at operation 5202 by receiving a synchronization signal block (SSB) on a type 1 Rx beam, i.e. a wide Rx beam. For initial access, the SSB is the one the UE has chosen to receive MIB to gain the necessary information to access the cell. For beam failure recovery, the SSB can be the reference signal for new candidate beam identification in one embodiment; however, CSI-RS can also be used in another embodiment.

In operation 5204, a determination is made as to whether the received signal strength or quality of the SSB or the CSI-RS is above a threshold. In some embodiments, the signal strength or quality is determined by RSRP, SNR, SINR. The determination in operation 5204 determines whether a transmission beam of type 1 or type 2 is used for PRACH transmission. If the received signal strength or quality is greater than a threshold, then flowchart 5200 proceeds to operation 5206 and PRACH is transmitted with a transmit beam of type 1.

In operation 5208 a determination is made as to whether a random access response (RAR) is received corresponding to the transmitted PRACH. If the RAR is received that corresponds with the transmitted PRACH, then flowchart 5200 proceeds to operation 5210 where the transmit beam in the subsequent transmission is determined to be the same type as the transmit beam used for the last PRACH transmission. Thus, when proceeding to operation 5210 from operation 5208, then the same TX beam is used in operation 5210 that was used in operation 5206. In some embodiments, the same transmit beam is used until new configuration is received, or otherwise indicated by the network.

In operation 5208, if a RAR corresponding to the transmitted PRACH is not received, then flowchart 5200 proceeds to operation 5212 where a determination is made as to whether a maximum number (or predetermined number) of attempts has been reached. If the maximum number of attempts has not been reached in operation 5212, then flowchart 5200 proceeds to operation 5214 where transmit power is selected for PRACH. In particular, if max power has not been reached, then power is ramped. If max power has been reached, then the same transmit power is used as before and flowchart 5200 returns back to operation 5206 to transmit PRACH with a transmit beam of type 1 and the power selected in operation 5214.

In operation 5212 if the determination is made that the maximum number of attempts has been reached, then flowchart 5200 proceeds to operation 5216 where other actions can be performed (e.g., searching for an alternative SSB, cell, or network).

Returning to operation 5204, if the determination is made that the received signal strength or quality of the SSB or the CSI-RS is not above a threshold, then flowchart 5200 proceeds to operation 5218 and PRACH is transmitted with a transmit beam of type 2. Thereafter, a determination is made in operation 5220 as to whether a random access response (RAR) is received corresponding to the transmitted PRACH. If the RAR is received that corresponds with the transmitted PRACH, then flowchart 5200 proceeds to operation 5210 where the transmit beam in the subsequent transmission is determined to be the same type as the transmit beam used for the last PRACH transmission. Thus, when proceeding to operation 5210 from operation 5220, then the same TX beam is used in operation 5210 that was used in operation 5218. In some embodiments, the same transmit beam is used until new configuration is received, or otherwise indicated by the network.

In operation 5220, if a RAR corresponding to the transmitted PRACH is not received, then flowchart 5200 proceeds to operation 5222 where a determination is made as to whether a maximum number of attempts has been reached. If the maximum number of attempts has been reached, then flowchart 5200 proceeds to operation 5216 where other actions can be performed (e.g., searching for an alternative SSB, cell, or network). However, if the maximum number of attempts has not been reached in operation 5222, then flowchart 5200 proceeds to operation 5224 where a determination is made as to whether any candidate transmits beams of type 2 remain. If transmission beams of type 2 remain, then flowchart 5200 proceeds to switch to another transmission beam of type 2 in operation 5226 before returning back to operation 5218.

Returning to operation 5224 if a determination is made that no candidate transmission beams of type 2 remain, then flowchart 5200 proceeds to operation 5228 where transmit power is selected for PRACH. In particular, if max power has not been reached, then power is ramped. If max power has been reached, then the same transmit power is used as before and flowchart 5200 proceeds to operation 5230 where a candidate transmit beam of type 2 is reset before proceeding back to operation 5218 to transmit PRACH with a transmit beam of type 2.

Figure 53:
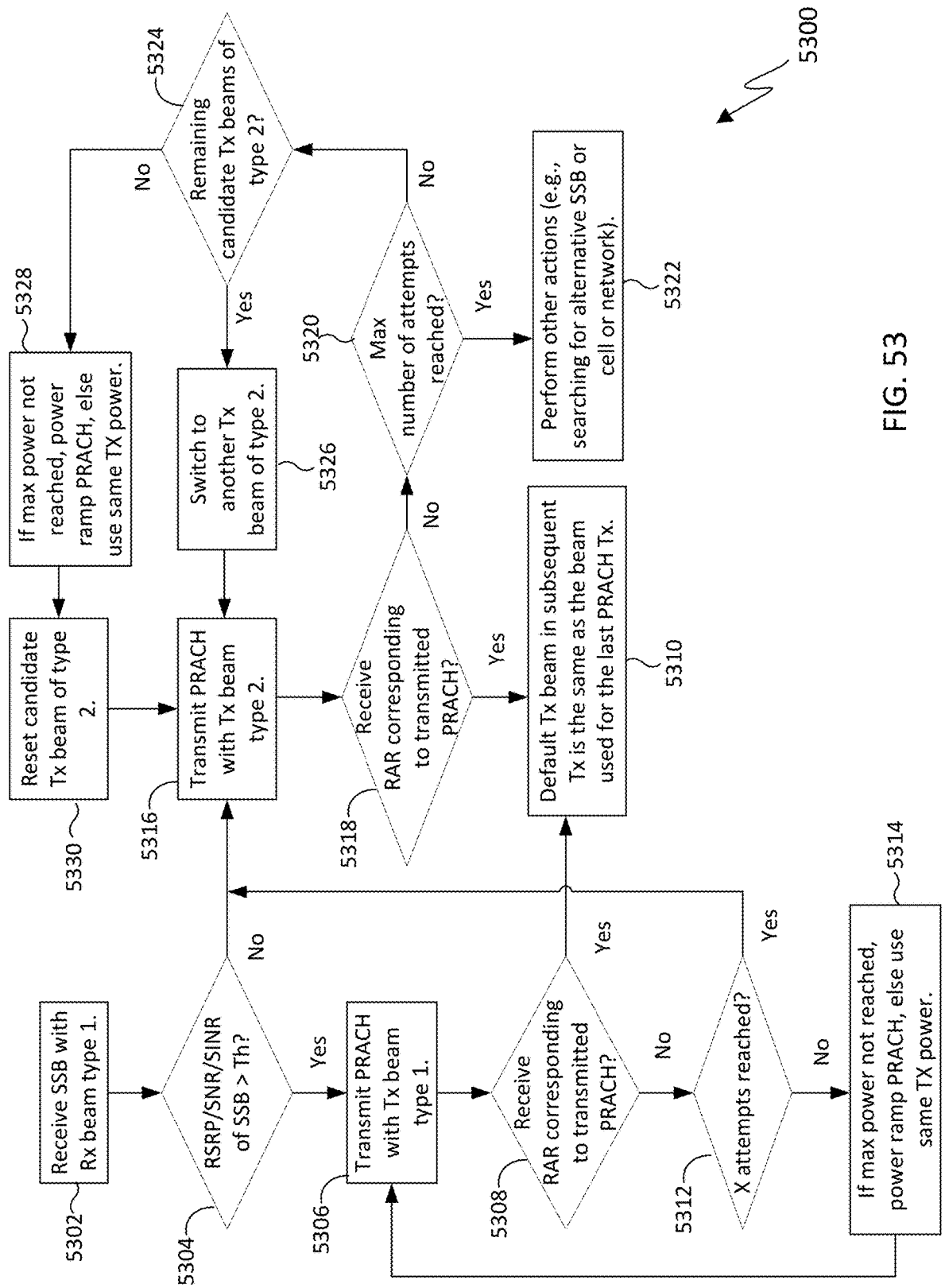
FIG. 53 illustrates a flowchart for determining a transmit beam from a random access procedure in accordance with various embodiments of this disclosure.

FIG. 53 illustrates a flowchart for determining a transmit beam from a random access procedure in accordance with various embodiments of this disclosure. The random access procedure can be contention based or non-contention based. An example of contention based random access procedure is the random access performed for initial cell access. An example of non-contention based random access procedure is the random access performed for beam failure recovery. Operations of flowchart 5300 can be implemented in a UE, such as UE 116 in FIG. 3.

Flowchart 5300 begins at operation 5302 by receiving a synchronization signal block (SSB) on a type 1 Rx beam, i.e. a wide Rx beam. For initial access, the SSB is the one the UE has chosen to receive MIB to gain the necessary information to access the cell. For beam failure recovery, the SSB can be the reference signal for new candidate beam identification in one embodiment; however, CSI-RS can also be used in another embodiment.

In operation 5304, a determination is made as to whether the received signal strength or quality of the SSB or the CSI-RS is above a threshold. In some embodiments, the signal strength or quality is determined by RSRP, SNR, SINR. The determination in operation 5304 determines whether a transmission beam of type 1 or type 2 is used for PRACH transmission. If the received signal strength or quality is greater than a threshold, then flowchart 5300 proceeds to operation 5306 and PRACH is transmitted with a transmit beam of type 1.

In operation 5308 a determination is made as to whether a random access response (RAR) is received corresponding to the transmitted PRACH. If the RAR is received that corresponds with the transmitted PRACH, then flowchart 5300 proceeds to operation 5310 where the transmit beam in the subsequent transmission is determined to be the same type as the transmit beam used for the last PRACH transmission. Thus, when proceeding to operation 5310 from operation 5308, then the same TX beam is used in operation 5310 that was used in operation 5306. In some embodiments, the same transmit beam is used until new configuration is received, or otherwise indicated by the network.

In operation 5308, if a RAR corresponding to the transmitted PRACH is not received, then flowchart 5300 proceeds to operation 5312 where a determination is made as to whether a maximum number (or predetermined number) of attempts has been reached. If the maximum number of attempts has not been reached in operation 5312, then flowchart 5300 proceeds to operation 5314 where transmit power is selected for PRACH. In particular, if max power has not been reached, then power is ramped. If max power has been reached, then the same transmit power is used as before and flowchart 5300 returns back to operation 5306 to transmit PRACH with a transmit beam of type 1 at the power selected in operation 5314.

Returning to operation 5304, if the determination is made that the received signal strength or quality of the SSB or the CSI-RS is not above a threshold, then flowchart 5300 proceeds to operation 5316 and PRACH is transmitted with a transmit beam of type 2. Thereafter, a determination is made in operation 5318 as to whether a random access response (RAR) is received corresponding to the transmitted PRACH. If the RAR is received that corresponds with the transmitted PRACH, then flowchart 5300 proceeds to operation 5310 where the transmit beam in the subsequent transmission is determined to be the same type as the transmit beam used for the last PRACH transmission. Thus, when proceeding to operation 5310 from operation 5318, then the same TX beam is used in operation 5310 that was used in operation 5316. In some embodiments, the same transmit beam is used until new configuration is received, or otherwise indicated by the network.

In operation 5318, if a RAR corresponding to the transmitted PRACH is not received, then flowchart 5300 proceeds to operation 5320 where a determination is made as to whether a maximum number of attempts has been reached. If the maximum number of attempts has been reached, then flowchart 5300 proceeds to operation 5322 where other actions can be performed (e.g., searching for an alternative SSB, cell, or network). However, if the maximum number of attempts has not been reached in operation 5320, then flowchart 5300 proceeds to operation 5324 where a determination is made as to whether any candidate transmits beams of type 2 remain. If transmission beams of type 2 remain, then flowchart 5300 proceeds to switch to another transmission beam of type 2 in operation 5326 before returning back to operation 5316.

Returning to operation 5324 if a determination is made that no candidate transmission beams of type 2 remain, then flowchart 5300 proceeds to operation 5328 where transmit power is selected for PRACH. In particular, if max power has not been reached, then power is ramped. If max power has been reached, then the same transmit power is used as before and flowchart 5300 proceeds to operation 5330 where a candidate transmit beam of type 2 is reset before proceeding back to operation 5316 to transmit PRACH with a transmit beam of type 2.

Returning to operation 5312, if the number of attempts has been reached, then flowchart 5300 proceeds to operation 5316 where PRACH is transmitted with a transmit beam of type 2.

Figure 54:
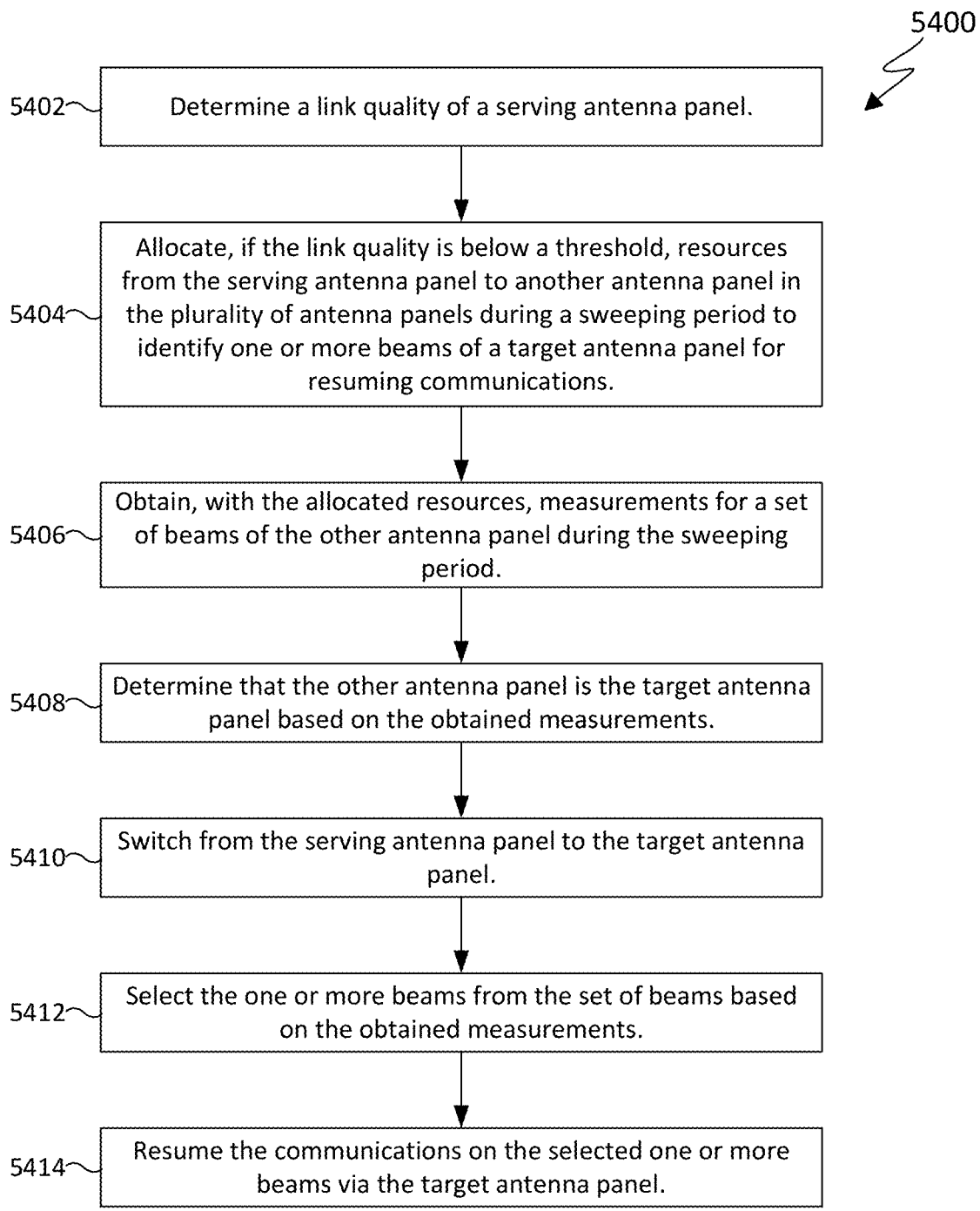
FIG. 54 illustrates a flowchart for managing beams amongst a plurality of antenna panels in accordance with various embodiments of this disclosure.

FIG. 54 illustrates a flowchart for beam management amongst a plurality of antenna panels in accordance with various embodiments of this disclosure. Operations of flowchart 5400 can be implemented in a UE, such as UE 116 in FIG. 3.

Flowchart 5400 begins at operation 5402 by determining a link quality of a serving antenna panel.

In operation 5402, if the link quality of the serving antenna panel is below a threshold, then resources are allocated from the serving antenna panel to another antenna panel in the plurality of antenna panels during a sweeping period to identify one or more beams of a target antenna panel for resuming communications.

In some embodiments, resources are allocated from the serving antenna panel to the other antenna panel in response to determining that a link quality measurement table for the other antenna panel has not been updated within a predetermined amount of time. The link quality measurement table can be updated with the measurements obtained during the sweeping period. The link quality measurement table can be updated based on an updated beam sweeping order, or the link quality measurement table can be updated based on narrow beams of a best wide beam identified during the sweeping period. In on embodiment, to update the link quality measurement table based on the updated beam sweeping order, the updated beam sweeping order is identified based on the obtained measurements. Based on the updated beam sweeping order, the set of beams can be formed and then measured. Thereafter, the link quality measurement table can be updated based on the updated beam sweeping order. In another embodiment, to update the link quality measurement table based on the one or more narrow beams of a best wide beam, the narrow beams of the best wide beam are identified based on the obtained measurements and a set of beams can be formed and measured based on the one or more narrow beams of the best wide beam. Thereafter, the link quality measurement table can be updated based on the one or more narrow beams.

In operation 5406, measurements are obtained with the allocated resources for a set of beams of the other antenna panel during the sweeping period. In some embodiments, obtaining measurements with the allocated resources includes identifying the best wide beam of the other antenna panel so that the selected beam is selected from a set of narrow beams of the best wide beam.

In operation 5408, the other antenna panel is determined as the target antenna panel based on the obtained measurements. In operation 5410, the serving antenna panel is switched to the target antenna panel. In operation 5412, the one or more beams is selected from the set of beams based on the obtained measurements. In operation 5414, communications are resumed on the selected one or more beams via the target antenna panel.

In one embodiment of FIG. 54, obtaining the measurements for the set of beams of the other antenna panel includes identifying a reference beam from the other antenna panel or the serving antenna panel where the reference beam can be the latest beam used by the other antenna panel or the latest beam used by the serving antenna panel, and computing predefined metrics between the set of beams to be measured and the reference beam. In addition, selecting the beam includes determining a beam sweeping order for the set of beams to be measured based on the computed metrics so that the beam used for a measurement occasion is selected based on the determined beam sweeping order. In this embodiment, selection of the beam used for the measurement occasion is completed within a short, predefined period of time within the antenna module switching boundary, e.g., within N time slots after the module switching boundary.

In another embodiment of FIG. 54, obtaining the measurements for the set of beams of the other antenna panel includes determining whether the other antenna panel has been measured within a predetermined period of time. In addition, selecting the beam includes determining a beam sweeping order for the set of beams to be measured based on computed metrics between the set of beams to be measured and a reference beam of the other antenna panel in response to determining that the other antenna panel has been measured within the predetermined period of time, and determining the beam sweeping order for the set of beams to be measured based on computed metrics between the set of beams to be measured and a reference beam of the serving antenna panel in response to determining that the other antenna panel has not been measured within the predetermined period of time. In this embodiment, the beam used for a measurement occasion is selected based on the determined beam sweeping order. In this embodiment, selection of the beam used for the measurement occasion is completed within a short, predefined period of time within the antenna module switching boundary, e.g., within N time slots after the module switching boundary.

Flowchart 5400 can also include a step of obtaining measurements for any remaining beams in the set of beams of the target antenna panel during operation of the target antenna panel. In one embodiment, the measurements are obtained at the antenna module switching boundary, e.g., within N time slots after the antenna module switching boundary and after a beam has already been selected for communication by the target antenna module. Thereafter, one of the remaining beams can be switched to based on the one of the remaining beams having a better link quality.

Although this disclosure has been described with an exemplary embodiment, various changes and modifications may be suggested to one skilled in the art. It is intended that this disclosure encompass such changes and modifications as fall within the scope of the appended claims.

What is claimed is:

1. A user equipment (UE) comprising:
a transceiver including a plurality of antenna panels; and
a processor operably coupled to the transceiver, the processor configured to:
   determine that a link quality measurement table for a first antenna panel has not been updated within a predetermined amount of time,
   responsive to determining that the link quality measurement table for the first antenna panel has not been updated within the predetermined amount of time, allocate resources from a serving antenna panel to the first antenna panel during a sweeping period to identify one or more beams of a target antenna panel for resuming communications,
   obtain, with the allocated resources, measurements for a set of beams of the first antenna panel during the sweeping period,
   determine that the first antenna panel is the target antenna panel based on the obtained measurements,
   switch from the serving antenna panel to the target antenna panel,
   select the one or more beams from the set of beams based on the obtained measurements, and
   resume the communications on the selected one or more beams via the target antenna panel.

2. The UE of claim 1,
wherein the link quality measurement table is updated with the measurements obtained during the sweeping period.

3. The UE of claim 2, wherein the processor is further configured to:
identify, based on the obtained measurements, one or more narrow beams of a best wide beam or an updated beam sweeping order;
form the set of beams based on the one or more narrow beams or the updated beam sweeping order;
measure the set of beams based on the one or more narrow beams or the updated beam sweeping order; and
update the link quality measurement table based on the one or more narrow beams or the updated beam sweeping order.

4. The UE of claim 1, wherein:
to obtain the measurements for the set of beams of the first antenna panel, the processor is configured to:
   identify a reference beam from the first antenna panel or the serving antenna panel, wherein the reference beam is a latest beam used by the first antenna panel or a latest beam used by the serving antenna panel, and
   compute predefined metrics between the set of beams to be measured and the reference beam; and
to select the one or more beams, the processor is configured to:
   determine a beam sweeping order for the set of beams to be measured based on the computed metrics, wherein the one or more beams used for a measurement occasion is selected based on the determined beam sweeping order.

5. The UE of claim 1, wherein:
to obtain the measurements for the set of beams of the first antenna panel, the processor is further configured to:
   determine whether the first antenna panel has been measured within a predetermined period of time; and
to select the one or more beams, the processor is further configured to:
   determine a beam sweeping order for the set of beams to be measured based on computed metrics between the set of beams to be measured and a reference beam of the first antenna panel in response to determining that the first antenna panel has been measured within the predetermined period of time, and
   determine the beam sweeping order for the set of beams to be measured based on computed metrics between the set of beams to be measured and a reference beam of the serving antenna panel in response to determining that the first antenna panel has not been measured within the predetermined period of time,
   wherein the one or more beams used for a measurement occasion is selected based on the determined beam sweeping order.

6. The UE of claim 1, wherein to obtain the measurements for the set of beams of the first antenna panel, the processor is further configured to:
identify a best wide beam of the first antenna panel,
wherein the one or more beams is selected from a set of narrow beams of the best wide beam.

7. The UE of claim 1, wherein the processor is further configured to:
obtain measurements for any remaining beams in the set of beams of the target antenna panel; and
switch to one of the remaining beams based on the one of the remaining beams having a better link quality.

8. A method of beam management for a plurality of antenna panels, the method comprising:
determining that a link quality measurement table for a first antenna panel has not been updated within a predetermined amount of time;
responsive to determining that the link quality measurement table for the first antenna panel has not been updated within the predetermined amount of time, allocating resources from a serving antenna panel to the first antenna panel during a sweeping period to identify one or more beams of a target antenna panel for resuming communications;
obtaining, with the allocated resources, measurements for a set of beams of the first antenna panel during the sweeping period;
determining that the first antenna panel is the target antenna panel based on the obtained measurements;
switching from the serving antenna panel to the target antenna panel;
selecting the one or more beams from the set of beams based on the obtained measurements; and
resuming the communications on the selected one or more beams via the target antenna panel.

9. The method of claim 8,
wherein the link quality measurement table is updated with the measurements obtained during the sweeping period.

10. The method of claim 9, further comprising:
identifying, based on the obtained measurements, one or more narrow beams of a best wide beam or an updated beam sweeping order;
forming the set of beams based on the one or more narrow beams or the updated beam sweeping order;
measuring the set of beams based on the one or more narrow beams or the updated beam sweeping order; and
updating the link quality measurement table based on the one or more narrow beams of the updated beam sweeping order.

11. The method of claim 8, wherein:
obtaining the measurements for the set of beams of the first antenna panel comprises:
identifying a reference beam from the first antenna panel or the serving antenna panel, wherein the reference beam is a latest beam used by the first antenna panel or a latest beam used by the serving antenna panel, and
computing predefined metrics between the set of beams to be measured and the reference beam; and
selecting the one or more beams comprises:
determining a beam sweeping order for the set of beams to be measured based on the computed metrics, wherein the one or more beams used for a measurement occasion is selected based on the determined beam sweeping order.

12. The method of claim 8, wherein:
obtaining the measurements for the set of beams of the first antenna panel comprises:
determining whether the first antenna panel has been measured within a predetermined period of time; and
selecting the one or more beams comprises:
determining a beam sweeping order for the set of beams to be measured based on computed metrics between the set of beams to be measured and a reference beam of the first antenna panel in response to determining that the first antenna panel has been measured within the predetermined period of time, and
determining the beam sweeping order for the set of beams to be measured based on computed metrics between the set of beams to be measured and a reference beam of the serving antenna panel in response to determining that the first antenna panel has not been measured within the predetermined period of time,
wherein the one or more beams used for a measurement occasion is selected based on the determined beam sweeping order.

13. The method of claim 8, wherein obtaining the measurements for the set of beams of the first antenna panel comprises:
identifying a best wide beam of the first antenna panel, wherein the one or more beams is selected from a set of narrow beams of the best wide beam.

14. The method of claim 8, further comprising:
obtaining measurements for any remaining beams in the set of beams of the target antenna panel; and
switching to one of the remaining beams based on the one of the remaining beams having a better link quality.

15. A non-transitory, computer-readable medium comprising instructions that, when executed by a processor of an electronic device, are configured to cause the electronic device to:
determine that a link quality measurement table for a first antenna panel has not been updated within a predetermined amount of time;
responsive to determining that the link quality measurement table for the first antenna panel has not been updated within the predetermined amount of time, allocate resources from a serving antenna panel to the first antenna panel during a sweeping period to identify one or more beams of a target antenna panel for resuming communications;
obtain, with the allocated resources, measurements for a set of beams of the first antenna panel during the sweeping period;
determine that the first antenna panel is the target antenna panel based on the obtained measurements;
switch from the serving antenna panel to the target antenna panel;
select the one or more beams from the set of beams based on the obtained measurements; and
resume the communications on the selected one or more beams via the target antenna panel.

16. The non-transitory, computer readable medium of claim 15,
wherein the link quality measurement table is updated with the measurements obtained during the sweeping period.

17. The non-transitory, computer readable medium of claim 16, wherein the instructions comprise additional instructions that, when executed by the processor, cause the electronic device to:
identify, based on the obtained measurements, one or more narrow beams of a best wide beam or an updated beam sweeping order;
form the set of beams based on the one or more narrow beams or the updated beam sweeping order;
measure the set of beams based on the one or more narrow beams or the updated beam sweeping order; and
update the link quality measurement table based on the one or more narrow beams or the updated beam sweeping order.

18. The non-transitory, computer-readable medium of claim 15, wherein:
instructions to obtain the measurements for the set of beams of the first antenna panel comprises further instructions that, when executed by the processor, cause the electronic device to:
identify a reference beam from the first antenna panel or the serving antenna panel, wherein the reference beam is a latest beam used by the first antenna panel or a latest beam used by the serving antenna panel, and
compute predefined metrics between the set of beams to be measured and the reference beam; and
instructions to select the one or more beams comprises further instructions that, when executed by the processor, cause the electronic device to:
determine a beam sweeping order for the set of beams to be measured based on the computed metrics, wherein the one or more beams used for a measurement occasion are selected based on the determined beam sweeping order.

19. The non-transitory, computer-readable medium of claim 15, wherein:
instructions to obtain the measurements for the set of beams of the first antenna panel comprises further instructions that, when executed by the processor, cause the electronic device to:

determine whether the first antenna panel has been measured within a predetermined period of time; and instructions to select the one or more beams comprises further instructions that, when executed by the processor, cause the electronic device to:

determine a beam sweeping order for the set of beams to be measured based on computed metrics between the set of beams to be measured and a reference beam of the first antenna panel in response to determining that the first antenna panel has been measured within the predetermined period of time, and determine the beam sweeping order for the set of beams to be measured based on computed metrics between the set of beams to be measured and a reference beam of the serving antenna panel in response to determining that the first antenna panel has not been measured within the predetermined period of time, wherein the one or more beams used for a measurement occasion is selected based on the determined beam sweeping order.

20. The non-transitory, computer-readable medium of claim 15, wherein instructions to obtain the measurements for the set of beams of the first antenna panel comprises further instructions that, when executed by the processor, cause the electronic device to:

identify a best wide beam of the first antenna panel, wherein the one or more beams is selected from a set of narrow beams of the best wide beam.

* * * * *